(12) United States Patent
Hartz et al.

(10) Patent No.: US 8,545,367 B2
(45) Date of Patent: Oct. 1, 2013

(54) HYBRID SYSTEM

(75) Inventors: James F. Hartz, Indianapolis, IN (US);
Nayan V. Patel, Indianapolis, IN (US);
Vernon D. Thompson, Brownsburg, IN (US); Paul A. Richardson, Plainfield, IN (US); Christopher A. Baker, Indianapolis, IN (US); George S. Pelton, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 13/527,953

(22) Filed: Jun. 20, 2012

(65) Prior Publication Data

US 2012/0258838 A1    Oct. 11, 2012

Related U.S. Application Data

(63) Continuation of application No. PCT/US2011/051018, filed on Sep. 9, 2011.

(60) Provisional application No. 61/476,492, filed on Apr. 18, 2011, provisional application No. 61/381,615, filed on Sep. 10, 2010.

(51) Int. Cl.
*B60W 10/02* (2006.01)
*F16H 3/72* (2006.01)
*F16H 47/04* (2006.01)
*F16D 33/00* (2006.01)

(52) U.S. Cl.
USPC ............. 477/5; 475/5; 475/83; 192/3.26

(58) Field of Classification Search
USPC ...... 475/5, 83; 477/5; 180/65.21; 192/3.25, 192/3.26, 3.27
See application file for complete search history.

(56) References Cited

U.S. PATENT DOCUMENTS 5,697,466 A    12/1997    Moroto et al.
5,735,770 A     4/1998    Omote et al.
(Continued)

FOREIGN PATENT DOCUMENTS

WO    WO 2010/056604 A2    5/2010
WO    WO 2011/056266 A1    5/2011
(Continued)

OTHER PUBLICATIONS

International Patent Application PCT/US2011/051018 International Search Report mailed Apr. 19, 2012.
(Continued)

*Primary Examiner* — Roger Pang
(74) *Attorney, Agent, or Firm* — Woodard, Emhardt, Moriarty, McNett & Henry LLP

(57) ABSTRACT

A hybrid system includes a hybrid module that is located between an engine and a transmission. The hybrid system includes an energy storage system for storing energy from and supplying energy to the hybrid module. An inverter transfers power between the energy storage system and the hybrid module. The hybrid system also includes a cooling system, a DC-DC converter, and a high voltage tap. The hybrid module is designed to recover energy, such as during braking, as well as power the vehicle. The hybrid module includes an electrical machine (eMachine) along with electrical and mechanical pumps for circulating fluid. A clutch provides the sole operative connection between the engine and the eMachine. The hybrid system further incorporates a power take off (PTO) unit that is configured to be powered by the engine and/or the eMachine.

70 Claims, 52 Drawing Sheets

(56) References Cited

U.S. PATENT DOCUMENTS

| | | |
|---|---|---|
| 5,789,823 A | 8/1998 | Sherman |
| 6,340,339 B1 | 1/2002 | Tabata et al. |
| 6,474,428 B1 | 11/2002 | Fujikawa et al. |
| 6,478,101 B1 | 11/2002 | Taniguchi et al. |
| 6,585,066 B1 | 7/2003 | Koneda et al. |
| 6,644,427 B2 | 11/2003 | Schulte |
| 6,777,837 B2 | 8/2004 | Tsuzuki et al. |
| 7,104,920 B2 | 9/2006 | Beaty et al. |
| 7,119,454 B1 | 10/2006 | Chiao |
| 7,163,072 B2 | 1/2007 | Yamaguchi |
| 7,231,994 B2 | 6/2007 | Buglione et al. |
| 7,509,802 B2 | 3/2009 | Hammond et al. |
| 7,578,363 B2 | 8/2009 | Kim |
| 7,679,238 B2 | 3/2010 | Nomura et al. |
| 7,802,667 B2 | 9/2010 | Raszkowski et al. |
| 8,327,986 B2 * | 12/2012 | Engelmann et al. .......... 192/3.26 |
| 2004/0195068 A1 | 10/2004 | Sudau |
| 2005/0206349 A1 | 9/2005 | Raszkowski et al. |
| 2005/0211479 A1 | 9/2005 | Tamor |
| 2006/0231306 A1 | 10/2006 | Severinsky et al. |
| 2006/0289209 A1 | 12/2006 | Grosspietsch et al. |
| 2007/0049445 A1 | 3/2007 | Reisch et al. |
| 2007/0246274 A1 * | 10/2007 | Dreibholz et al. ............ 180/65.2 |
| 2008/0023287 A1 * | 1/2008 | Thiede et al. ................. 192/48.1 |
| 2008/0060859 A1 | 3/2008 | Klemen et al. |
| 2008/0099258 A1 | 5/2008 | Berhan |
| 2009/0071784 A1 * | 3/2009 | Combs et al. ................. 192/3.21 |
| 2009/0111643 A1 | 4/2009 | Sah et al. |
| 2010/0038201 A1 * | 2/2010 | Mueller et al. ............... 192/3.29 |
| 2010/0105518 A1 * | 4/2010 | Kasuya et al. ..................... 477/5 |
| 2010/0173745 A1 * | 7/2010 | Hase et al. ......................... 477/5 |
| 2010/0224429 A1 * | 9/2010 | Akiyama ................... 180/65.22 |
| 2011/0087393 A1 * | 4/2011 | Verbrugge et al. ............... 701/22 |
| 2011/0118079 A1 * | 5/2011 | Mueller et al. ..................... 477/5 |
| 2011/0224858 A1 | 9/2011 | Bissontz |
| 2011/0231045 A1 | 9/2011 | Bissontz |
| 2011/0231046 A1 | 9/2011 | Bissontz |

FOREIGN PATENT DOCUMENTS

| | | |
|---|---|---|
| WO | WO 2011/056276 A1 | 5/2011 |
| WO | WO 2011/056277 A1 | 5/2011 |
| WO | WO 2011/075143 A1 | 6/2011 |

OTHER PUBLICATIONS

International Patent Application PCT/US2011/051018 Written Opinion mailed Apr. 19, 2012.

* cited by examiner

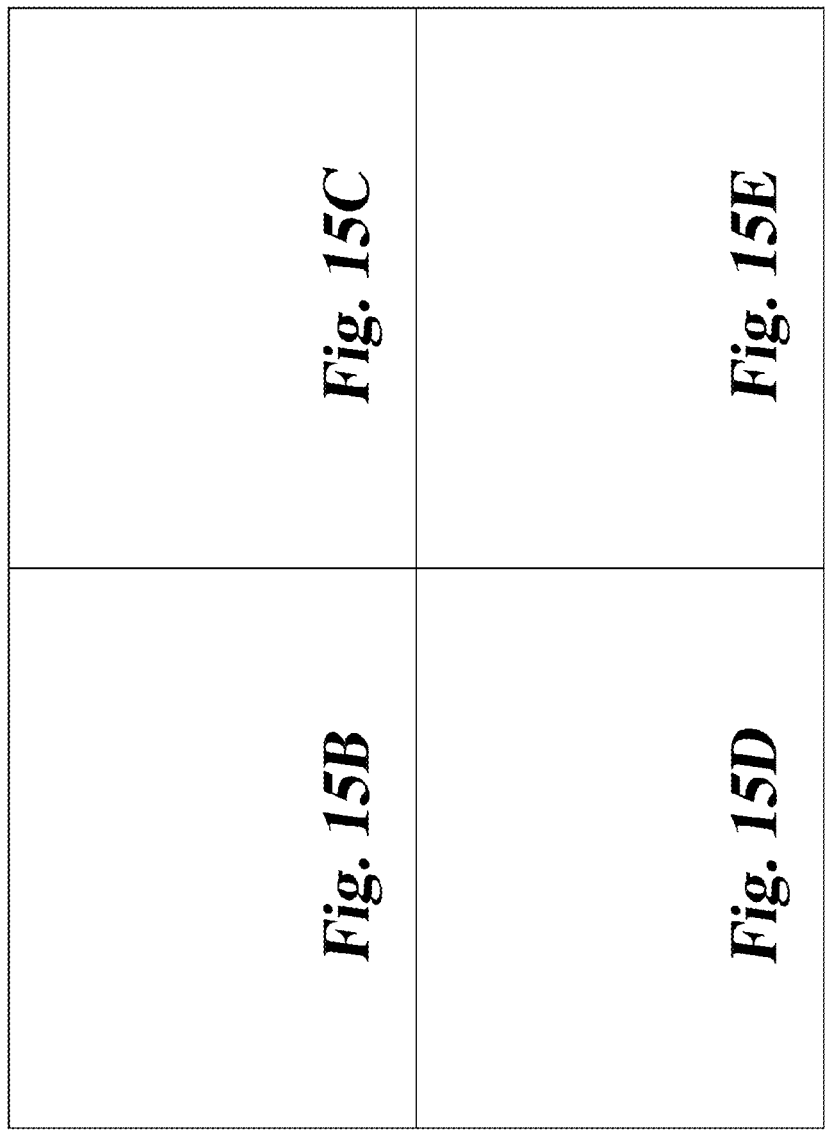

HYBRID SYSTEM

CROSS REFERENCE TO RELATED APPLICATIONS

This application is a continuation of International Patent Application No. PCT/US2011/051018 filed Sep. 9, 2011, which claims the benefit of U.S. Provisional Patent Application No. 61/476,492 filed Apr. 18, 2011, which are hereby incorporated by reference. International Patent Application No. PCT/US2011/051018 filed Sep. 9, 2011, claims the benefit of U.S. Provisional Patent Application No. 61/381,615 filed Sep. 10, 2010, which are hereby incorporated by reference.

BACKGROUND

With the growing concern over global climate change as well as oil supplies, there has been a recent trend to develop various hybrid systems for motor vehicles. While numerous hybrid systems have been proposed, the systems typically require significant modifications to the drive trains of the vehicles. These modifications make it difficult to retrofit the systems to existing vehicles. Moreover, some of these systems have a tendency to cause significant power loss, which in turn hurts the fuel economy for the vehicle.

Thus, there is a need for improvement in this field.

SUMMARY

The hybrid system described herein addresses several of the issues mentioned above as well as others. For example, the hybrid system is designed to be easily retrofitted to existing drive train designs, if so desired. The hybrid system has a compact design that allows it to be readily fitted in between the engine and the transmission without significant modifications. Moreover, the hybrid system is generally a self-contained and self-sufficient system which is able to function without the need to significantly drain resources from other systems in the vehicle. This self-sufficient design in turn reduces the amount of modifications needed for other systems, such as the transmission and lubrication systems, because the capacities of the other systems do not need to be increased in order to compensate for the increased workload created by the hybrid system. For instance, the hybrid system incorporates its own lubrication and cooling systems that are able to operate independently of the transmission and the engine. The fluid circulation system includes a mechanical pump for circulating a fluid, which can act as a lubricant, hydraulic fluid, and/or coolant, along with an electrical pump that supplements workload for the mechanical pump when needed. As will be explained in further detail below, this dual mechanical/electrical pump system helps to reduce the size and weight of the required mechanical pump, and if desired, also allows the system to run in a complete electrical mode in which the electric pump solely circulates the fluid.

As will be appreciated from the description below, the hybrid system incorporates several features that help to streamline assembly and installation of the system. The hybrid system includes a number of major subcomponents that will be discussed in view of the overall system. For instance, the system includes a hybrid module that has an electrical machine (eMachine), a mechanical pressure pump along with an electrical pressure/flow pump, a disconnection clutch, and a sump module. The system further includes an interface, a water-ethylene-glycol (WEG)-to-air/oil-to-air cooling system, a transmission and hybrid control module, an inverter, an energy storage system, and DC-DC converters. Of course, the system includes other ancillary components that will be described as well.

The hybrid module is connected to an engine through a flywheel and an input drive disc that has a spline connection to an input shaft. This spline connection simplifies the connection between the hybrid module and the engine. Without the spline connection, both the engine and hybrid module would need to be indexed so as to facilitate bolting of the two components together. The input shaft is likewise connected to a clutch hub through a spline connection, which in turn allows the input shaft to be removed from the hybrid module to facilitate servicing. That is, the entire hybrid module does not need to be disassembled to allow for the removal, repair, and/or replacement of the input shaft or other components. The clutch hub in turn is connected to the input drive clutch, which is likewise secured to a rotor of the eMachine. The hybrid module includes an eMachine that includes a stator fixed to the outer housing along with the rotor that is attached to a rotor hub.

The rotor hub in turn is attached to a torque converter through a converter drive adapter ring. The adapter ring creates a spline-type connection between the rotor hub and the torque converter. This spline connection in turn allows the hybrid module to be assembled to the torque converter and transmission without the need for indexing the torque converter. The adapter ring is designed to be bolted to the same bolt openings used when the engine is directly coupled to the torque converter in conventional, non-hybrid arrangements (i.e., without the hybrid module). Differently sized and/or shaped adapter rings can be used so that different hybrid module-transmission combinations can be used. This helps to reduce the cost of retrofitting the hybrid system to different transmission designs. For example, through the use of different adapter rings, the same type of hybrid module can be installed on the torque converters of transmissions with different overall sizes and/or shapes. Conversely, depending on the operational demands, differently configured hybrid modules can be inexpensively connected to the same type of transmission systems.

As noted before, the input shaft has a spline-type connection with both the engine and the clutch hub, which in turn simplifies installation of the hybrid module as well as removal of the input shaft for servicing. While this configuration is helpful, it can lead to the clutch hub slipping out of the hybrid module during assembly. To address this issue, the rotor hub incorporates a stop flange that prevents the clutch hub from slipping off the input shaft when the hybrid module is turned on its end, for example.

In this hybrid design, the clutch provides the sole operative connection between the internal combustion engine and the torque converter or eMachine. That is, the clutch needs to be engaged in order to transfer power from the internal combustion engine to the torque converter or eMachine. The clutch itself is located radially inward relative to the rotor of the eMachine to provide a compact design along the longitudinal axis of the drive train. This compact design reduces the space needed for the hybrid module between the torque converter and the engine. The length of the vehicle driveshaft can be readily shortened so as to accommodate the hybrid module.

The compact design of the hybrid module has placed demands and constraints on a number of its subcomponents, such as its hydraulics and the clutch. To provide an axially compact arrangement, the piston for the clutch has a recess in order to receive a piston spring that returns the piston to a normally disengaged position. The recess for the spring in the piston creates an imbalance in the opposing surface areas of the piston. This imbalance is exacerbated by the high centrifugal forces that cause pooling of the fluid, which acts as the hydraulic fluid for the piston. As a result, a nonlinear relationship for piston pressure is formed that makes accurate piston control extremely difficult. To address this issue, the piston has an offset section so that both sides of the piston have the same area and diameter. With the areas being the same, the operation of the clutch can be tightly and reliably controlled. The hydraulics for the clutch also incorporate a spill over feature that reduces the risk of hydrostatic lock, while at the same time ensures proper filling and lubrication.

In addition to acting as the hydraulic fluid for the clutch, the fluid also acts as a coolant for the eMachine as well as other components. The hybrid module includes a sleeve that defines a fluid channel that encircles the eMachine for cooling purposes. The sleeve has a number of spray channels that spray the fluid from the fluid channel onto the windings of the stator, thereby cooling the windings, which tend to generally generate the majority of the heat for the eMachine. The fluid has a tendency to leak from the hybrid module and around the torque converter. To prevent power loss of the torque converter, the area around the torque converter should be relatively dry, that is, free from the fluid. To keep the fluid from escaping and invading the torque converter, the hybrid module includes a dam and slinger arrangement. Specifically, the hybrid module has an impeller blade that propels the fluid back into the eMachine through a window or opening in a dam member. Subsequently, the fluid is then drained into the sump so that it can be recirculated.

The hybrid module has a number of different operational modes. During the start mode, the battery supplies power to the eMachine as well as to the electrical pump. Once the pump achieves the desired oil pressure, the clutch piston is stroked to apply the clutch. With the clutch engaged, the eMachine applies power to start the engine. During the electro-propulsion only mode the clutch is disengaged, and only the eMachine is used to power the torque converter. In the propulsion assist mode, the engine's clutch is engaged, and the eMachine acts as a motor in which both the engine and eMachine drive the torque converter. While in a propulsion-charge mode, the clutch is engaged, and the internal combustion engine solely drives the vehicle. The eMachine is operated in a generator mode to generate electricity that is stored in the energy storage system. The hybrid module can also be used to utilize regenerative braking (i.e., regenerative charging). During regenerative braking, the engine's clutch is disengaged, and the eMachine operates as a generator to supply electricity to the energy storage system. The system is also designed for engine compression braking, in which case the engine's clutch is engaged, and the eMachine operates as a generator as well.

In addition, the system is also designed to utilize both power takeoff (PTO) and electric PTO (ePTO) modes in order to operate ancillary equipment such as cranes, refrigeration systems, hydraulic lifts, and the like. In a normal PTO mode, the clutch and the PTO system are engaged, and the internal combustion engine is then used to power the ancillary equipment. In an ePTO state, the clutch is disengaged and the eMachine acts as a motor to power the ancillary equipment via the PTO. While in the PTO or ePTO operational modes, the transmission can be in neutral or in gear, depending on the requirements.

Further forms, objects, features, aspects, benefits, advantages, and embodiments of the present invention will become apparent from a detailed description and drawings provided herewith.

BRIEF DESCRIPTION OF THE DRAWINGS

FIGS. 15 and 15A-E show a wiring diagram for the electrical system in the hybrid system. FIG. 15 shows the overall wiring diagram for the electrical system in the hybrid system.

FIG. 15A is a diagram that shows the arrangement of the enlarged views from FIG. 15 depicted in FIGS. 15B, C, D, and E.

DETAILED DESCRIPTION

Figure 1:
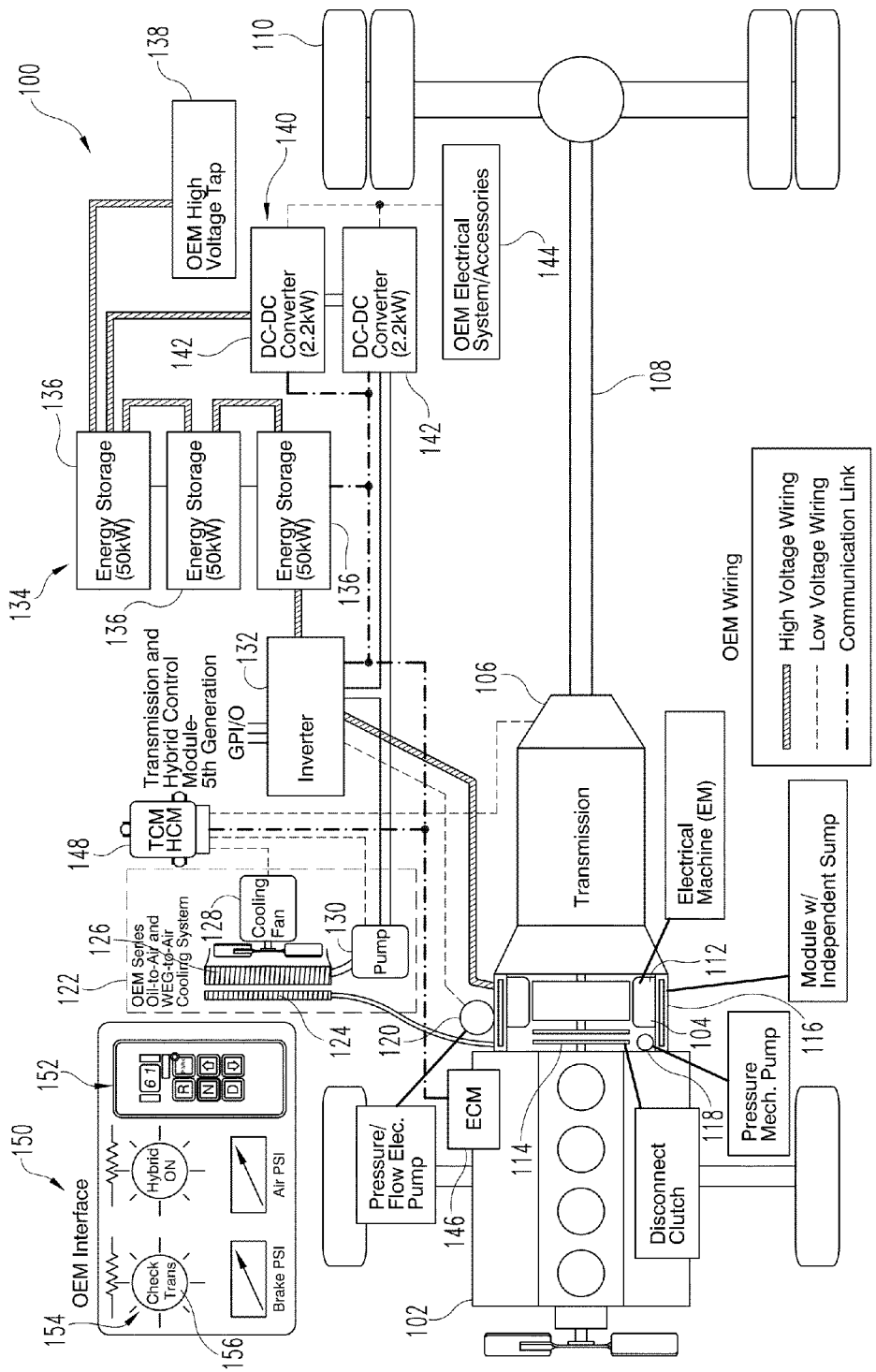
FIG. 1 illustrates a diagrammatic view of one example of a hybrid system.

For the purpose of promoting an understanding of the principles of the invention, reference will now be made to the embodiments illustrated in the drawings, and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features not relevant to the present invention may not be shown for the sake of clarity.

With respect to the specification and claims, it should be noted that the singular forms "a", "an", "the", and the like include plural referents unless expressly discussed otherwise. As an illustration, references to "a device" or "the device" include one or more of such devices and equivalents thereof. It also should be noted that directional terms, such as "up", "down", "top", "bottom", and the like, are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will first appear in FIG. 1, an element identified by a "200" series reference numeral will first appear in FIG. 2, and so on.

FIG. 1 shows a diagrammatic view of a hybrid system 100 according to one embodiment. The hybrid system 100 illustrated in FIG. 1 is adapted for use in commercial-grade trucks as well as other types of vehicles or transportation systems, but it is envisioned that various aspects of the hybrid system 100 can be incorporated into other environments. As shown, the hybrid system 100 includes an engine 102, a hybrid module 104, an automatic transmission 106, and a drive train 108 for transferring power from the transmission 106 to wheels 110. The hybrid module 104 incorporates an electrical machine, commonly referred to as an eMachine 112, and a clutch 114 that operatively connects and disconnects the engine 102 from the eMachine 112 and the transmission 106.

The hybrid module 104 is designed to operate as a self-sufficient unit, that is, it is generally able to operate independently of the engine 102 and transmission 106. In particular, its hydraulics, cooling and lubrication do not directly rely upon the engine 102 and the transmission 106. The hybrid module 104 includes a sump 116 that stores and supplies fluids, such as oil, lubricants, or other fluids, to the hybrid module 104 for hydraulics, lubrication, and cooling purposes. While the terms oil or lubricant will be used interchangeably herein, these terms are used in a broader sense to include various types of lubricants, such as natural or synthetic oils, as well as lubricants having different properties. To circulate the fluid, the hybrid module 104 includes a mechanical pump 118 and an electrical (or electric) pump 120. With this combination of both the mechanical pump 118 and electrical pump 120, the overall size and, moreover, the overall expense for the pumps is reduced. The electrical pump 120 can supplement mechanical pump 118 to provide extra pumping capacity when required. In addition, it is contemplated that the flow through the electrical pump 120 can be used to detect low fluid conditions for the hybrid module 104. In one example, the electrical pump 120 is manufactured by Magna International Inc. of Aurora, Ontario, Canada (part number 29550817), but it is contemplated that other types of pumps can be used.

The hybrid system 100 further includes a cooling system 122 that is used to cool the fluid supplied to the hybrid module 104 as well as the water-ethylene-glycol (WEG) to various other components of the hybrid system 100 which will be described later in further detail. In one variation, the WEG can also be circulated through an outer jacket of the eMachine 112 in order to cool the eMachine 112. It should be noted that the hybrid system 100 will be described with respect to a WEG coolant, but other types of antifreezes and cooling fluids, such as water, alcohol solutions, etc., can be used. Looking at FIG. 1, the cooling system 122 includes a fluid radiator 124 that cools the fluid for the hybrid module 104. The cooling system 122 further includes a main radiator 126 that is configured to cool the antifreeze for various other components in the hybrid system 100. Usually, the main radiator 126 is the engine radiator in most vehicles, but the main radiator 126 does not need to be the engine radiator. A cooling fan 128 flows air through both fluid radiator 124 and main radiator 126. A circulating or coolant pump 130 circulates the antifreeze to the main radiator 126. It should be recognized that other various components besides the ones illustrated can be cooled using the cooling system 122. For instance, the transmission 106 and/or the engine 102 can be cooled as well via the cooling system 122.

The eMachine 112 in the hybrid module 104, depending on the operational mode, at times acts as a generator and at other times as a motor. When acting as a motor, the eMachine 112 draws alternating current (AC). When acting as a generator, the eMachine 112 creates AC. An inverter 132 converts the AC from the eMachine 112 and supplies it to an energy storage system 134. The eMachine 112 in one example is an HVH410 series electric motor manufactured by Remy International, Inc. of Pendleton, Ind., but it is envisioned that other types of eMachines can be used. In the illustrated example, the energy storage system 134 stores the energy and resupplies it as direct current (DC). When the eMachine 112 in the hybrid module 104 acts as a motor, the inverter 132 converts the DC power to AC, which in turn is supplied to the eMachine 112. The energy storage system 134 in the illustrated example includes three energy storage modules 136 that are daisy-chained together to supply high voltage power to the inverter 132. The energy storage modules 136 are, in essence, electrochemical batteries for storing the energy generated by the eMachine 112 and rapidly supplying the energy back to the eMachine 112. The energy storage modules 136, the inverter 132, and the eMachine 112 are operatively coupled together through high voltage wiring as is depicted by the line illustrated in FIG. 1. While the illustrated example shows the energy storage system 134 including three energy storage modules 136, it should be recognized that the energy storage system 134 can include more or less energy storage modules 136 than is shown. Moreover, it is envisioned that the energy storage system 134 can include any system for storing potential energy, such as through chemical means, pneumatic accumulators, hydraulic accumulators, springs, thermal storage systems, flywheels, gravitational devices, and capacitors, to name just a few examples. High voltage wiring connects the energy storage system 134 to a high voltage tap 138.

The high voltage tap 138 supplies high voltage to various components attached to the vehicle. A DC-DC converter system 140, which includes one or more DC-DC converter modules 142, converts the high voltage power supplied by the energy storage system 134 to a lower voltage, which in turn is supplied to various systems and accessories 144 that require lower voltages. As illustrated in FIG. 1, low voltage wiring connects the DC-DC converter modules 142 to the low voltage systems and accessories 144.

The hybrid system 100 incorporates a number of control systems for controlling the operations of the various components. For example, the engine 102 has an engine control module 146 that controls various operational characteristics of the engine 102 such as fuel injection and the like. A transmission/hybrid control module (TCM/HCM) 148 substitutes for a traditional transmission control module and is designed to control both the operation of the transmission 106 as well as the hybrid module 104. The transmission/hybrid control module 148 and the engine control module 146 along with the inverter 132, energy storage system 134, and DC-DC converter system 140 communicate along a communication link as is depicted in FIG. 1.

To control and monitor the operation of the hybrid system 100, the hybrid system 100 includes an interface 150. The interface 150 includes a shift selector 152 for selecting whether the vehicle is in drive, neutral, reverse, etc., and an instrument panel 154 that includes various indicators 156 of the operational status of the hybrid system 100, such as check transmission, brake pressure, and air pressure indicators, to name just a few.

As noted before, the hybrid system 100 is configured to be readily retrofitted to existing vehicle designs with minimal impact to the overall design. All of the systems including, but not limited to, mechanical, electrical, cooling, controls, and hydraulic systems, of the hybrid system 100 have been configured to be a generally self-contained unit such that the remaining components of the vehicle do not need significant modifications. The more components that need to be modified, the more vehicle design effort and testing is required, which in turn reduces the chance of vehicle manufacturers adopting newer hybrid designs over less efficient, preexisting vehicle designs. In other words, significant modifications to the layout of a preexisting vehicle design for a hybrid retrofit requires, then, vehicle and product line modifications and expensive testing to ensure the proper operation and safety of the vehicle, and this expenses tends to lessen or slow adoption of hybrid systems. As will be recognized, the hybrid system 100 not only incorporates a mechanical architecture that minimally impacts the mechanical systems of pre-existing vehicle designs, but the hybrid system 100 also incorporates a control/electrical architecture that minimally impacts the control and electrical systems of pre-existing vehicle designs.

Figure 2:
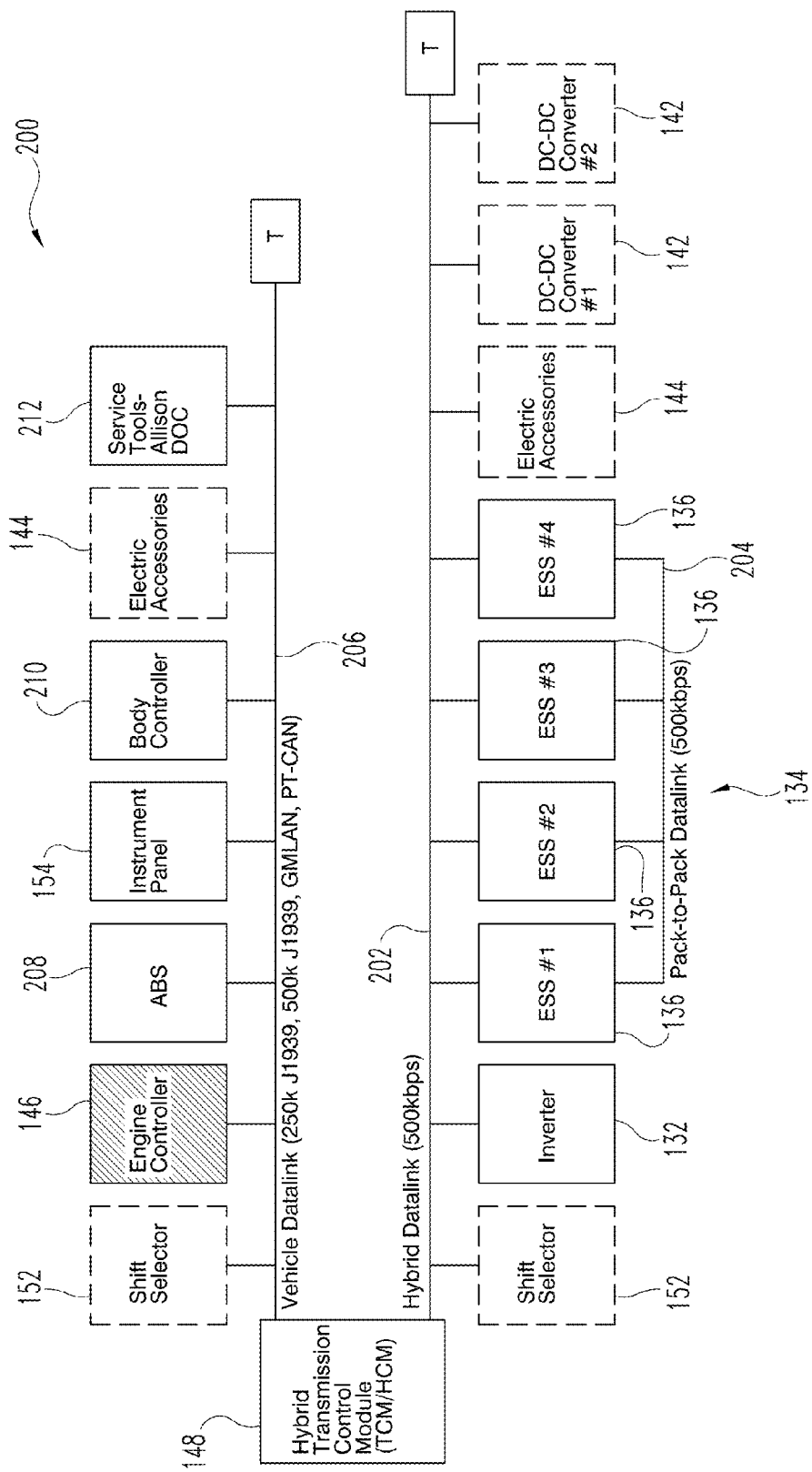
FIG. 2 illustrates a general diagram of an example communication system that can be incorporated into the FIG. 1 hybrid system.

FIG. 2 shows a diagram of one example of a communication system 200 that can be used in the hybrid system 100. While one example is shown, it should be recognized that the communication system 200 in other embodiments can be configured differently than is shown. The communication system 200 is configured to minimally impact the control and electrical systems of the vehicle. To facilitate retrofitting to existing vehicle designs, the communication system 200 includes a hybrid data link 202 through which most of the various components of the hybrid system 100 communicate. In particular, the hybrid data link 202 facilitates communication between the transmission/hybrid control module 148 and the shift selector 152, inverter 132, the energy storage system 134, the low voltage systems/accessories 144, and the DC-DC converter modules 142. Within the energy storage system 134, an energy storage system data link 204 facilitates communication between the various energy storage modules 136. However, it is contemplated that in other embodiments the various energy storage system modules 136 can communicate with one another over the hybrid data link 202. With the hybrid data link 202 and the energy storage data link 204 being separate from the data links used in the rest of the vehicle, the control/electrical component of the hybrid system 100 can be readily tied into the vehicle with minimum impact. In the illustrated example, the hybrid data link 202 and the energy storage system data link 204 each have a 500 kilobit/second (kbps) transmission rate, but it is envisioned that data can be transferred at other rates in other examples. Other components of the vehicle communicate with the transmission/hybrid control module 148 via a vehicle data link 206. In particular, the shift selector 152, the engine control module 146, the instrument panel 154, an antilock braking system 208, a body controller 210, the low voltage systems/accessories 144, and service tools 212 are connected to the vehicle data link 206. For instance, the vehicle data link 206 can be a 250 k J1939-type data link, a 500 k J1939-type data link, a General Motors LAN, or a PT-CAN type data link, just to name a few examples. All of these types of data links can take any number of forms such as metallic wiring, optical fibers, radio frequency, and/or a combination thereof, just to name a few examples.

Figure 3:
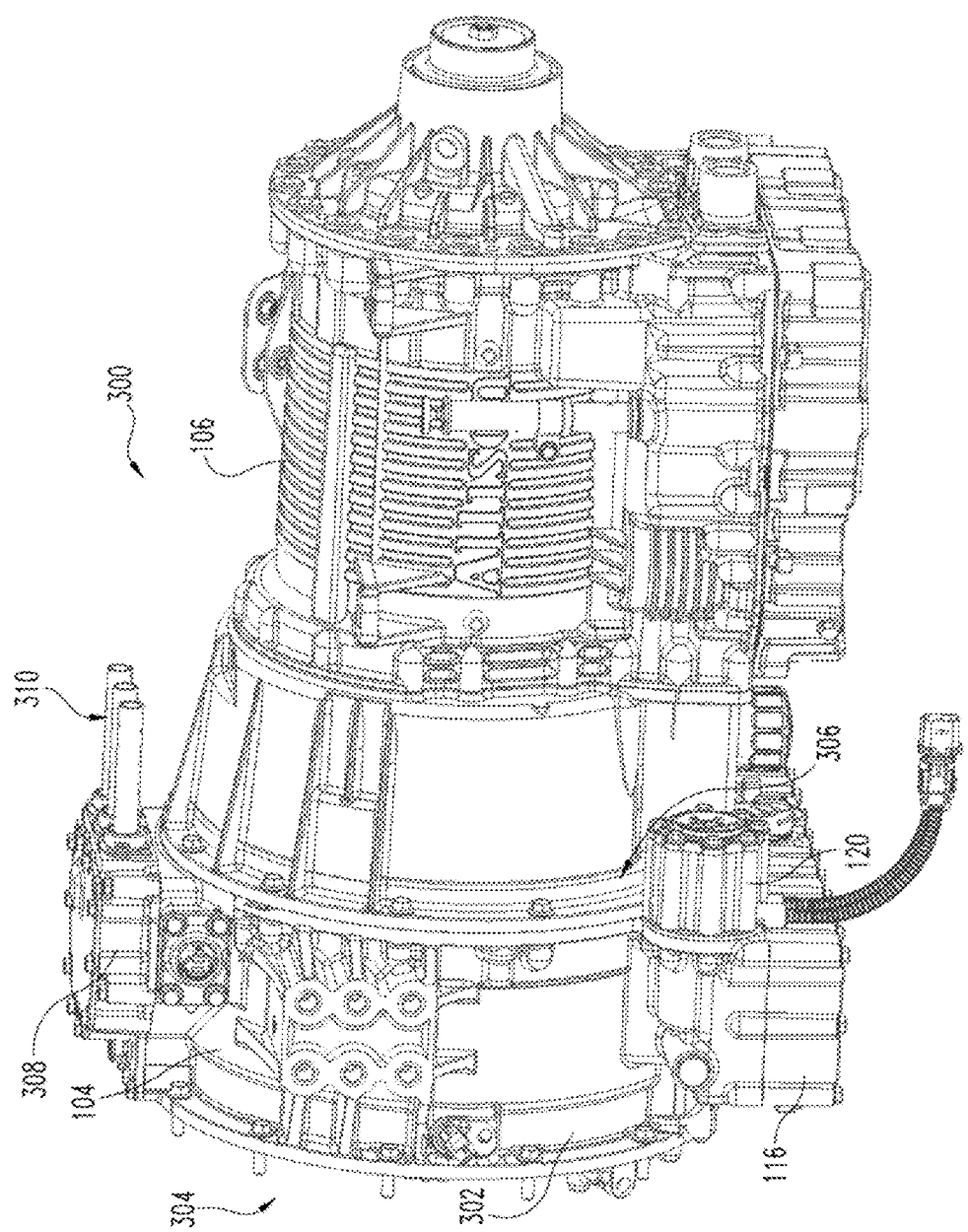
FIG. 3 is a perspective view of a hybrid module coupled to a transmission that is used in the FIG. 1 hybrid system.
Figure 4:
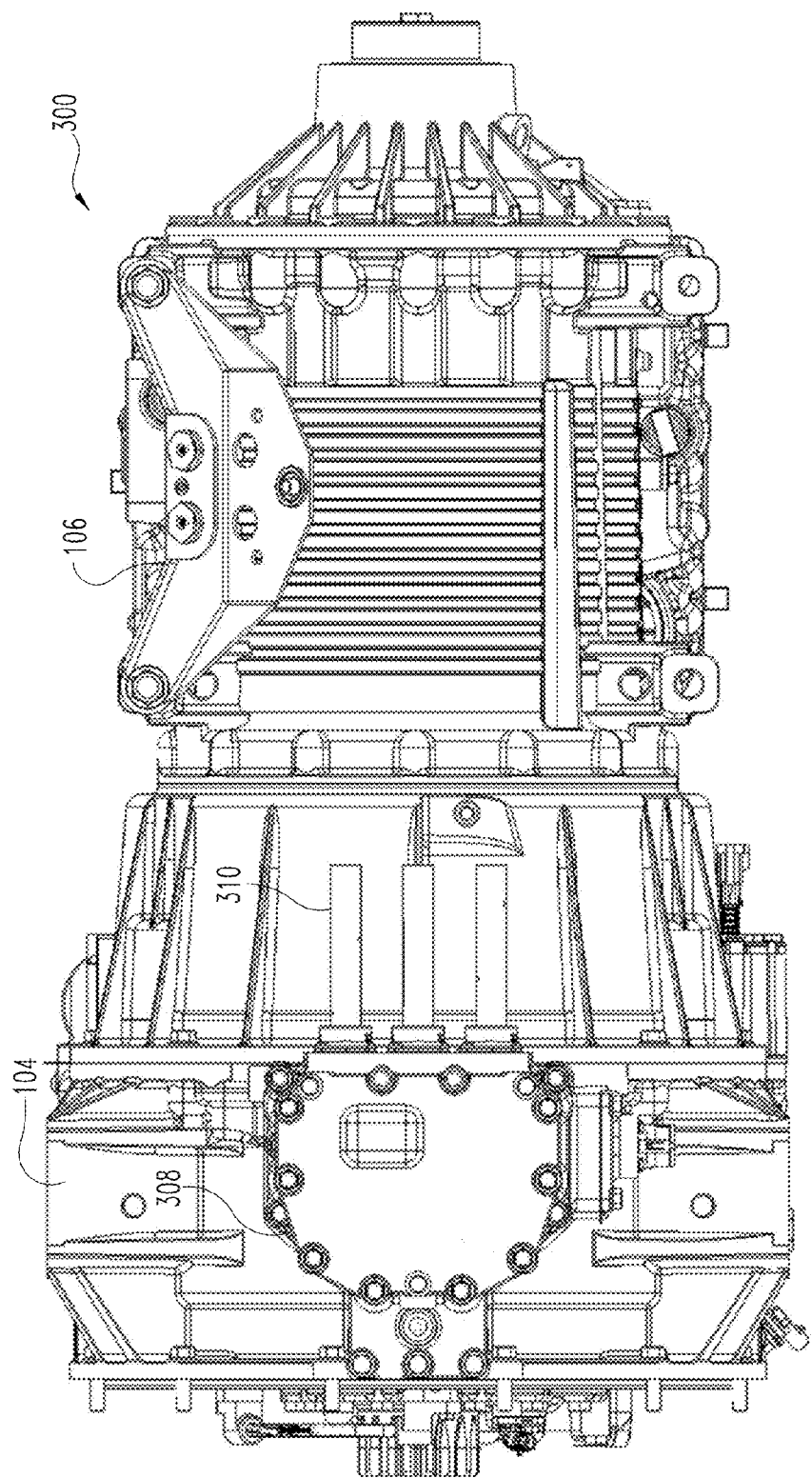
FIG. 4 is a top view of the FIG. 3 hybrid module-transmission subassembly.

Turning now to some of the mechanical structures, FIG. 3 illustrates a perspective view of the hybrid module 104 attached to the automatic transmission 106 to form a hybrid module-transmission subassembly 300, and FIG. 4 shows a top view of the subassembly 300. As can be seen in FIG. 3, the hybrid module 104 includes a hybrid module housing 302 that has an engine engagement side 304 where the hybrid module 104 engages the engine 102 and a transmission engagement side 306 where the hybrid module 104 engages the automatic transmission 106. Referring to FIGS. 1 and 3, the hybrid module 104 further includes a high voltage connector box 308 in which high voltage wires 310 from the inverter 132 are received. The three-phase alternating current is transmitted via the high voltage wires 310 to the high voltage connector box 308.

The hybrid module 104 is constructed so as to fit between the engine 102 and the automatic transmission 106 without any significant modification to the overall vehicular design. In essence, the drive shaft of the vehicle is simply shortened, and the hybrid module 104 is inserted between the engine 102 and the automatic transmission 106, thereby filling the space in between where the once longer driveshaft occupied. With that said, the hybrid module 104 is designed specifically to have a compact design so as to be easily retrofitted into existing vehicle designs. Moreover, the hybrid module 104 as well as the rest of the components are designed to be easily assembled and retrofitted to a preexisting automatic transmission 106. As noted before, the hybrid module 104 is also designed to be a self-contained/self-sufficient unit in which it is able to function without draining resources from other systems in the vehicle. For instance, the lubrication and cooling system for the hybrid module 104 generally operates independent of the engine 102 and the automatic transmission 106. As such, it gives the hybrid module 104 greater flexibility in its various operational modes. This self-sufficient design in turn reduces the amount of modifications needed for other systems, such as the transmission 106, because the capacities of the other systems do not need to be increased in order to compensate for the increased workload created by the hybrid module 104. As one example, looking at FIG. 3, the hybrid module 104 has the sump 116 that is independent of the sump for the automatic transmission 106. The electrical pump 120 supplements the mechanical pump 118, which will be described later with respect to FIG. 5, in order to pump fluid through the hybrid module 104.

Figure 5:
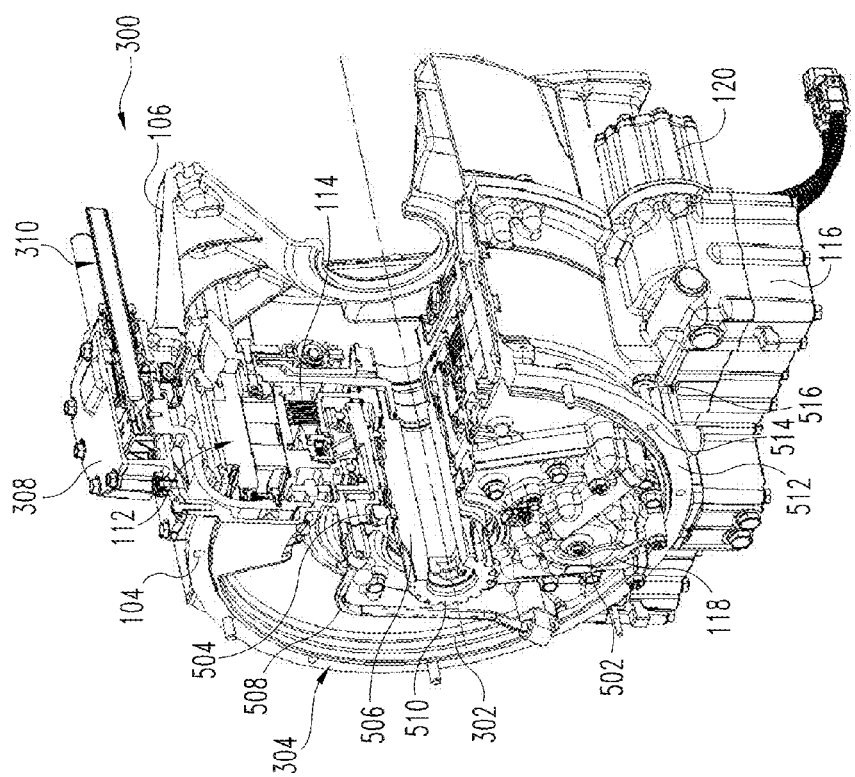
FIG. 5 is a perspective, partial cross-sectional view of the hybrid module-transmission subassembly illustrated in FIG. 3.

FIG. 5 shows a front, perspective view that includes a partial cross section through the hybrid module 104 from the perspective of the engine engagement side 304 of the hybrid module 104. On the engine engagement side 304, the hybrid module 104 has the mechanical pump 118 with a pump housing 502 that is secured to the hybrid module housing 302. A pump drive gear 504 which is secured to an input shaft 506 is used to drive the mechanical pump 118. The drive gear 504 in one example is secured to the input shaft 506 via a snap ring and key arrangement, but it is contemplated that the drive gear 504 can be secured in other manners. The mechanical pump 118 in conjunction with the electrical pump 120 supplies fluid for lubrication, hydraulics, and/or cooling purposes to the hybrid module 104. By incorporating the electrical pump 120 in conjunction with the mechanical pump 118, the mechanical pump 118 can be sized smaller, which in turn reduces the required space it occupies as well as reduces the cost associated with the mechanical pump 118. Moreover, the electrical pump 120 facilitates lubrication even when the engine 102 is off. This in turn facilitates electric-only operating modes as well as other modes of the hybrid system 100. Both the mechanical pump 118 and the electrical pump 120 recirculate fluid from the sump 116. The fluid is then supplied to the remainder of the hybrid module 104 via holes, ports, openings and other passageways traditionally found in transmissions for circulating oil and other fluids. A clutch supply port 508 supplies oil that hydraulically applies or actuates the clutch 114. In the illustrated embodiment, the clutch supply port 508 is in the form of a tube, but is envisioned it can take other forms, such as integral passageways within the hybrid module 104, in other examples.

As mentioned before, the hybrid module 104 is designed to be easily assembled to both the engine 102 and the automatic transmission 106. To facilitate a relatively easy connection to the engine 102, the input shaft 506 at the engine engagement side 304 has a series of splines 510 that are adapted to engage an input drive disc of the engine 102. The splines 510 reduce the need for reorienting the crankshaft of the engine 102 in order to secure the hybrid module 104 to the engine 102 in the manner of a conventional bolt joint flex plate drive system. The input shaft 506 is also configured to be able to be slid out of the hybrid module 104 for facilitating servicing of the input shaft 506 as well as components associated with the input shaft 506. To further secure the hybrid module 104 to the engine 102, the hybrid module housing 302 has an engine flange 512 with bolt openings 514 in which bolts 516 are used to secure the hybrid module 104 to the engine 102.

Figure 6:
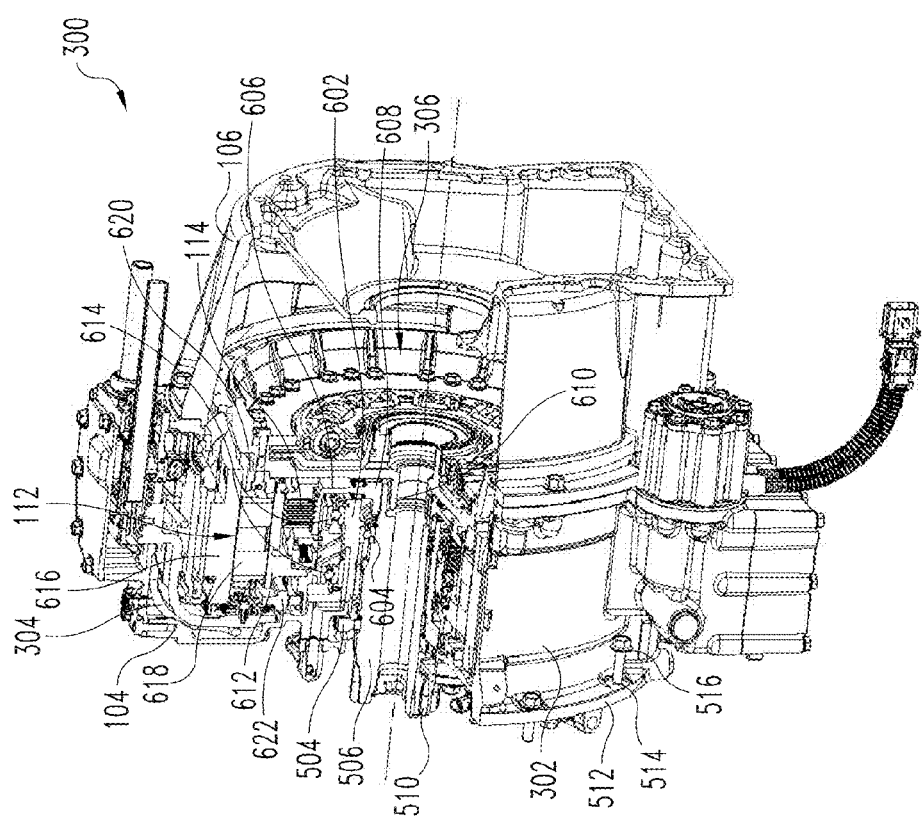
FIG. 6 is a rear perspective, partial cross-sectional view of the hybrid module-transmission subassembly illustrated in FIG. 3.

FIG. 6 illustrates a rear, perspective view which includes a partial cross section through the hybrid module 104 when attached to the transmission 106 from the perspective of the transmission engagement side 306 of the hybrid module 104. To provide a compact design, the various components of the hybrid module 104 have a generally radial orientation rather than a linear-type offset. This compact radial design helps the hybrid module 104 to fit in between the engine 102 and the automatic transmission 106 without any significant modification to either the engine 102 or the automatic transmission 106. The various components of the hybrid module 104 will be mainly described starting from the center of the hybrid module 104 and working outwards. Generally, this description will follow the power transmission path from the engine 102 to the transmission 106. Turning to FIG. 6, the input shaft 506 is received inside a ground sleeve 602, which is secured to the hybrid module housing 302. Generally speaking, the ground sleeve 602 is oriented in a fixed axial location relative to the input shaft 506. An input shaft bearing 604 is located between the ground sleeve 602 and the input shaft 506 so as to allow the input shaft 506 to rotate relative to the ground sleeve 602. The input shaft bearing 604 is in the form of a roller or ball bearing configuration, but it is envisioned in other examples a different construction can be used. Among its many functions, the ground sleeve 602 includes various passages and ports for delivering fluid from the pumps to the various components inside the hybrid module for clutch control, lubrication and/or cooling purposes.

At the transmission engagement side 306, the hybrid module 104 has a clutch hub 606 with a splined opening 608 configured to engage splines 610 on the input shaft 506. The fluid from the ground sleeve 602 also facilitates actuation of the clutch 114. This splined connection between the input shaft 506 and the clutch hub 606 allows the input shaft 506 to be slid out of the hybrid module 104 to facilitate servicing. That is, the entire hybrid module 104 does not need to be disassembled to allow for the removal, repair, and/or replacement of the input shaft 506 or other components disposed along (or attached to) the input shaft 506. As can be seen, the clutch 114 is operatively located between the clutch hub 606 and a rotor hub 612. When the clutch 114 is engaged or activated, the clutch 114 causes the rotor hub 612 to rotate in unison with the clutch hub 606, thereby transferring the torque from the input shaft 506 to the rotor hub 612. The rotor hub 612 is able to rotate relative to the ground sleeve 602 via a pair of rotor hub bearings 614 that are disposed between the rotor hub 612 and the ground sleeve 602.

With continued reference to FIG. 6, the eMachine 112 includes a stator 616 that is fixed relative to the hybrid module housing 302 and a rotor 618 that is secured to the rotor hub 612 so as to rotate relative to the stator 616. As will be explained in greater detail below, the eMachine 112 has a number of operational modes in which it can either act as an electric motor or as an electric generator, depending on the circumstances. To form a mechanical connection between the rotor hub 612 and the torque converter of the automatic transmission 106, the hybrid module 104 includes an adapter ring 620 that is bolted to the location where the normal connection between the engine 102 and the torque converter is made. The adapter ring 620 forms a spline-type connection with the rotor hub 612 so that the hybrid module 104 can easily be slid into place to form a connection with the transmission 106, thereby avoiding any type of indexing issues. As noted before, the adapter ring 620 is designed to be bolted to the same bolt openings in the torque converter used when the engine 102 is directly coupled to the torque converter in conventional, non-hybrid arrangements (i.e., without the hybrid module 104). Differently sized and/shaped adapter rings 620 can be used so that different hybrid module-transmission combinations can be used. This helps to reduce the cost of retrofitting the hybrid system 100 to different transmission designs. For example, using different adapter rings 620, the same type of hybrid module 104 can be installed on the torque converters of transmissions 106 with different overall sizes and/or shapes. Conversely, depending on the operational demands, differently configured hybrid modules 104 can be inexpensively connected to the same type of transmission systems.

Figure 7:
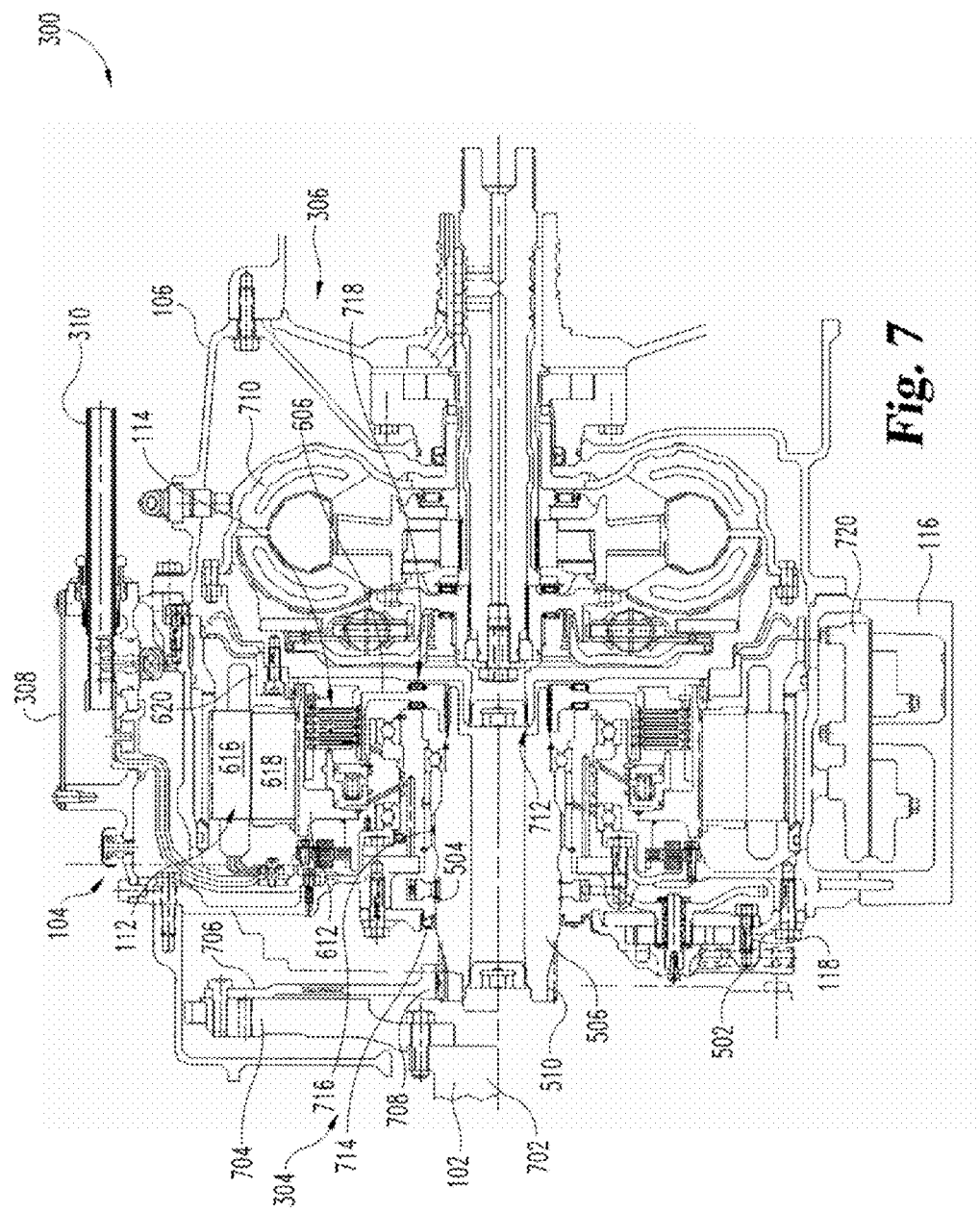
FIG. 7 is a cross-sectional view of the hybrid module-transmission subassembly illustrated in FIG. 3.

FIG. 7 illustrates a cross-sectional view of the hybrid module 104 when attached between the engine 102 and the transmission 106. The engine 102 has a drive shaft 702 to which a flywheel 704 is bolted. An input drive disc 706 is in turn bolted to the flywheel 704, as is shown. The input drive disc 706 has a splined opening 708 configured to engage the splines 510 on the input shaft 506 of the hybrid module 104. With this connection, the engine 102 is able to transmit power to the hybrid module 104. As mentioned before, the clutch 114 is engaged to transmit the power from the engine 102 to the transmission 106 and/or eMachine 112 via the input shaft 506. Specifically, the hybrid module 104 is secured to a torque converter 710 in the transmission 106 via the adapter ring 620. As can be seen, the adapter ring 620 is bolted to the torque converter 710 at standard bolt locations. As noted before, the adapter ring 620 can be modified to facilitate attachment of the hybrid module 104 to various types of torque converters 710 at the standard bolt locations on the torque converters 710. This minimizes the amount of retrofitting that needs to occur. Once secured, a splined connection is formed between the adapter ring 620 and the rotor hub 612. At the transmission engagement side 306, specifically at the interface between the hybrid module 104 and the transmission 106, the input shaft 506 has a recess 712 to receive a protruding portion of the transmission 106. This in turn helps the hybrid module 104 to fit in the tight space between the engine 102 and the transmission 106.

The hybrid module 104 has a number of seals that reduce contamination as well as reduces fluid loss. For instance, as is shown in FIG. 7, the hybrid module 104 has a seal 714, near the pump drive gear 504 to minimize fluid contamination and infiltration. Farther down the input shaft 506, the hybrid module 104 has a bushing 716 disposed between the input shaft 506 and the ground sleeve 602. A pair of roller thrust bearings 718 are disposed on opposing sides of the clutch hub 606. The fluid inside the hybrid module 104 is collected and recycled to the sump 116. Within the sump 116, the hybrid module 104 has a control module 720 configured to control the hydraulics for actuating the clutch 114 as well as directing fluid for other components within the hybrid module 104. Both the electrical pump 120 (FIG. 3) and the mechanical pump 118 are capable of circulating fluid throughout the hybrid module 104.

Figure 8:
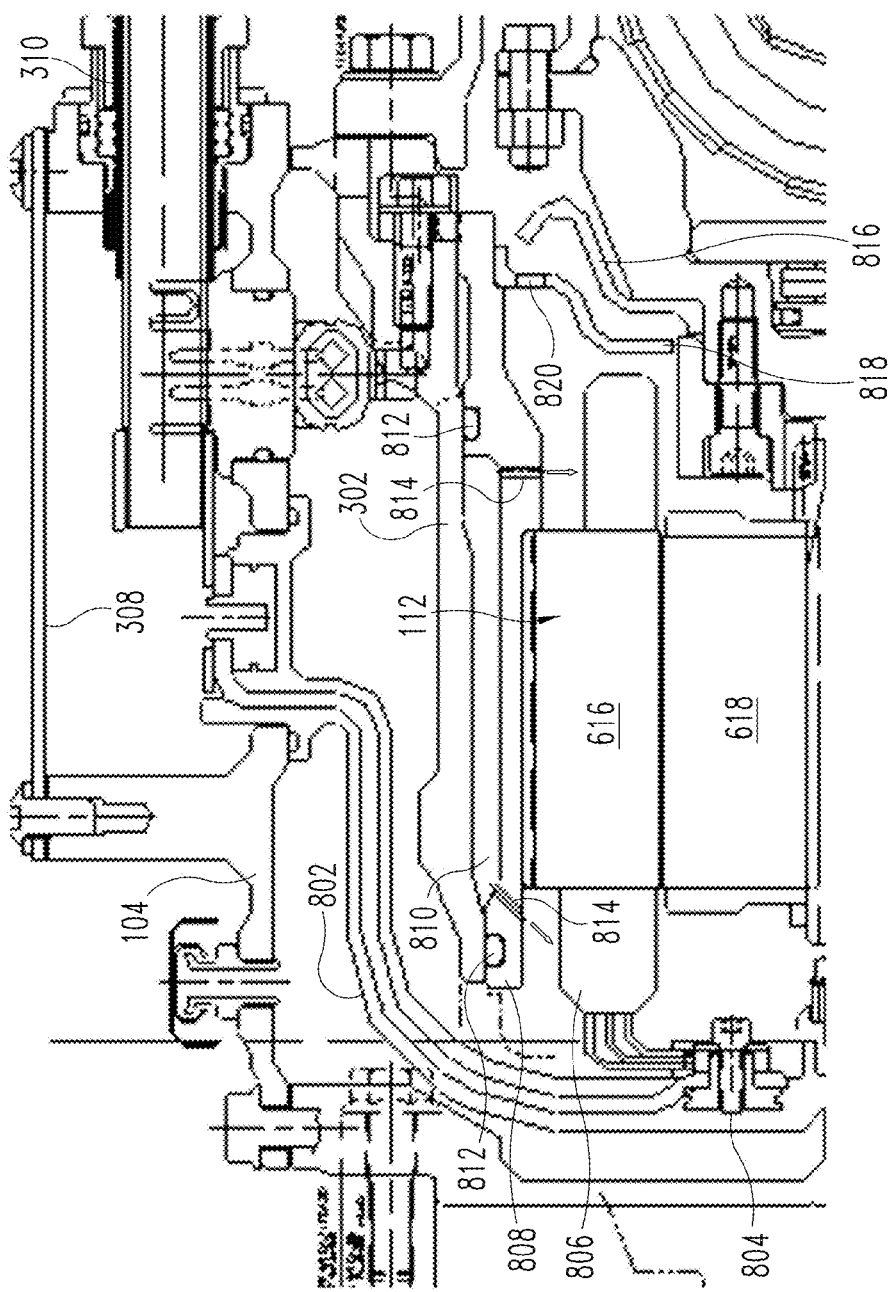
FIG. 8 is an enlarged view of an upper section of the cross-sectional view illustrated in FIG. 7.

FIG. 8 shows an enlarged view of the upper section of the hybrid module 104 from the perspective of FIG. 7. As mentioned before, the fluid has a number of functions besides lubrication, such as cooling various components like the eMachine 112 and providing hydraulic pressure. Looking at FIG. 8, the stator 616 of the eMachine 112 is electrically connected to the high voltage wires 310 and subsequently the inverter 132 via stator connector wires 802. The stator connector wires 802 in the depicted example have a generally flat, curved configuration, but it is envisioned that in other configurations, the stator connector wires 802 can be shaped differently. Specifically, the stator connector wires 802 are connected to the stator 616 via a stator terminal block 804. As should be recognized, the stator 616 contains a number of windings configured to create a magnetic field when current is applied to the stator 616. On the other hand, the rotor 618 is in the form of a permanent magnet. In one particular example, the permanent magnet in the rotor 618 is formed by a stack of magnetic plates, but it is envisioned that the rotor 618 can come in other forms. Both the rotor 618 and stator 616 can include materials that are easily magnetized. For instance, in one example the rotor 618 and stator 616 are made from a silicon steel or other powdered metals. It is envisioned that they can be made of different materials in different embodiments. The majority of the heat in the eMachine 112 is produced in the stator 616. In particular, windings 806 of the stator 616 produce significant heat, and if the heat is somehow not relieved, detrimental heating of the eMachine 112 may occur, which could lead to failure. To combat overheating issues, the hybrid module 104 utilizes the fluid to cool windings 806 of the stator 616. Looking at FIG. 8, the hybrid module 104 includes a sleeve 808 in which the other components of the hybrid module 104 are received. The sleeve 808 forms a cooling jacket around which the fluid is circulated. Specifically, the sleeve 808 has a fluid channel 810 that is defined between the sleeve 808 and the hybrid module housing 302. To seal the fluid channel 810, the hybrid module 104 further incorporates seals 812 that seal the fluid channel 810. To cool the windings 806, the sleeve 808 has spray openings 814 positioned to spray the fluid onto the windings 806 of the stator 616, as is shown by the arrows illustrated in FIG. 8. As will be discussed in greater detail with respect to FIG. 11, the adapter ring 620 has a slinger blade 816 that is designed to sling the fluid back into the hybrid module 104. The sleeve 808 has a dam structure 818 with a dam passageway or window 820 that is used to retain the fluid and direct it to the sump 116. It is contemplated that in other embodiments WEG coolant can be used to cool the eMachine 112. For instance, the WEG coolant can be circulated in the fluid channel 810 defined between the sleeve 808 and the hybrid module housing 302 so as to cool the eMachine 112. In this particular example, the spray openings 814 are eliminated in order to avoid spraying of the WEG coolant directly onto the windings 806.

Figure 9:
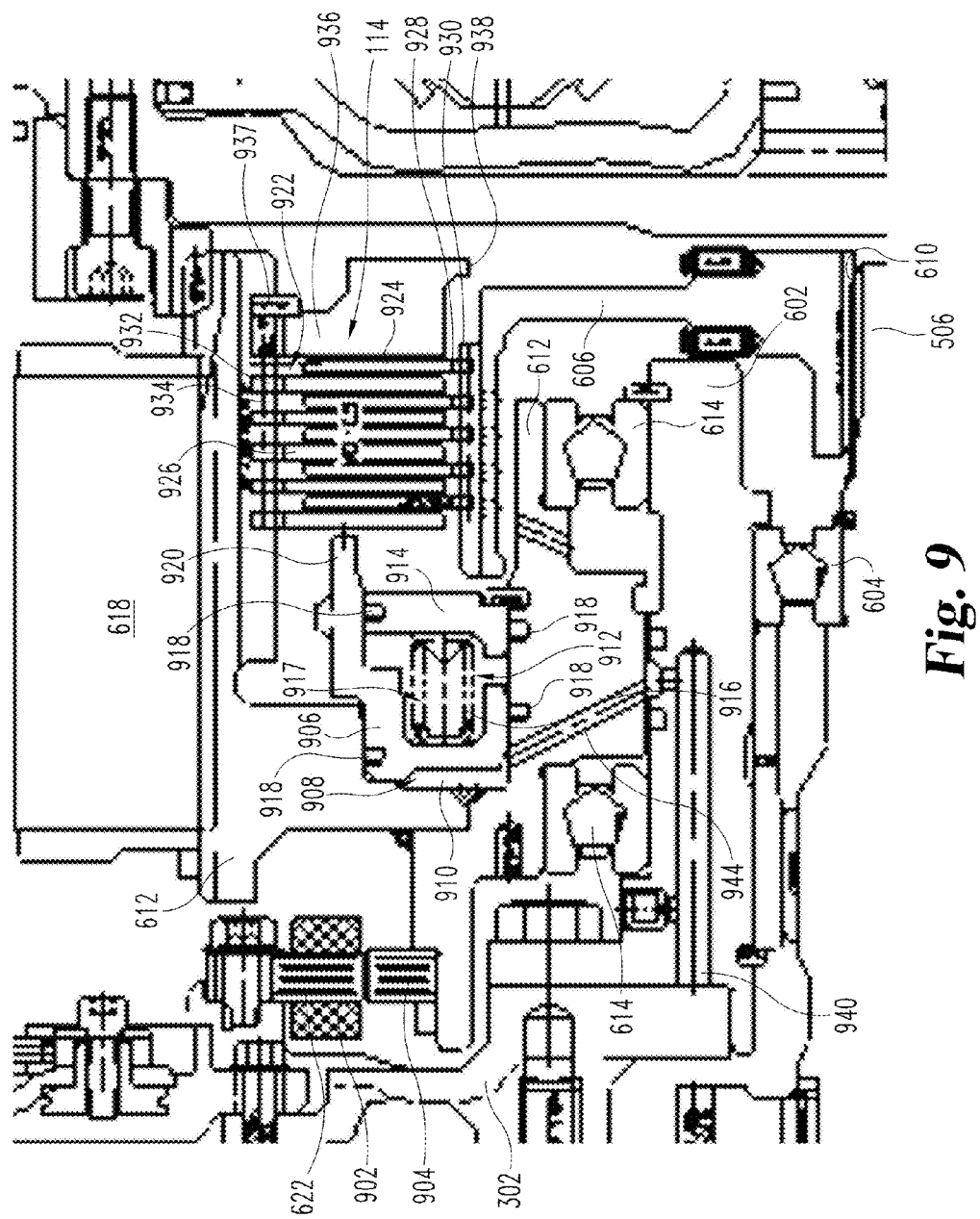
FIG. 9 is an enlarged view of a clutch subassembly shown in the FIG. 7 cross-sectional view.

Looking at FIG. 9, which shows an enlarged view of a middle section of the hybrid module 104, a resolver assembly 622 has a stator portion 902 that is affixed to the hybrid module housing 302 and a rotor portion 904 secured to the rotor hub 612 via a press fit-type connection. The resolver assembly 622 acts as a rotary position sensor so that the position of the rotor 618 relative to the stator 616 of the eMachine 112 can be accurately determined when the eMachine 112 acts as a motor and/or a generator for controlling purposes.

To better understand how the clutch 114 operates, its function and subcomponents will now be described with reference to FIGS. 9 and 10. The compact design of the hybrid module 104 places demands and constraint on a number of its subcomponents, such as its hydraulics and the clutch. Looking at FIG. 9, the clutch 114 includes a piston 906. The piston 906 is slideably received inside a piston cavity 908, which is defined in the rotor hub 612. The piston 906 subdivides the piston cavity 908 into an activation chamber 910 and a deactivation chamber 912. At the end opposite the piston 906, a piston guide member 914 encloses one end of the deactivation chamber 912. Inside the deactivation chamber 912, a piston spring 916 is disposed between the piston guide member 914 and the piston 906. To provide an axially compact arrangement, the piston 906 for the clutch 114 has a spring recess 917 in order to receive the piston spring 916. The piston spring 916 biases the piston 906 to a deactivation state in which the clutch 114 is disengaged. Both the piston 906 and the piston guide member 914 have a series of seals 918 that seal the piston cavity 908 and the deactivation chamber 912. As shown, the piston 906 includes a clutch engagement member 920 that is configured to compress or engage clutch plates 922. The clutch plates 922 include a set of clutch hub plates 924 that are engaged with the clutch hub 606 and a set of rotor hub plates 926 that are engaged to the rotor hub 612. To facilitate engagement and disengagement or sliding, the clutch hub plates 924 each include grooves 928 in which splines 930 of the clutch hub 606 are received. Similarly, the rotor hub plates 926 each have grooves 932 in which splines 934 of the rotor hub 612 are received.

Figure 10:
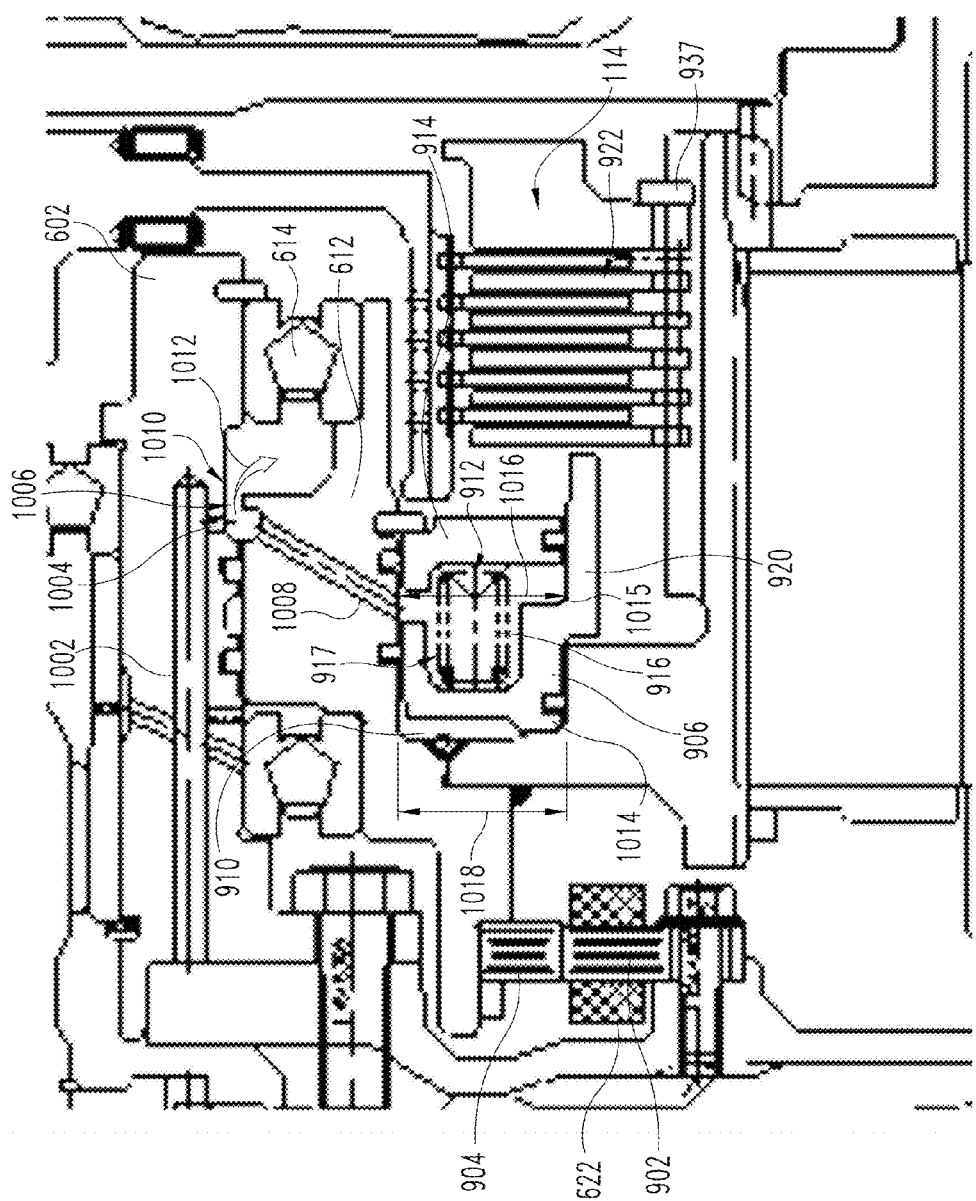
FIG. 10 is a second enlarged view of the cross-sectional view of the clutch subassembly in FIG. 7.

As can be seen in FIGS. 9 and 10, the clutch plates 922 are packed between the clutch engagement member 920 of the piston 906 and a clamp member 936 that is secured to the rotor hub 612. The clamp member 936 and in turn the clutch plates 922 are retained in place via a snap ring 937 that is secured to the rotor hub. The snap ring 937 helps to brace the clamp member 936 along with the clutch plates 922 when the piston 906 engages the clutch plates 922. The clamp member 936 has a unique feature that aids in assembly of the hybrid module 104. As mentioned before, the input shaft 506 and the clutch hub 606 are joined together through a spline connection 610, which allows the input shaft 506 to be easily pulled or removed during servicing. However, this ability to easily remove the input shaft 506 creates some difficulties during assembly of the hybrid module 104. In particular, this configuration can lead to the clutch hub 606 slipping out of the hybrid module 104 during initial assembly. Looking from the perspective of FIG. 9, during initial assembly when the hybrid module 104 is not secured to the transmission 106, the clutch hub 606 has the ability to move to the left and right and is not secured in any manner to prevent the clutch hub 606 from falling out of the hybrid module 104 when inverted. To address this issue, the clamp member 936 includes a stop member or stop flange 938 that extends from the clamp member 936 to such a length to create an interference with the splines 930 on the clutch hub 606. In essence, the stop flange 938 prevents the clutch hub 606 from falling out of the hybrid module 104 when the hybrid module 104 is inverted or otherwise moved during assembly. As can be seen, if the clutch hub 606 is slid to the right in view of FIG. 9, the stop flange 938 will eventually contact or hit the splines 930 on the clutch hub 606. The distance from the stop flange 938 and the length of the rail are such that the clutch hub plates 924 are not able to fall off of the splines 930, thereby retaining the clutch hub 606 inside the hybrid module 104. Once in place, the clutch plates 922 are permanently retained in the clutch 114 via snap rings. In the depicted example, the stop flange 938 is generally solid, but it is envisioned that the stop flange can be shaped differently in other embodiments. For example, the stop flange 938 can be discontinuous by including notches, tabs, and the like.

The fluid for actuating the piston 906 is supplied via a supply passage 940 located inside the ground sleeve 602. The supply passage 940 has a discharge port 942 in the form of an annular groove that supplies the fluid to an intermediate passage 944 located in the rotor hub 612. As noted before, the ground sleeve remains generally stationary relative to the rotor hub 612. This construction facilitates the fluid to transfer between the ground sleeve 602 and the clutch hub 606. The intermediate passage 944 supplies the fluid to the activation chamber 910. When the fluid is pressurized inside the activation chamber 910, the piston 906 compresses the piston spring 916 and moves the clutch engagement member 920 to engage the clutch plates 922, such that the clutch plates 922 are packed between and frictionally engaged with one another. This engagement in turn causes the rotor hub 612 to rotate in unison with the clutch hub 606.

One of the many concerns for the clutch 114 is the risk of hydrostatic lock of the piston 906. To address this issue, the hydraulics for the clutch 114 incorporate a spill over feature that reduces the risk of hydrostatic lock, while at the same time ensures proper filling and lubrication. Specifically, the ground sleeve 602 also includes a deactivation fluid supply passage 1002 that supplies fluid to the deactivation chamber 912. The fluid is supplied from a discharge port 1004 of the deactivation fluid supply passage 1002 to an inlet port 1006 of an intermediate supply passage 1008 located inside the rotor hub 612. In particular, at the interface between the discharge port 1004 and the inlet port 1006, the rotor hub 612 has a spillover gap 1010 that allows excess fluid to spill over and lubricate the bearings 614 such as when the piston 906 is activated. This prevents over pressure inside the deactivation chamber 912, which in turns prevents lockup of the piston 906. As illustrated by arrow 1012 in FIG. 10, any excess fluid is discharged from the spillover gap 1010 when the piston 906 is actuated. When the piston 906 is deactivated, the spring 916 causes the piston to retract to its original disengaged position and the intermediate supply passage 1008 resupplies fluid inside the deactivation chamber 912. Once the clutch plates 922 are disengaged, the rotor hub 612 is able to rotate independently of the clutch hub 606. To prevent the activation chamber 910 from being fully collapsed in which the piston 906 bottoms out, the piston 906 includes a standoff 1014 that spaces the piston away such that the activation chamber 910 is still able to receive fluid from the intermediate passage 944 (FIG. 9).

As noted before, the hybrid module 104 has to fit into a tight space between the engine 102 and the torque converter 710. Due to the axial space efficiency of the hybrid module 104, the clutch 114 likewise has to fit inside a tight space. These space issues for the clutch 114 create a whole host of issues when designing the clutch 114. For example, if the piston design is not centrifugally neutral or balanced, the clutch can tend to close due to the higher oil head pressures created at higher speeds. While heavier piston springs in certain instances can counteract this clutch imbalance issue, the heavier piston springs tend to cause a whole host of other issues, such as requiring higher hydraulic pressures, and the bulky nature of the heavier springs make them not practical for compact hybrid module designs. To locate the spring 916 between the piston 906 and the piston guide member 914, the spring recess 917 was formed in the piston 906. Originally, the recess 917 for the spring 916 in the piston 906 created an imbalance in the opposing surface areas of the piston 906 such that the clutch 114 was not centrifugally neutral. In other words, the portions of the piston 906 facing the activation chamber 910 and the deactivation chamber 912 had different effective areas. To address this issue, the piston 906 has an offset section 1015 that is bumped out from the rest of the piston 906 so that both sides of the piston 906 have the same area. Specifically, an effective piston height 1016 in the deactivation chamber 912 is a same height 1018 as the face of the piston facing the activation chamber 910. As a result, both sides of the piston 906 have the same effective area, which in turn makes the piston 906 centrifugally neutral or balanced, thereby making the operation of the clutch 114 more predictable. With the clutch 114 having a centrifugally neutral design, the piston spring 916 in turn can be lighter such that the clutch 114 can have a more axially compact configuration.

Again, the hybrid module 104 is generally designed to be a self-contained unit. For instance, the hybrid module 104 has its own lubrication system. When the hybrid module 104 is coupled to the transmission 106, some leakage of the fluid into the transmission 106 may occur. The fluid (e.g., oil) may flow into parts of the transmission that are normally dry or absent fluid. For instance, fluid may flow into the area surrounding the torque converter. As a result, the viscous nature of the fluid can slow down the torque converter 710 and/or create other issues, such as parasitic loss and over heating of the oil. Moreover, if enough fluid exits the hybrid module 104, an insufficient amount of fluid may exist in the hybrid module 104, which can cause damage to its internal components.

Figure 11:
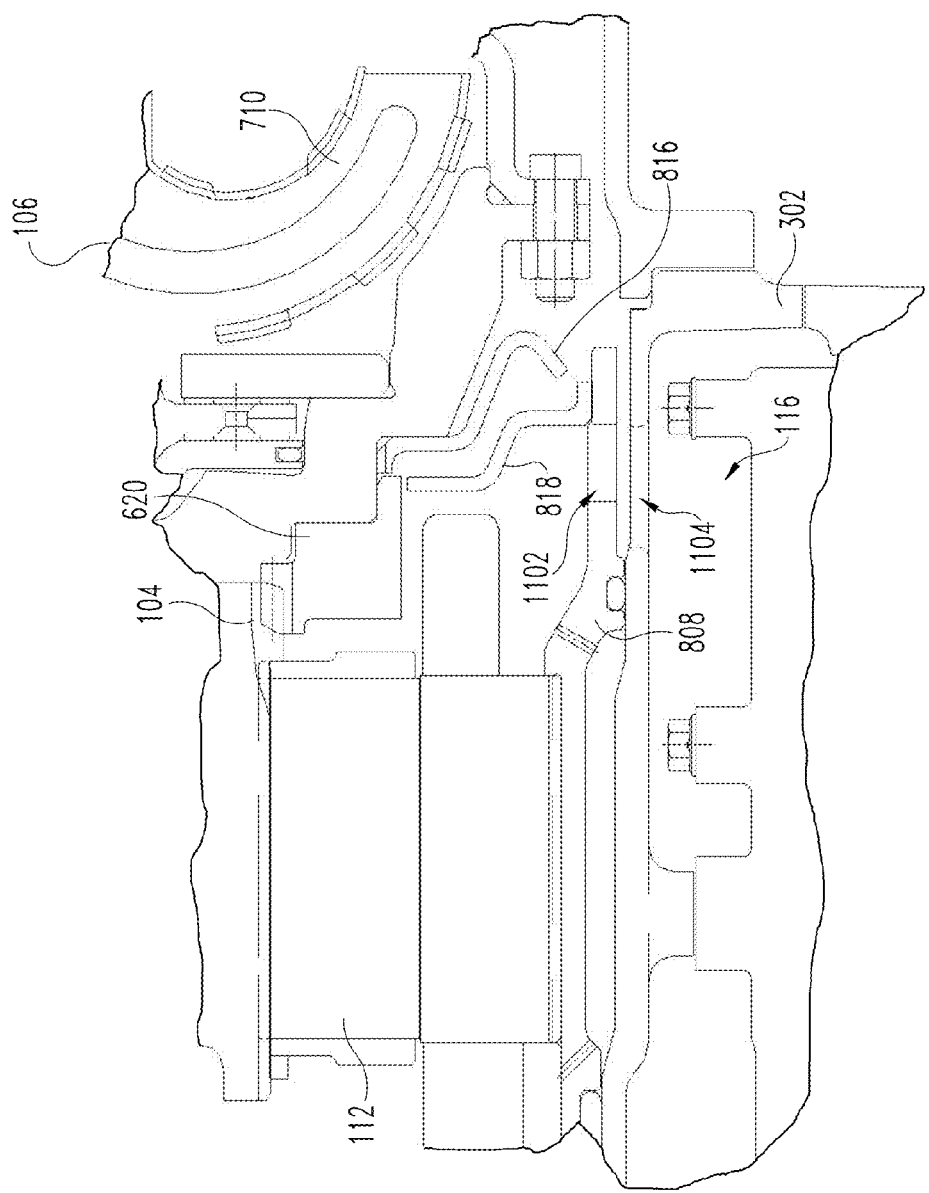
FIG. 11 is an enlarged view of a lower section of the cross-sectional view in FIG. 7.

FIG. 11 shows an enlarged view of the interface between the hybrid module 104 and the transmission 106. At this interface, the hybrid module 104 has a dam and slinger (or impeller) arrangement that is used to retain the fluid within the hybrid module. As can be seen, the slinger blade 816 is mounted to the torque converter 710, and the slinger blade 816 is designed to propel or eject the fluid back into the hybrid module 104. The sleeve 808 has the dam structure 818 that is used to retain the fluid and direct it to the sump 116. Looking at FIG. 8, the dam structure 818 has the dam passageway 820 positioned such that the slinger blade 816 is able to direct the fluid through the dam passageway or window 820 and subsequently into the sump 116. Returning to FIG. 11, the sleeve 808 has a sump passageway 1102 where the fluid flows towards the sump 116, and the housing 302 has a sump drain opening 1104 through which the fluid is drained back to the sump 116.

Figure 12:
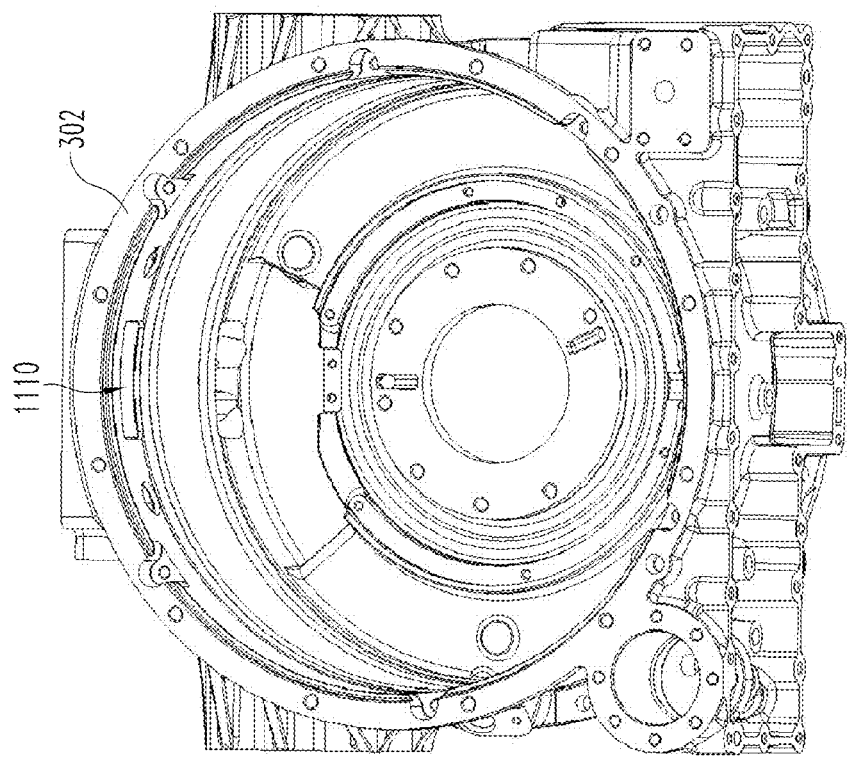
FIG. 12 is an end perspective view from the transmission side of a housing used in the hybrid module illustrated in FIG. 3.
Figure 13:
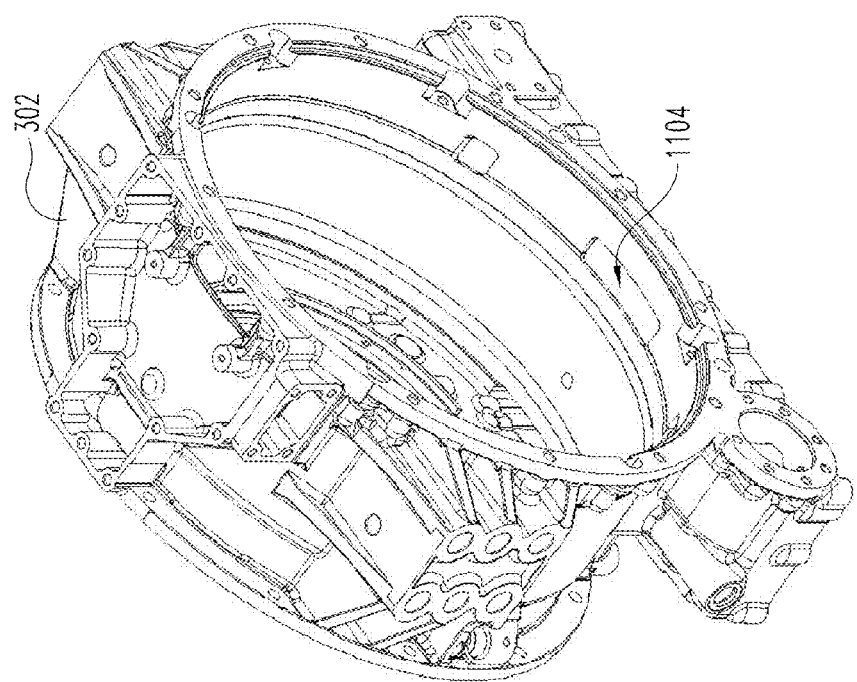
FIG. 13 is a top perspective view of the FIG. 12 hybrid module housing from the transmission side.

FIGS. 12 and 13, which show various perspective views of the hybrid module housing 302, better illustrate the sump drain opening 1104. As noted before, the hybrid module 104 can be easily retrofitted to other size transmissions and systems by simply resizing the housing 302 to fit different size transmissions. The sleeve 808 is designed such that it is able to be received in different hybrid module housing designs to be able to be retrofitted to other transmission sizes.

Figure 14:
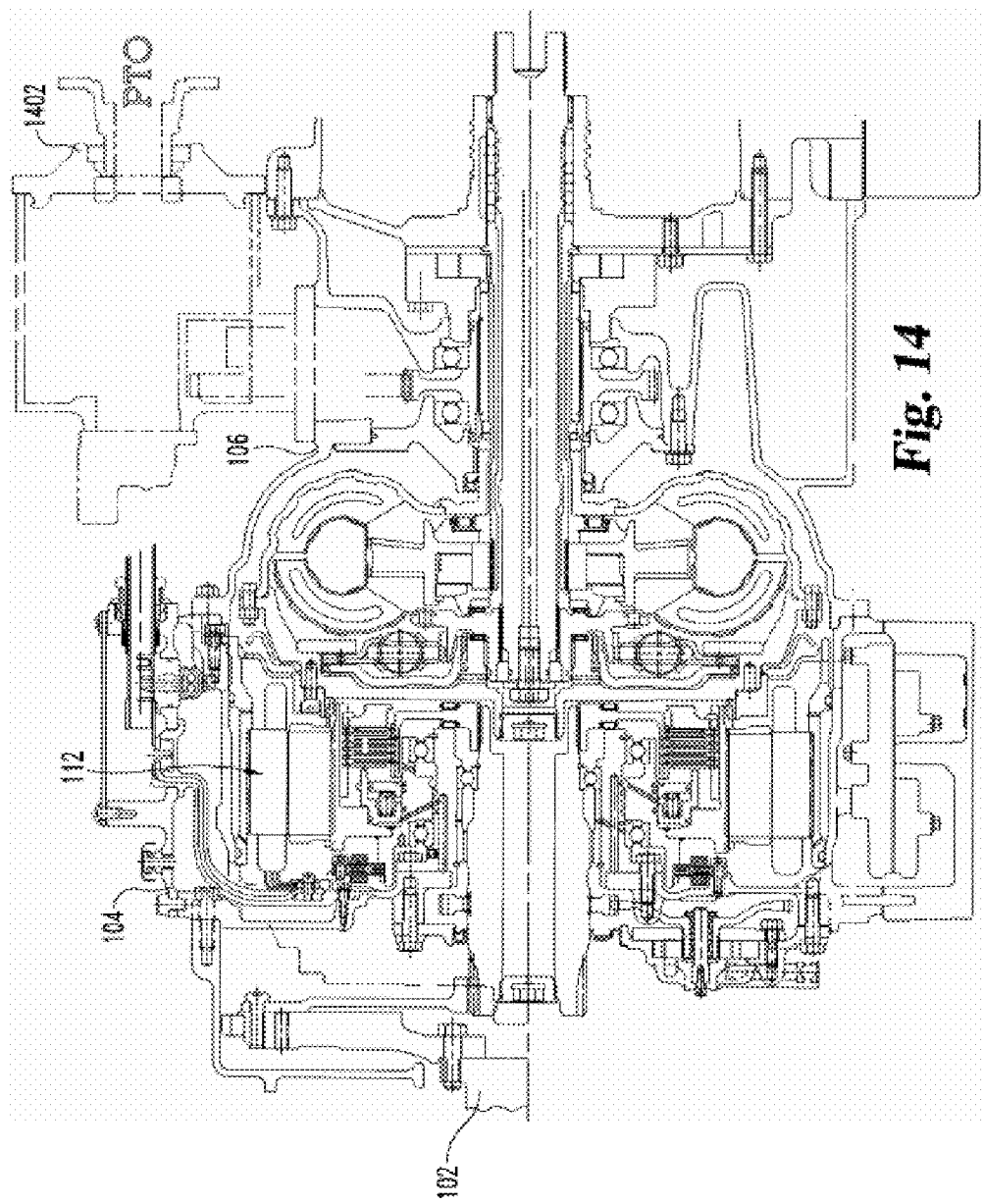
FIG. 14 is a cross-sectional view of the hybrid module-transmission subassembly with a power takeoff (PTO) unit.
Figure 15:
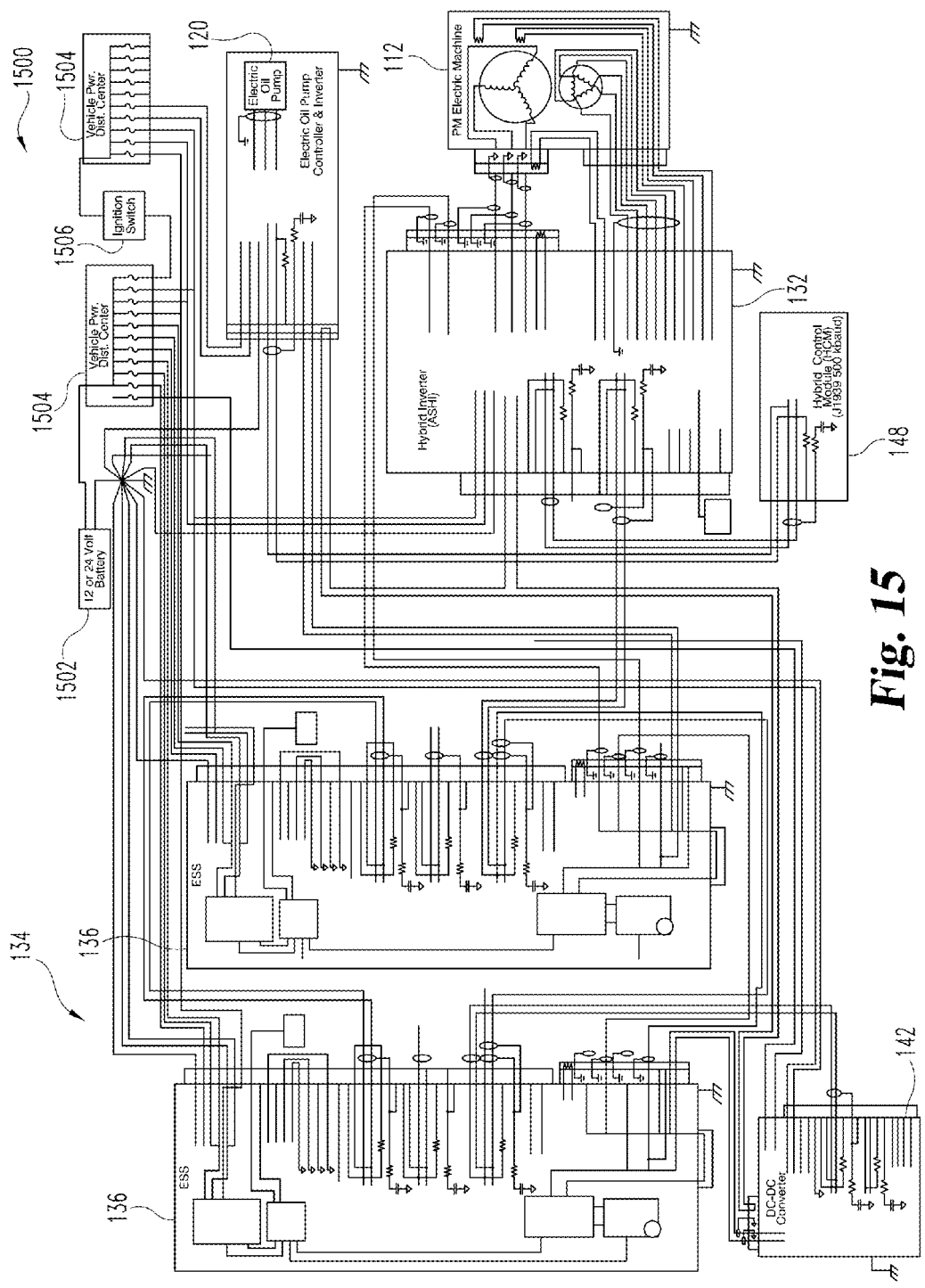
Figure 15B:
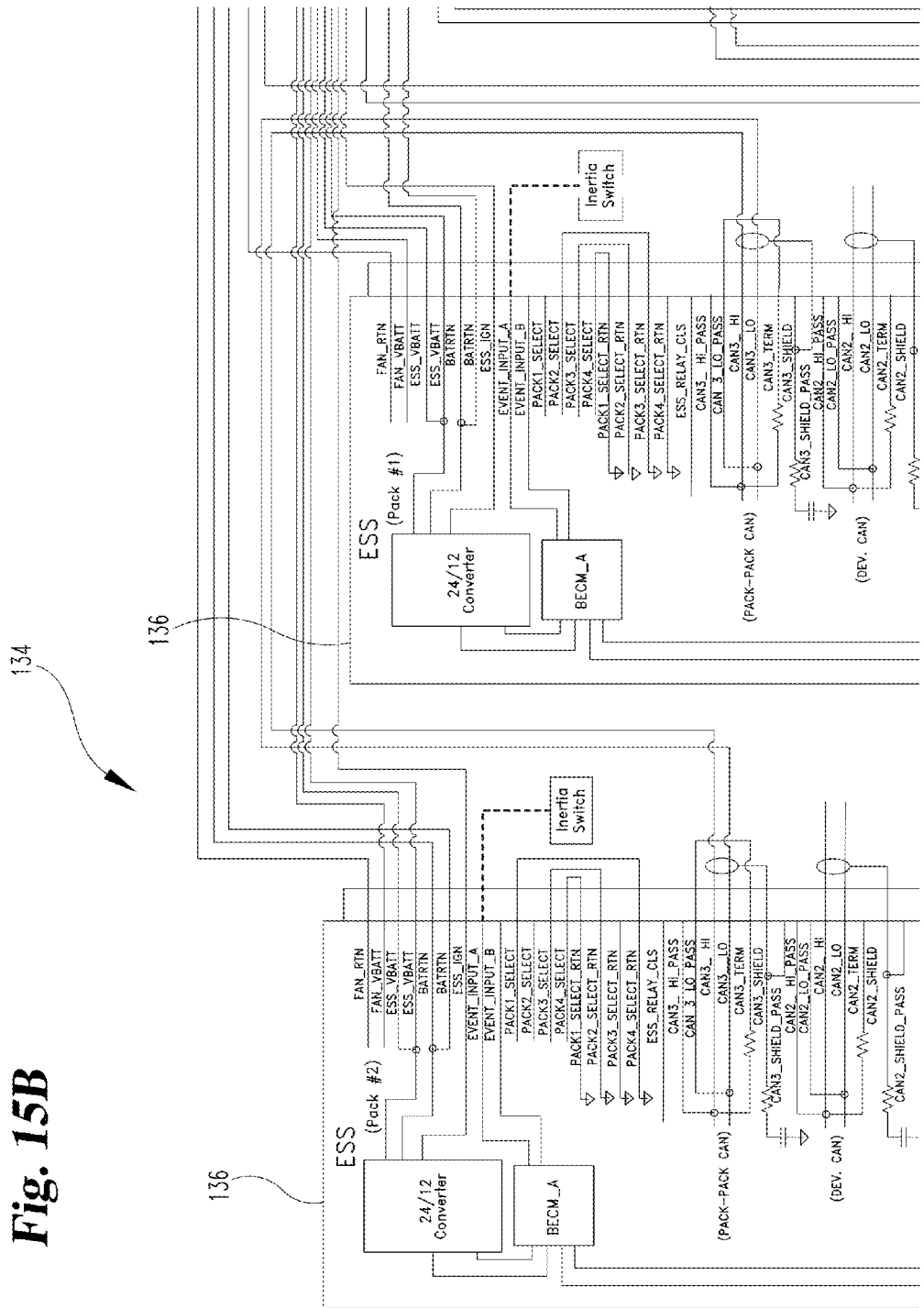
Figure 15C:
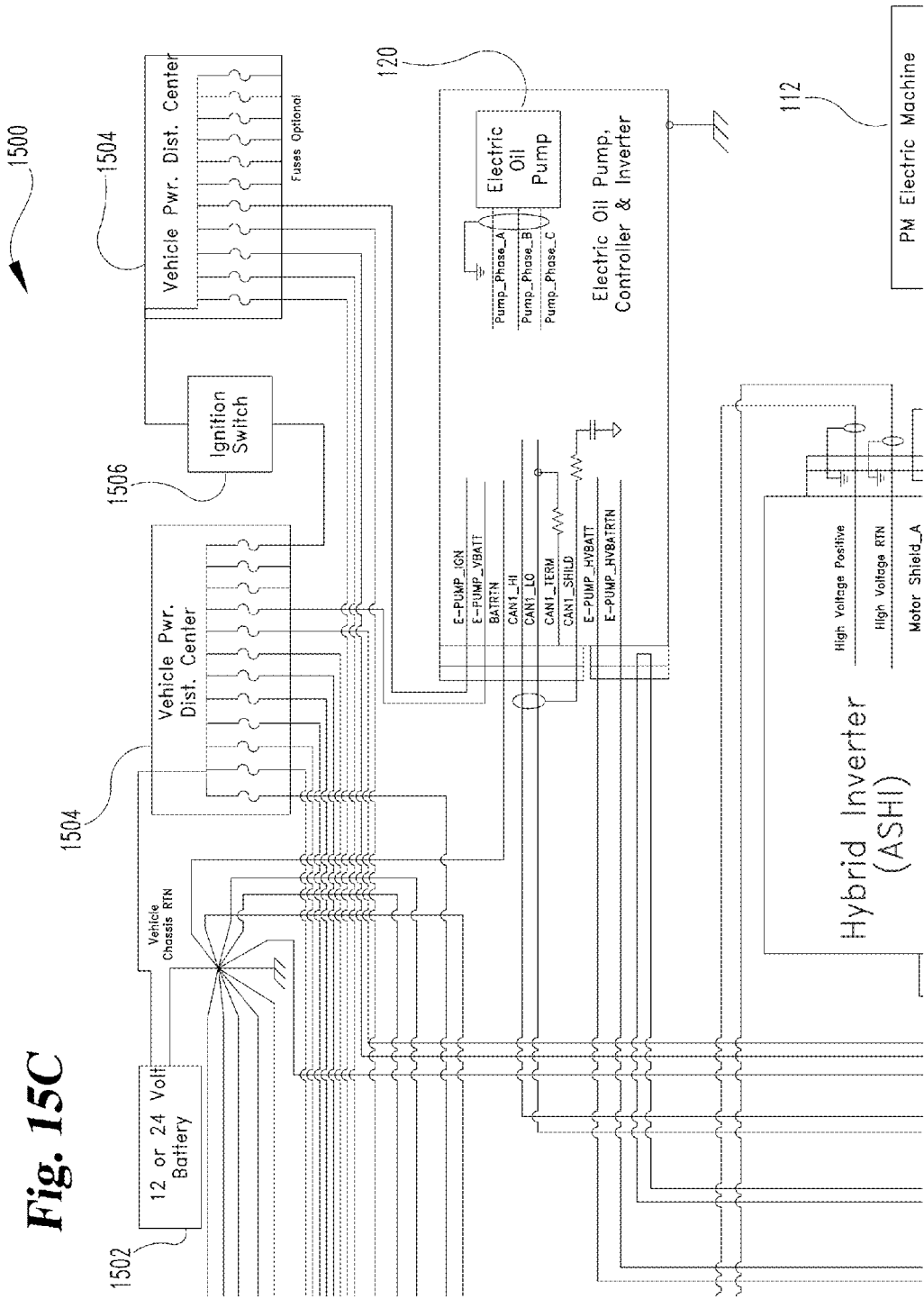
Figure 15D:
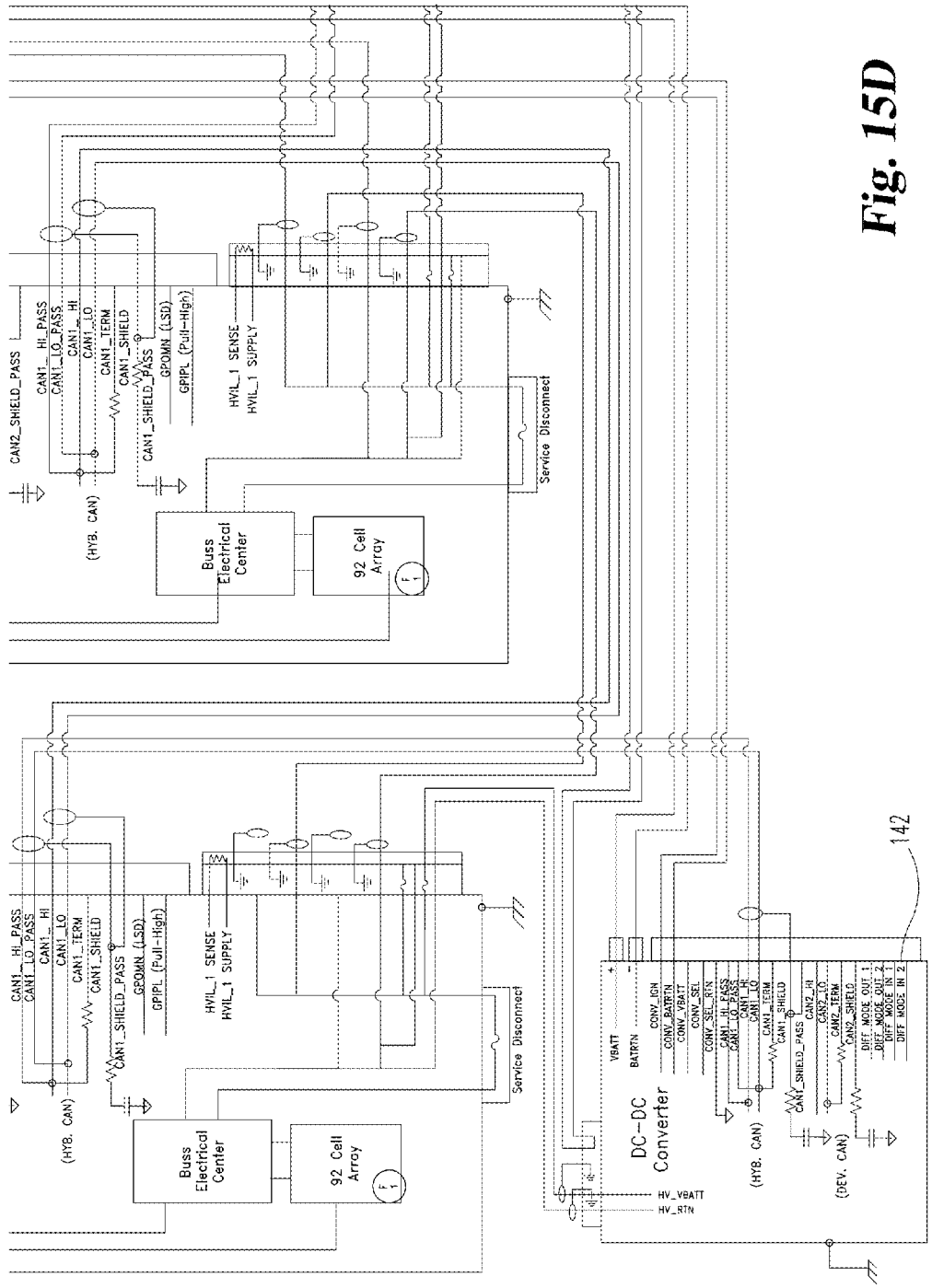
Figure 15E:
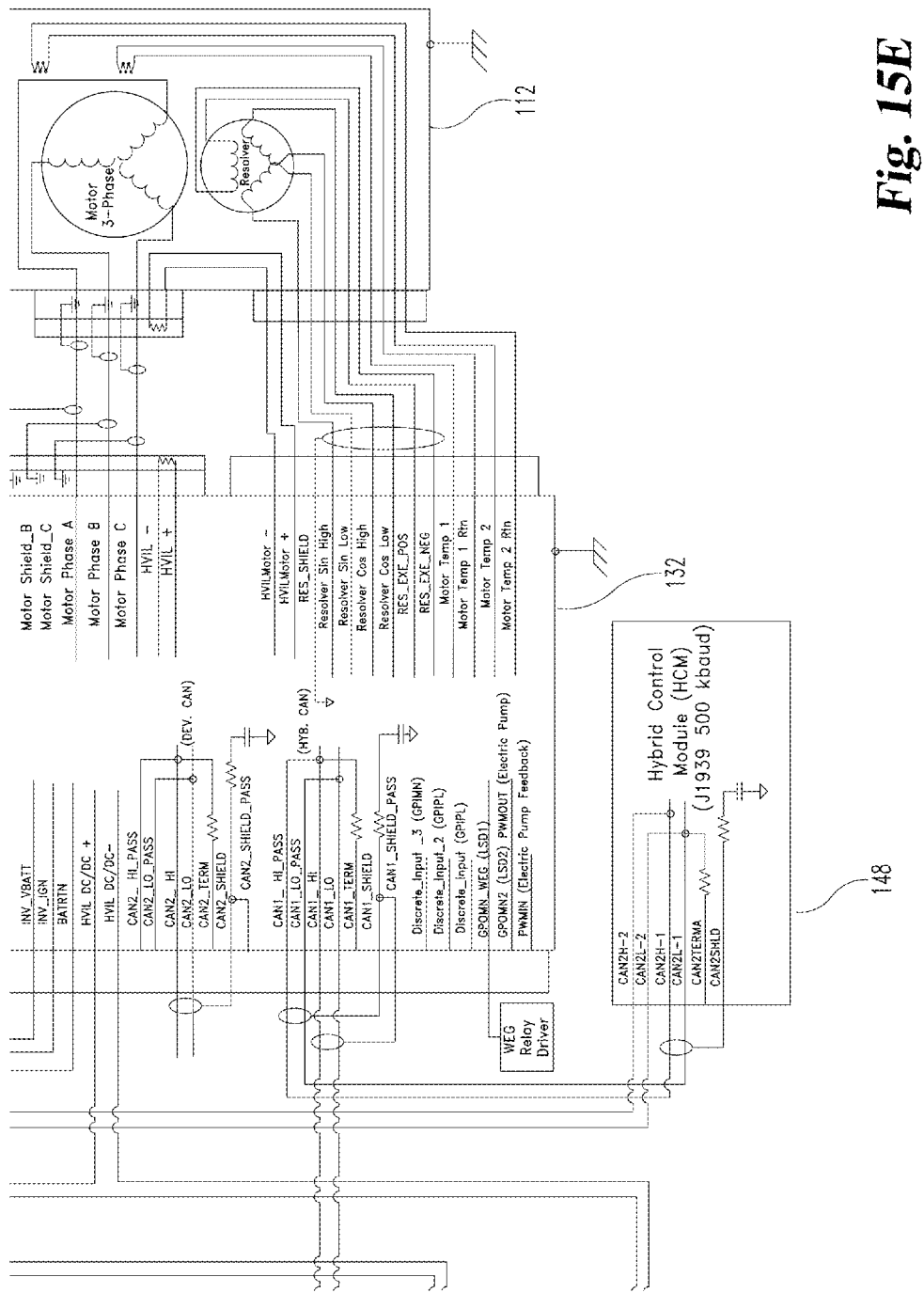

As briefly mentioned above, the hybrid system 100 is further designed to operate in conjunction with a power takeoff (PTO) unit. As should be recognized, PTO units are typically used to provide power to an attachment or separate machine. They are designed to be easily connected and disconnected in a permanent or semi-permanent manner. Examples in which PTO systems are used are for various truck attachments, implement drives, pumps, compressors, and various hydraulic systems, to name just a few examples. The hybrid system 100 is able to have a conventional PTO mode in which the engine 102 supplies the power to the PTO. In addition, the hybrid system 100 is designed to have an electric PTO (ePTO) mode in which the eMachine 112 supplies the power to the PTO module. FIG. 14 shows a cross-sectional view of the hybrid module and transmission that incorporates a PTO module 1402. In the illustrated example, the PTO module 1402 is connected to the transmission 106, but in other embodiments, the PTO module 1402 can be attached elsewhere on the transmission 106 to supply mechanical power to other components.

FIGS. 15 and 15A-E illustrate a wiring diagram of a hybrid electrical system 1500 used in the hybrid system 100. As can be seen, the system 1500 includes the eMachine 112, the electric oil pump 120, the inverter 132, the energy storage system 134 with energy storage modules 136, and the DC-DC converter 142. In addition, the electrical system includes a battery 1502, a vehicle power distribution center 1504, and an ignition switch 1506.

Figure 16:
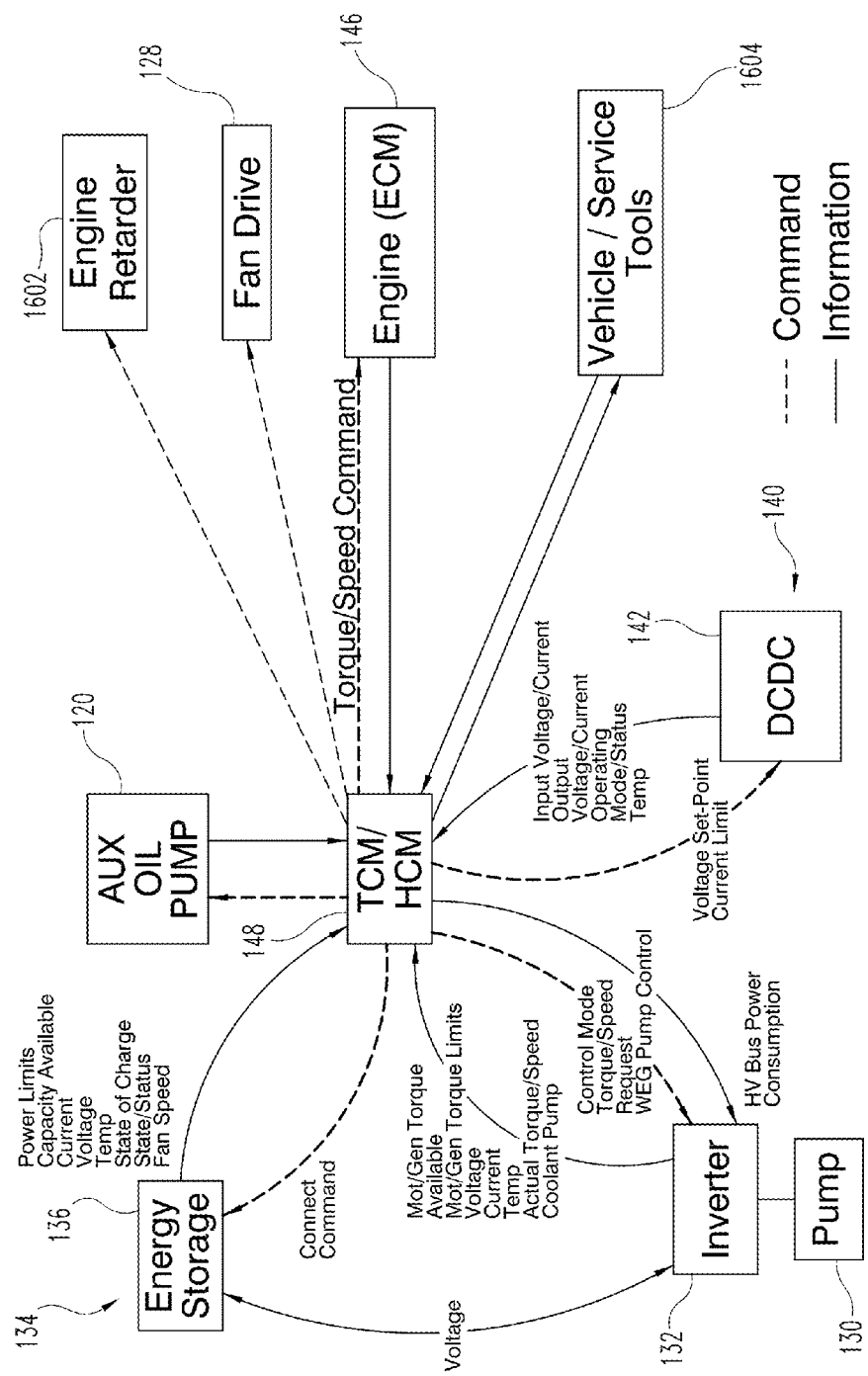
FIG. 16 is a communication diagram showing how various commands and information are transmitted between various components within the hybrid system.

FIG. 16 is a diagram that illustrates the information exchanged or communication between the transmission and hybrid control module 148 and other various components. As depicted in FIG. 16, the transmission/hybrid control module 148 sends commands to control the fan drive of the cooling fan 128 so as to ensure proper cooling of the various components. In addition, the transmission/hybrid control module 148 receives information about and issues commands to control the auxiliary electrical pump 120. The transmission/hybrid control module 148 receives power limits, available capacity, current, voltage, temperature, state of charge, status, and fan speed information from the energy storage system 134 and the various energy storage modules 136 within. The transmission/hybrid control module 148 in turn sends commands for connecting the various energy storage modules 136 so as to supply voltage to and from the inverter 132. As can be seen, the inverter 132 operatively couples the coolant pump 130 to the transmission/hybrid control module 148. The transmission/hybrid control module 148 receives information about the operation of the coolant pump 130 via the inverter 132. From the inverter 132, the transmission/hybrid control module 148 receives a number of inputs such as the motor/generator torque that is available, the torque limits, the inverter's voltage, the inverter's current, the inverter's temperature, actual torque and speed, and information with respect to the coolant pump 130. Based on the information, the transmission/hybrid control module 148, through the inverter 132, controls the operation of the coolant pump 130. For instance, the transmission/hybrid control module 148 can issue a command to the inverter 132 such that the inverter 132 turns on or off the coolant pump 130. From the inverter 132, the transmission/hybrid control module 148 also receives a high voltage bus power and consumption information. Moreover, the transmission/hybrid control module 148 also monitors the input voltage and current as well as the output voltage and current along with the operating status and temperature of the individual DC-DC converter modules 142 of the DC-DC converter system 140. In addition, the transmission/hybrid control module 148 communicates with and receives information from the engine control module 146 and in response controls the torque and speed of the engine 102 via the engine control module 146. As shown, the transmission/hybrid control module 148 also controls and communicates with the engine brake 1602 as well as various vehicle and service tools 1604.

The operation of the hybrid system 100 will now be described with reference to FIG. 17 along with FIGS. 18 through 30. To help summarize the various operation modes of the hybrid system 100, Table 1 has been provided below.

TABLE 1

SYSTEM MODES

| Mode | Clutch | Motor | PTO | Transmission | FIG. |
| --- | --- | --- | --- | --- | --- |
| Engine Start | Engaged | Motor | Inoperative | Neutral | 19 |
| Charge Neutral | Engaged | Generator | Inoperative | Neutral | 20 |
| eAssist Propulsion | Engaged | Motor | Inoperative | In Gear | 21 |
| eDrive | Disengaged | Motor | Inoperative | In Gear | 22 |
| Propulsion with Charge | Engaged | Generator | Inoperative | In Gear | 23 |
| Regeneration Charging | Disengaged | Generator | Inoperative | In Gear | 24 |
| No Charge Braking | Engaged | N/A | Inoperative | In Gear | 25 |
| PTO | Engaged | N/A | Operative | Neutral | 26 |
| ePTO | Disengaged | Motor | Operative | Neutral | 27 |

In most designs, the transmission 106 is configured to always drive the PTO 1402, and when it is desired for the PTO 1402 to not operate, the power from the transmission 106 is somehow bypassed. For example, hydraulic fluid within an implement driven by the PTO 1402 can be recirculated or otherwise bypassed such that the implement is inoperative. Other designs rely on "hot shift" drive boxes so as to control the operation of the PTO 1402. The hot shift drive box designs utilize a disconnection clutch so as to engage or disengage the PTO 1402 with power from the transmission 106. It should be noted for Table 1 above and the discussion below it is intended that both designs are contemplated. For example, when the PTO 1402 is referred to be "inoperative" the PTO 1402 may still supply some power to the implement or the PTO 1402 may be disengaged such that no power is supplied. On the other hand, when the PTO 1402 is referenced to be in an "operative" state, the PTO 1402 is able to supply sufficient power run the implement.

Figure 17:
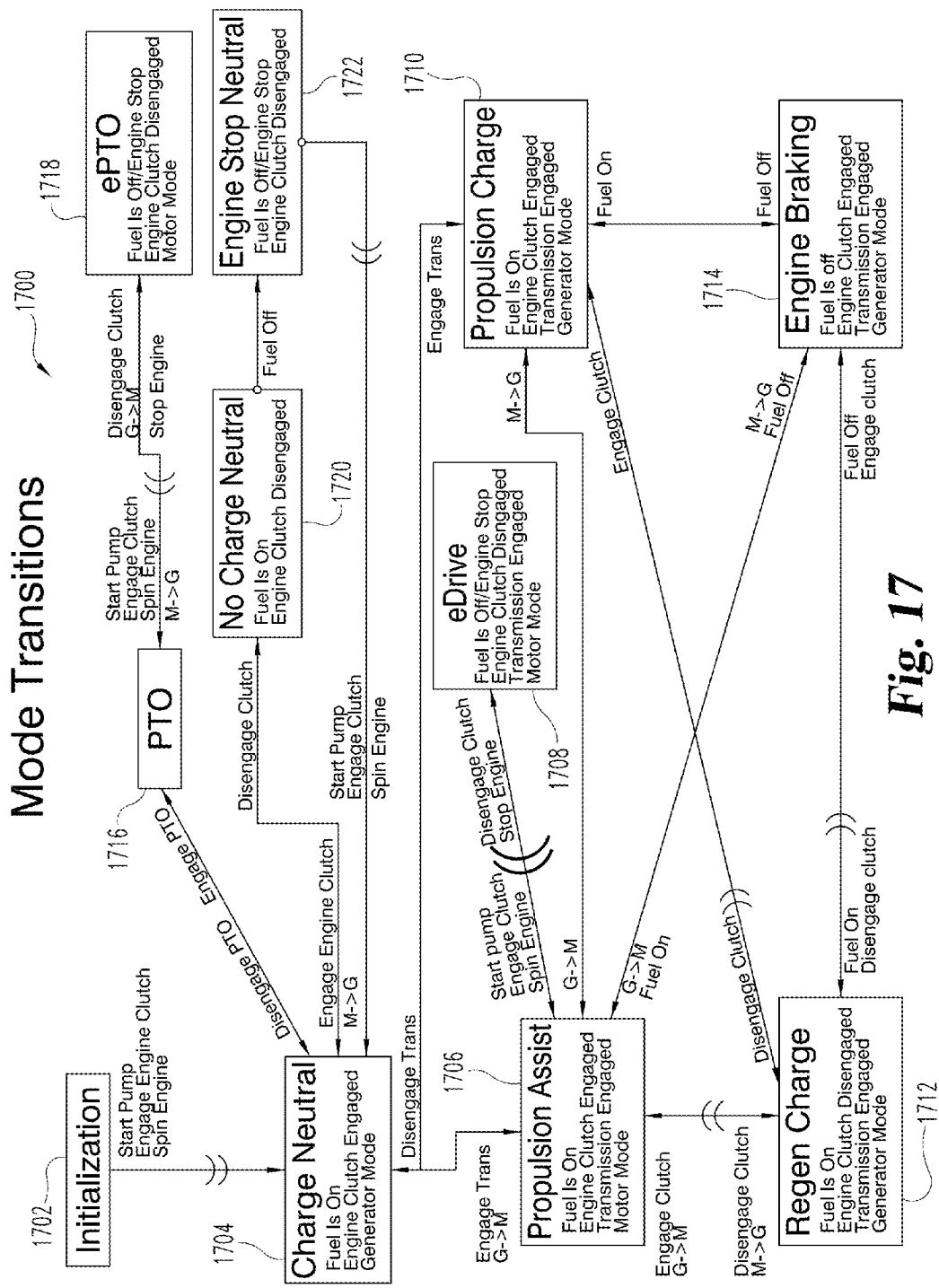
FIG. 17 is a mode transition diagram for one example of the hybrid system.
Figure 18:
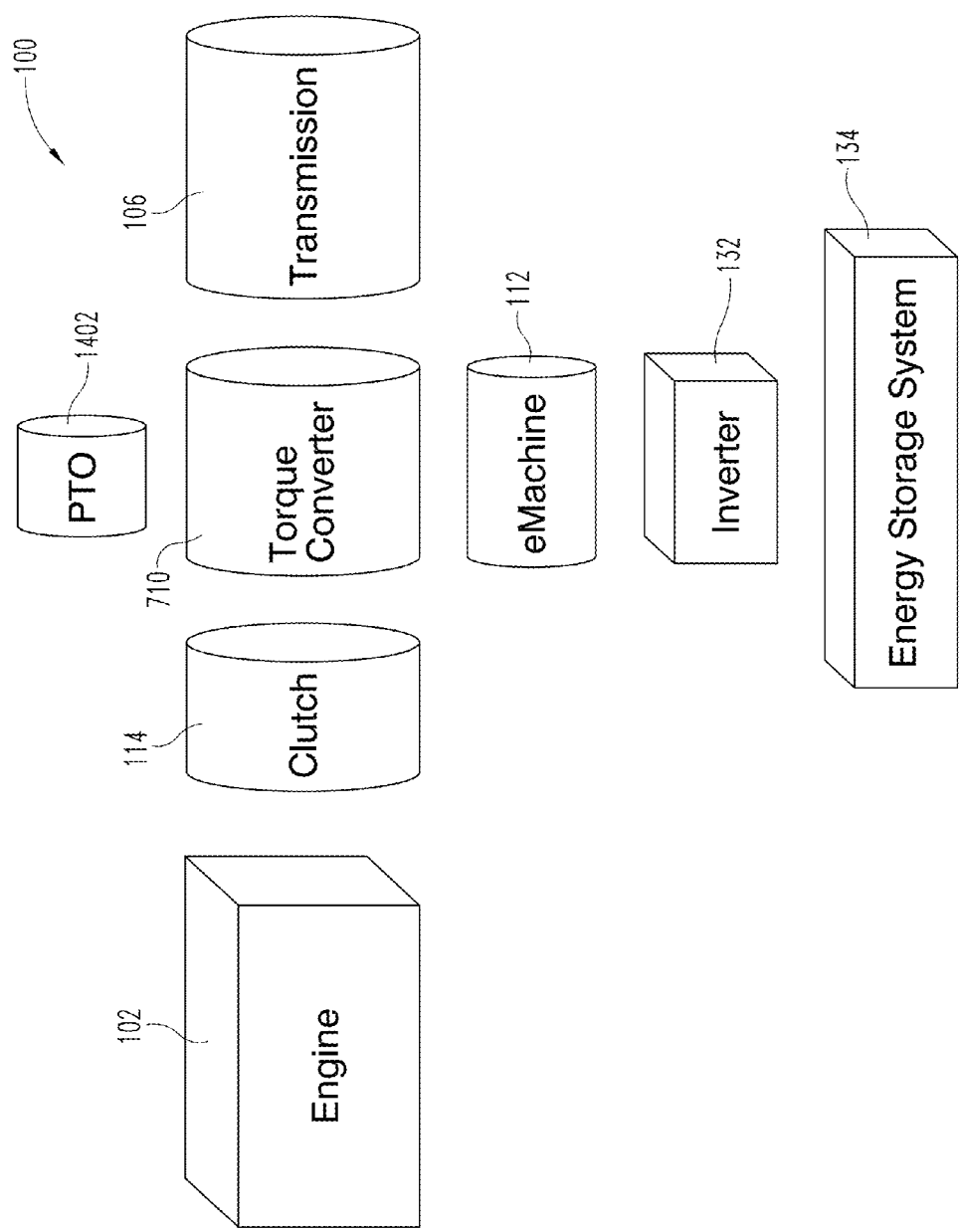
FIG. 18 is a functional diagram of the hybrid system in an inoperative state.

FIG. 17 shows a mode transition chart 1700 that illustrates the various operational modes of the hybrid system 100. While reviewing this mode transition chart 1700, the other drawings, such as FIG. 1 and FIGS. 5-7 and 14 should also be considered. FIGS. 18-30 show a rough block diagram view of the various components and how power is transferred (or not) during the operational modes. For example, FIG. 18 shows the state of the hybrid system 100 in an unpowered state.

Figure 19:
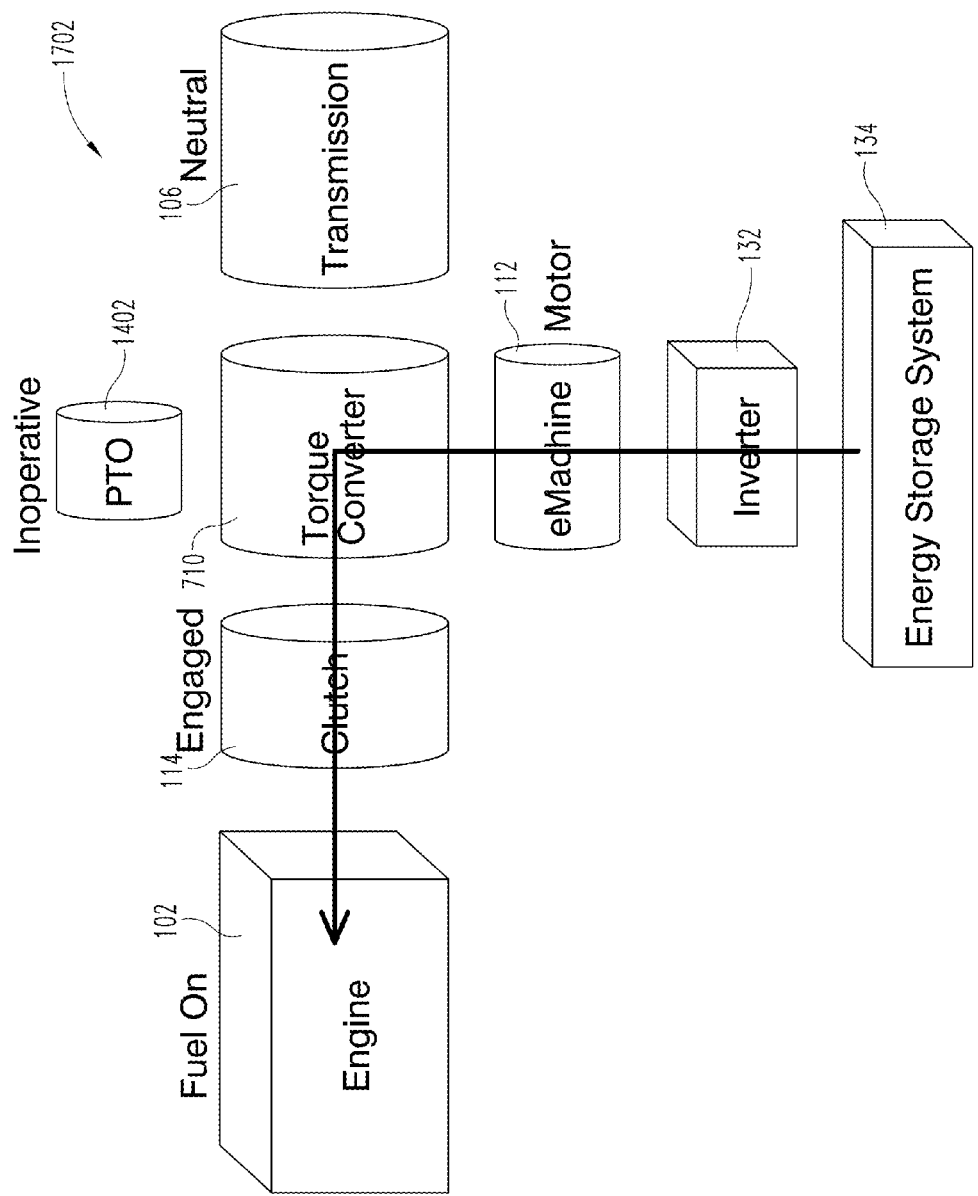
FIG. 19 is a functional diagram of the hybrid system in an initialization or starter mode.
Figure 20:
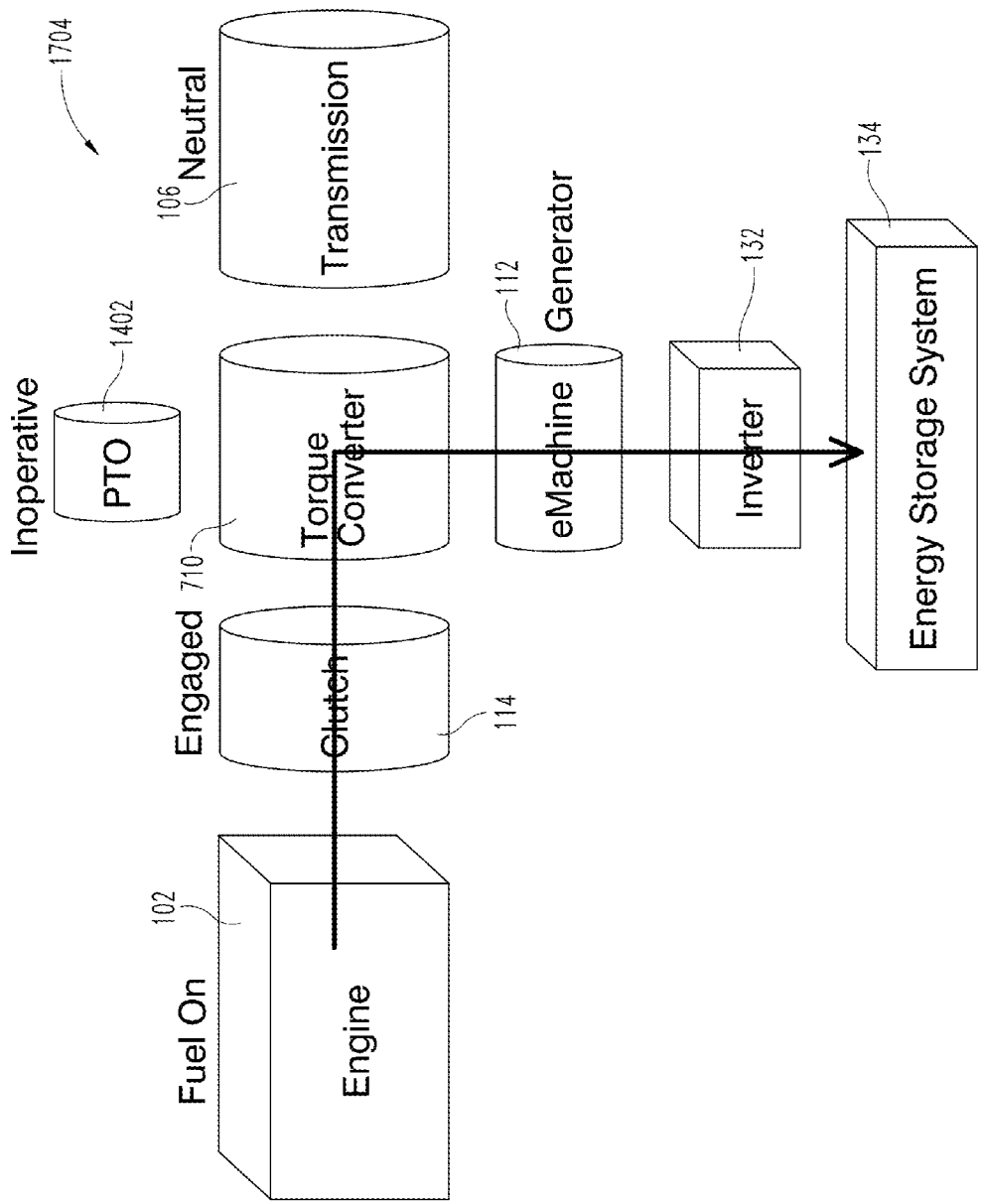
FIG. 20 is a functional diagram of the hybrid system in a charge neutral mode.

During an initialization and/or start up mode 1702, which is depicted in FIGS. 17 and 19, the electric pump 120 is activated by the transmission/hybrid control module 148 so as to circulate fluid through the hybrid module 104. As noted before, the electrical pump 120 receives its power from the energy storage system 134 via the inverter 132 (FIG. 1). Once sufficient oil pressure is achieved, the clutch 114 is engaged. At the same time or before, the PTO is inoperative or remains inoperative, and the transmission 106 is in neutral or remains in neutral. With the clutch 114 engaged, the eMachine 112 acts as a motor and in turn cranks the engine 102 in order to start (i.e., spin/crank) the engine 102. When acting as a motor, the eMachine 112 draws power from the energy storage system 134 via the inverter 132, as depicted in FIG. 19. Upon the engine 102 starting, the hybrid system 100 shifts to a charge neutral mode 1704 (FIG. 20) in which the fuel is on to the engine 102, the clutch 114 is engaged, and the eMachine 112 switches to a generator mode in which electricity generated by its rotation is used to charge the energy storage modules 136. While in the charge neutral mode 1704, the transmission remains in neutral.

Figure 21:
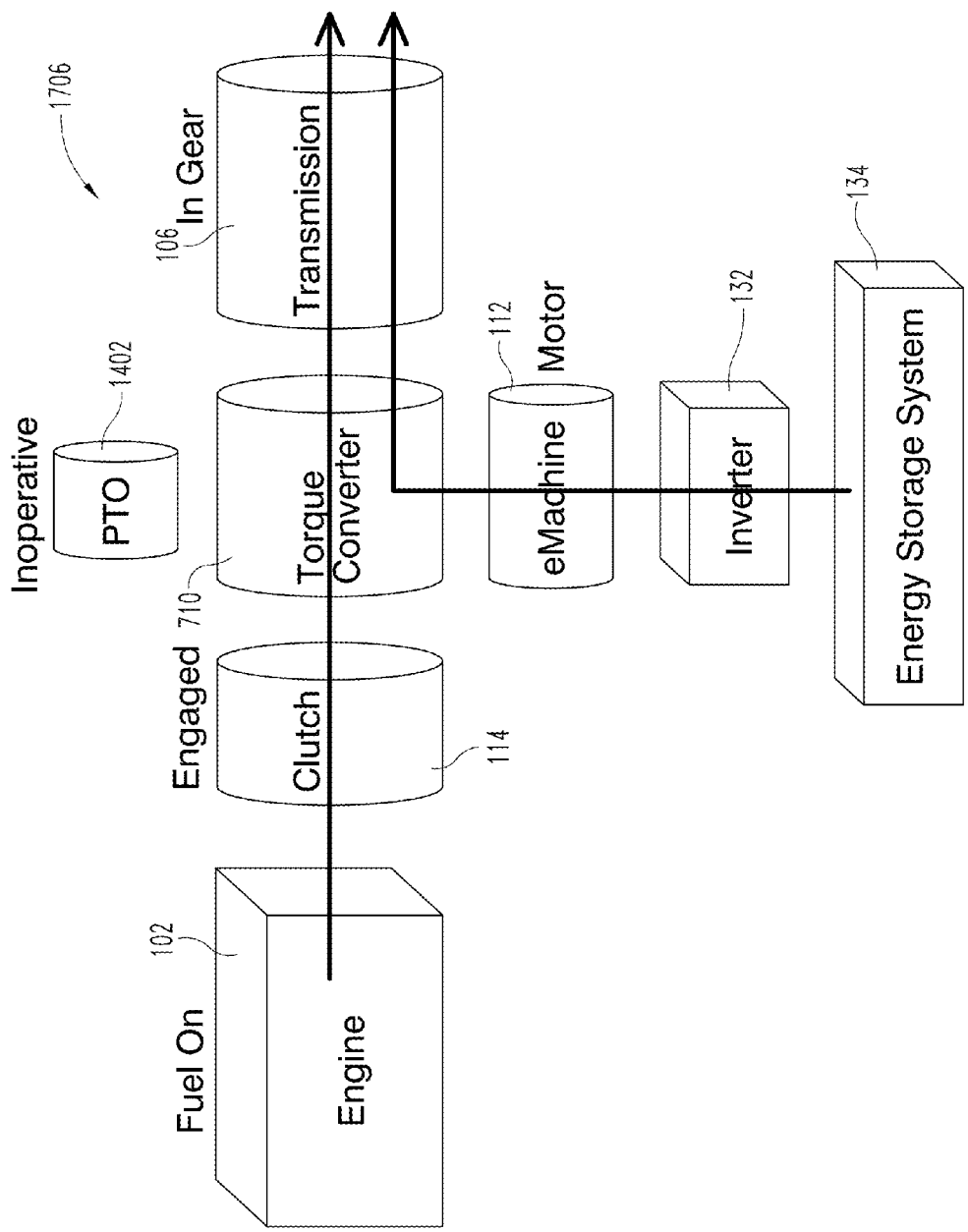
FIG. 21 is a functional diagram of the hybrid system in an electric assist or eAssist propulsion mode.

From the charge neutral mode 1704, the hybrid system 100 can change to a number of different operational modes. The various propulsion modes will now be described, but it should be recognized that these modes can be changed in other ways than is shown. Moreover, the various PTO operational modes can also be entered from the charge neutral mode 1704, but these PTO modes will be described later. As should be recognized from the chart 1700 in FIG. 17, the hybrid system is able to move back and forth between the various operational modes. In the charge neutral mode 1704, the transmission is disengaged, that is, the transmission is in neutral. Referring to Table 1 as well as FIG. 17, the hybrid system 100 enters a propulsion assist or eAssist propulsion mode 1706 by placing the transmission 106 in gear and having the eMachine 112 act as a motor. During the eAssist propulsion mode 1706, the PTO module 1402 is inoperative and the fuel to the engine 102 is on, as is depicted in FIG. 21. In the eAssist propulsion mode 1706, both the engine 102 and the eMachine 112 work in conjunction to power the vehicle. In other words, the energy to power the vehicle comes from both the energy storage system 134 as well as the engine 102. While in the eAssist propulsion mode 1706, the hybrid system 100 can then transition back to the charge neutral mode 1704 by placing the transmission 106 back into neutral and switching the eMachine 112 to a generator mode.

Figure 22:
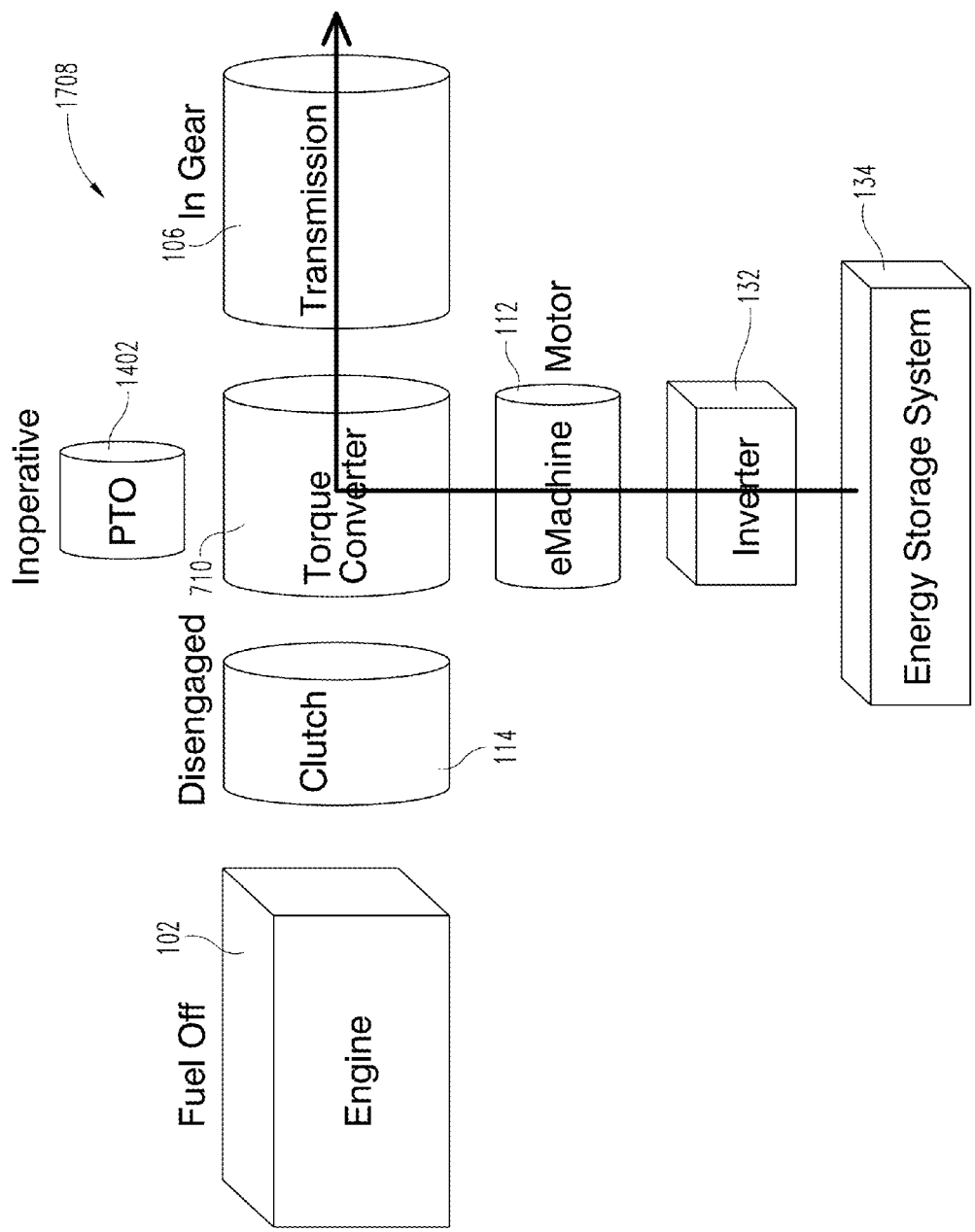
FIG. 22 is a functional diagram of the hybrid system in an electric drive or eDrive mode.

From the eAssist propulsion mode 1706, the hybrid system 100 can transition to a number of different operational states. For instance, as illustrated in FIGS. 17 and 22, the hybrid system 100 can transition from the eAssist propulsion mode 1706 to an electrical or eDrive mode 1708 in which the vehicle is solely driven by the eMachine 112. In the eDrive mode 1708, the clutch 114 is disengaged, and the fuel to the engine 102 is turned off so that the engine 102 is stopped. The transmission 106 is placed in a driving gear. Looking at FIG. 22, as the eMachine 112 powers the transmission 106, the PTO module 1402 is inoperative. While in the eDrive mode 1708, the electrical pump 120 solely provides the hydraulic pressure for lubricating the hybrid module 104 and controlling the clutch 114, because the mechanical pump 118 is not powered by the stopped engine 102. During the eDrive mode 1708, the eMachine 112 acts as a motor. To return to the eAssist propulsion mode 1706, the electrical pump 120 remains on to provide the requisite pressure to engage the clutch 114. Once the clutch 114 is engaged, the engine 102 is spun and fuel is turned on to power the engine 102. When returning to the eAssist propulsion mode 1706 from the eDrive mode 1708, both the eMachine 112 and the engine 102 drive the transmission 106, which is in gear.

Referring again to FIG. 17, the hybrid system 100 also has a propulsion charge mode 1710, a regenerative braking charge mode 1712, and a compression or engine-braking mode 1714. The hybrid system 100 can transition to the propulsion charge mode 1710 from the charge neutral mode 1704, the eAssist propulsion mode 1706, the regenerative braking charge mode 1712, or the engine-braking mode 1714.

Figure 23:
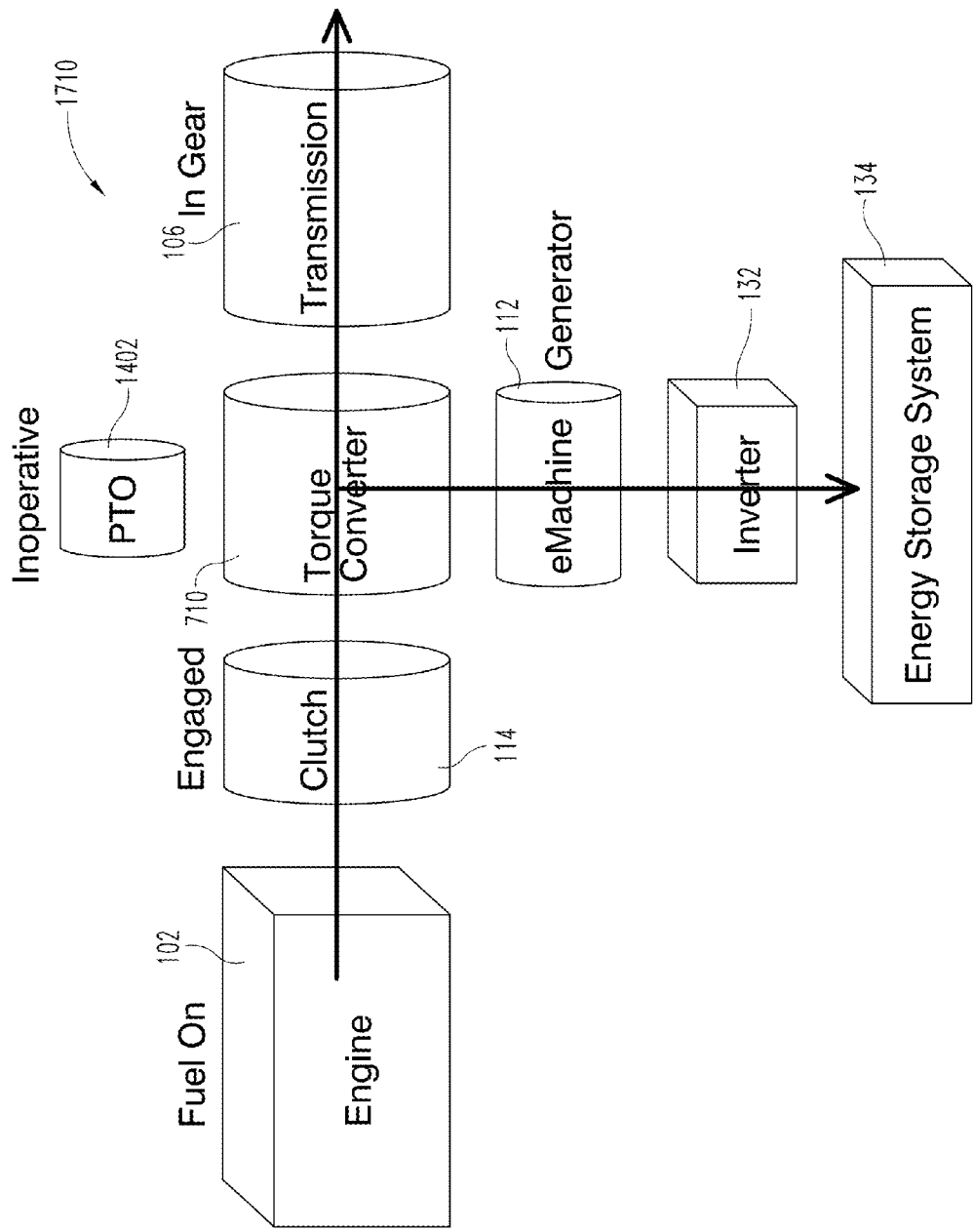
FIG. 23 is a functional diagram of the hybrid system in a propulsion charge mode.

When in the propulsion charge mode 1710, the engine 102 propels the vehicle while the eMachine 112 acts as a generator. FIG. 23 illustrates the operational state of the hybrid system 100 while in the propulsion charge mode 1710. During the propulsion charge mode 1710, the clutch 114 is engaged such that power from the engine 102 drives the eMachine 112 and the transmission 106, which is in gear. Again, during the propulsion charge mode 1710, the eMachine 112 acts as a generator, and the inverter 132 converts the alternating current produced by the eMachine 112 to direct current, which is then stored in the energy storage system 134. In this mode 1710, the PTO module 1402 is in an inoperative state. While in the propulsion charge mode 1710, the mechanical pump 118 generally handles most of the oil pressure and lubricant needs, but the electric pump 120 can help supplement the load. The load between the mechanical 118 and electric 120 pumps is balanced to minimize power loss.

Returning to FIG. 17, the hybrid system 100 can transition to a number of operational modes from the propulsion charge mode 1710. For example, the hybrid system 100 can transition to the charge neutral mode 1704 from the propulsion charge mode 1710 by placing the transmission 106 in neutral. The hybrid system 100 can return to the propulsion charge mode 1710 by placing the transmission 106 into gear. From the propulsion charge mode 1710, the hybrid system 100 can also switch to the eAssist propulsion mode 1706 by having the eMachine 112 act as an electric motor in which electricity is drawn from the energy storage system 134 to the eMachine 112 such that the eMachine 112 along with the engine 102 drive the transmission 106. The regenerative charge mode 1712 can be used to recapture some of the energy that is normally lost during braking. The hybrid system 100 can transition from the propulsion charge mode 1710 to the regenerative charge mode 1712 by simply disengaging the clutch 114. In some instances, it may be desirable to use the engine-braking mode 1714 to further slow down the vehicle and/or to reduce wear of the brakes. Transitioning to the engine-braking mode 1714 can be accomplished from the propulsion charge mode 1710 by turning off the fuel to the engine 102. During the engine-braking mode 1714, the eMachine 112 acts as a generator. The hybrid system 100 can return to the propulsion charge mode 1710 by turning back on the fuel to the engine 102. Simply disengaging the clutch 114 will then switch the hybrid system 100 to the regenerative charging mode 1712.

Figure 24:
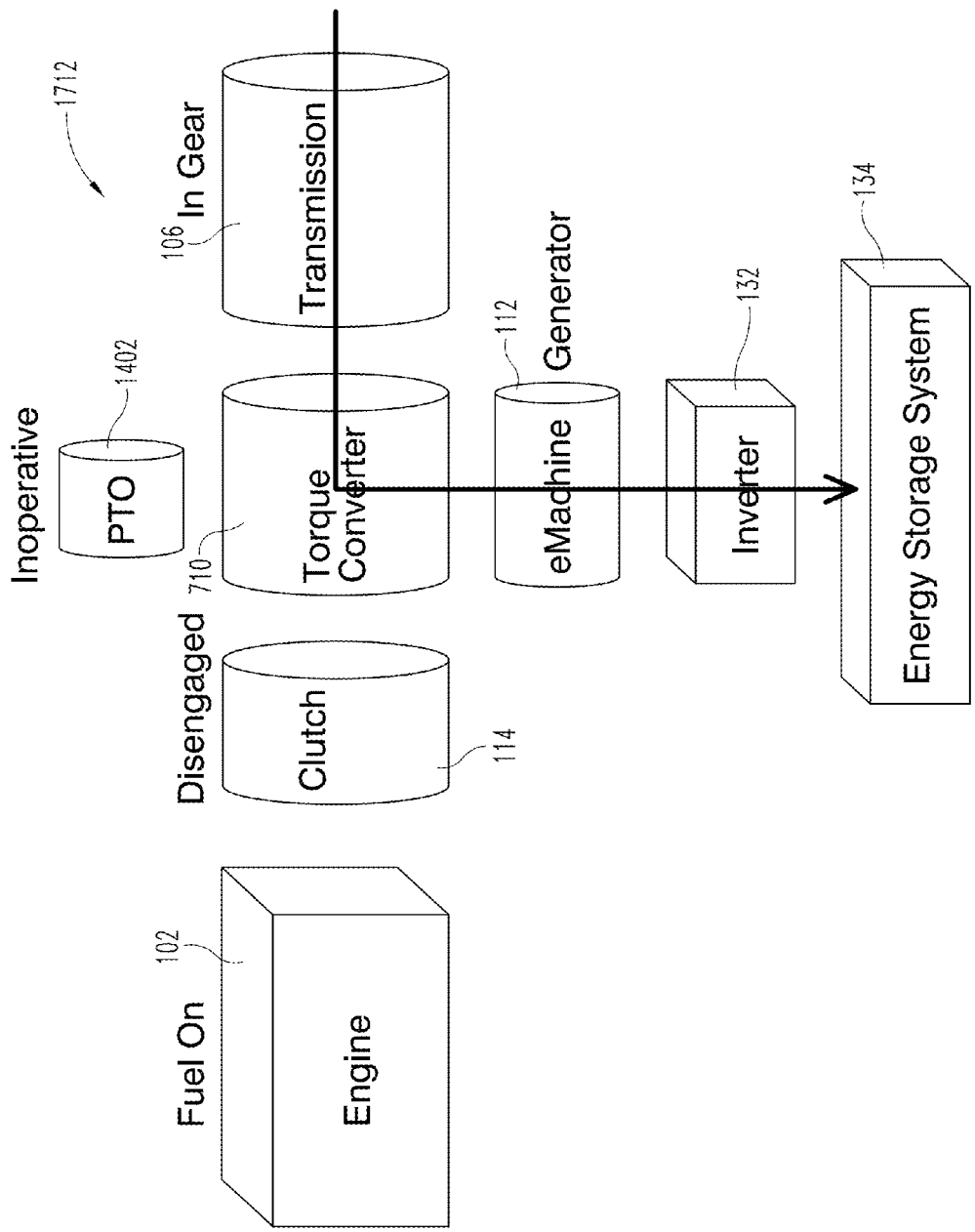
FIG. 24 is a functional diagram of the hybrid system in a regenerative braking charge mode.
Figure 25:
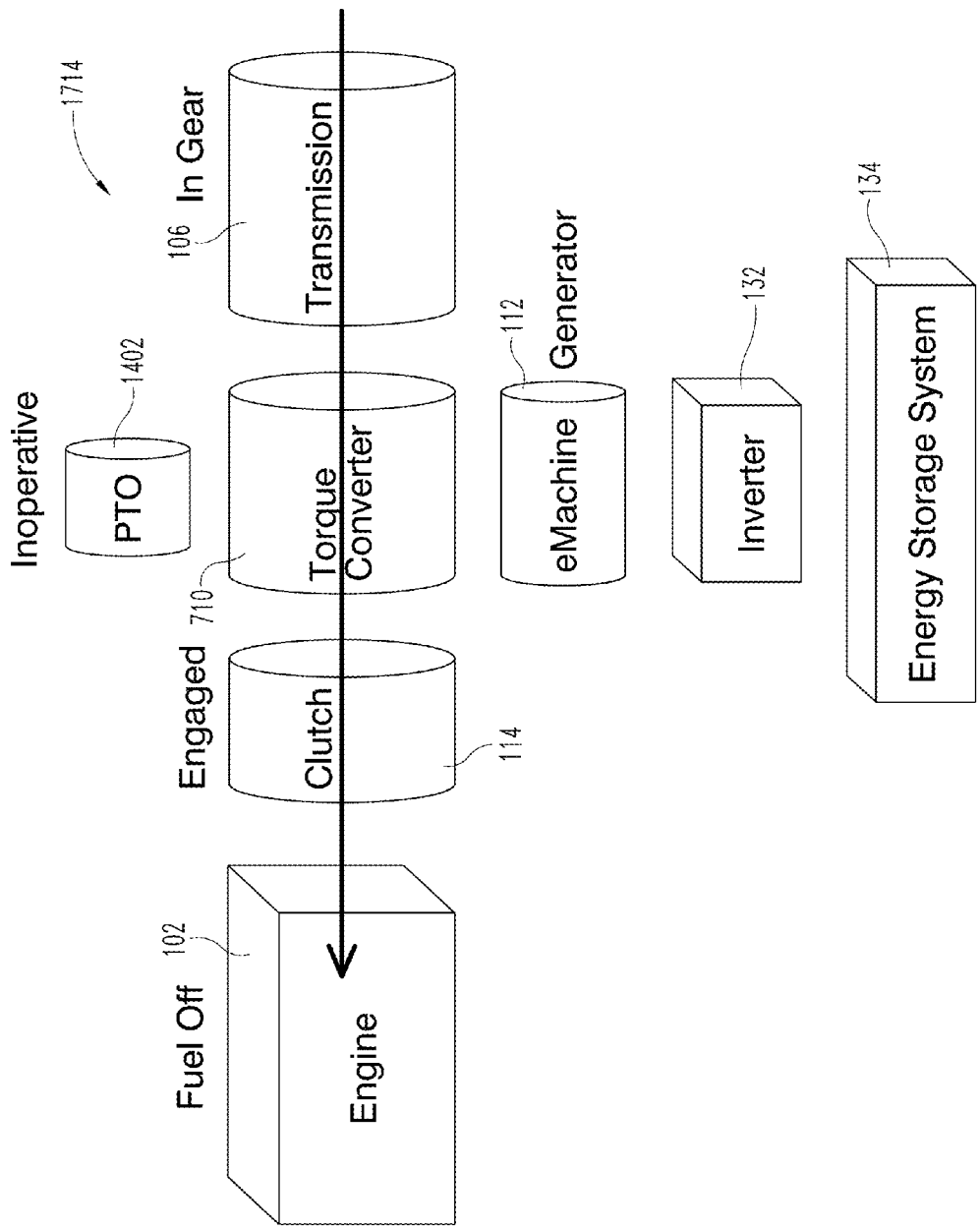
FIG. 25 is a functional diagram of the hybrid system in an engine compression braking mode.

As mentioned before, the hybrid system 100 is able to conserve energy normally lost during braking by utilizing the regenerative braking/charge mode 1712 (FIG. 17). During the regenerative charge mode 1712, as is shown in FIG. 24, the clutch 114 is disengaged. The eMachine 112 acts as a generator while the transmission 106 is in gear. The power from the wheels of the vehicle is transferred through the transmission 106 to the eMachine 112, which acts as a generator to reclaim some of the braking energy and in turn helps to slow down the vehicle. The recovered energy via the inverter 132 is stored in the energy storage system 134. As noted in Table 1 above, during this mode the PTO module 1402 is inoperative.

As depicted in FIG. 17, the hybrid system 100 can transition from the regenerative charge mode 1712 to any number of different operational modes. For instance, the hybrid system 100 can return to the eAssist propulsion mode 1706 by engaging the clutch 114 and switching the eMachine 112 to act as a motor. From the regenerative charge mode 1712, the hybrid system 100 can also return to the propulsion charge mode 1710 by engaging the clutch 114, and switching the eMachine 112 to the motor role. The hybrid system 100 can also switch to the engine-braking mode 1714 from the regenerative charge mode 1712 by turning off the fuel to the engine 102 and engaging the clutch.

In addition to the regenerative braking mode 1712, the hybrid system 100 can also utilize the engine-braking mode 1714 in which compression braking of the engine 102 is used to slow down the vehicle. Referring now to Table 1 as well as FIGS. 17 and 25, during the engine braking mode 1714, the transmission 106 is in gear, the PTO module 1402 is inoperative, and the eMachine 112 is acting as a generator so as to recover some of the braking energy, if so desired. However, during other variations of the engine-braking mode 1714, the eMachine 112 does not need to act as a generator such that the eMachine 112 draws no power for the energy storage system module 134. To transmit the energy from the vehicle's wheels, the engine clutch 114 is engaged and the power is then transmitted to the engine 102 while the fuel is off. In another alternative, a dual regenerative and engine braking mode can be used in which both the engine 102 and the eMachine 112 are used for braking and some of the braking energy from the eMachine 112 is recovered by the energy storage system module 134.

Looking again at FIG. 17, the hybrid system 100 can transition from the engine-braking mode 1714 to any number of different operational modes. As an example, the hybrid system 100 can switch from the engine-braking mode 1714 to the eAssist propulsion mode 1706 by turning on the fuel to the engine 102 and switching the eMachine 112 to act as an electric motor (FIG. 21). From the engine-braking mode 1714, the hybrid system 100 can also switch to the propulsion charge mode 1710 by turning back on the fuel to the engine 102. In addition, the hybrid system 100 can switch from the engine-braking mode 1714 to the regenerative charge mode 1712 by turning on the fuel to the engine 102 and disengaging the clutch 114.

Figure 26:
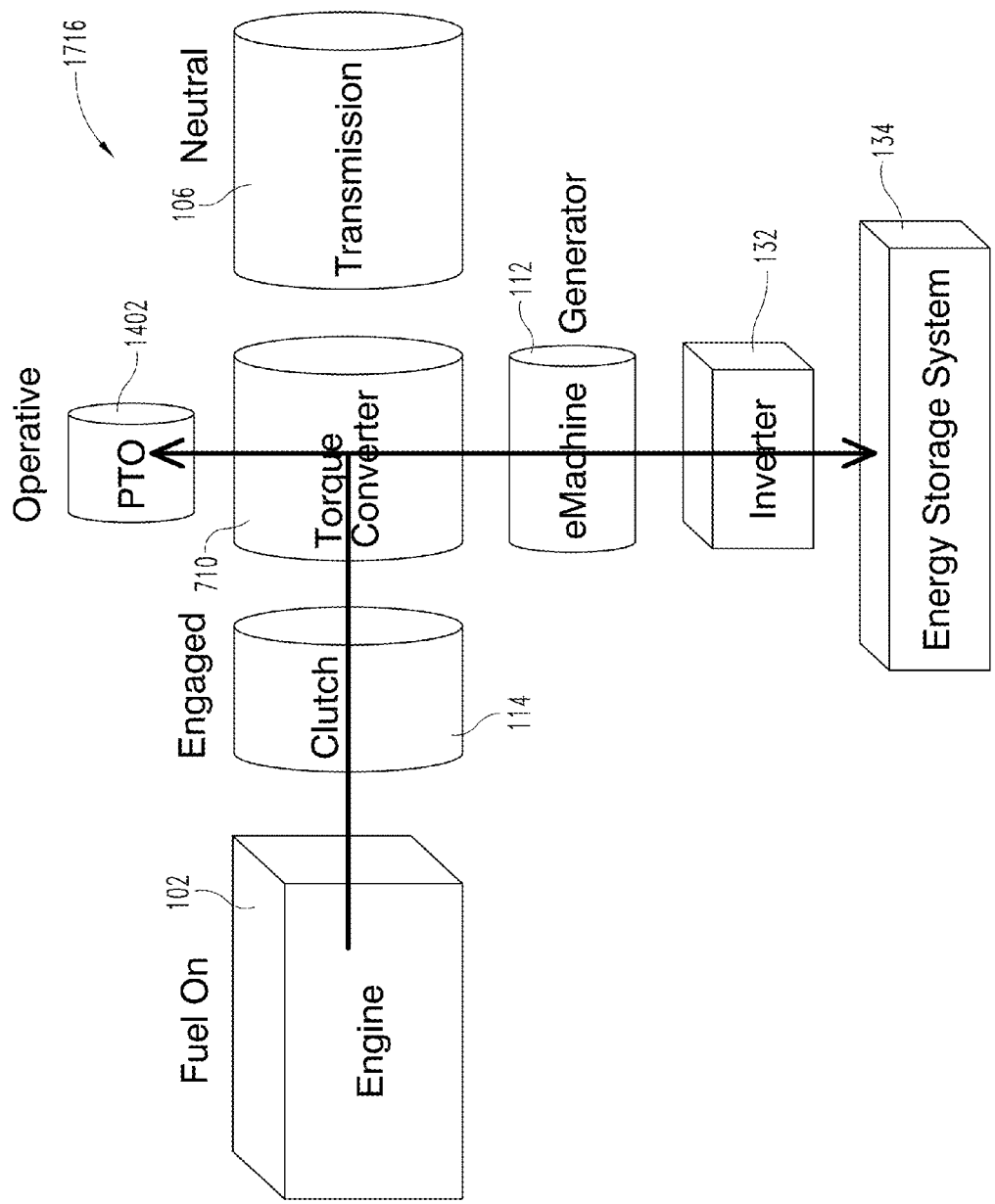
FIG. 26 is a functional diagram of the hybrid system in the power takeoff (PTO) mode.

As mentioned before with reference to FIG. 14, the PTO 1402 is used to drive extra equipment attached to the vehicle, such as lift buckets, jacks, ladders, hydraulic systems, and pneumatic systems, to name just a few examples. When the PTO 1402 is used, the vehicle can be stationary or can be moving (e.g., for refrigeration systems). Referring again to FIG. 17, from the charge neutral mode 1704, the hybrid system 100 enters a PTO mode 1716 by engaging the PTO 1402. FIG. 26 illustrates a diagrammatic view of the hybrid system 100 during this PTO mode 1716. While in the PTO mode 1716, the clutch 114 is engaged such that power from the engine 102 is transmitted to the now-operative PTO 1402. During this PTO mode 1716, the eMachine 112 acts as a generator drawing supplemental power from the engine 102 and transferring it via the inverter 132 to the energy storage system module 134. At the same time, the transmission 106 is in neutral so that the vehicle can remain relatively stationary, if desired. With the PTO 1402 operative, the ancillary equipment, such as the lift buckets, etc., can be used. The hybrid system 100 can return to the charge neutral mode 1704 by making the PTO 1402 inoperative.

Figure 27:
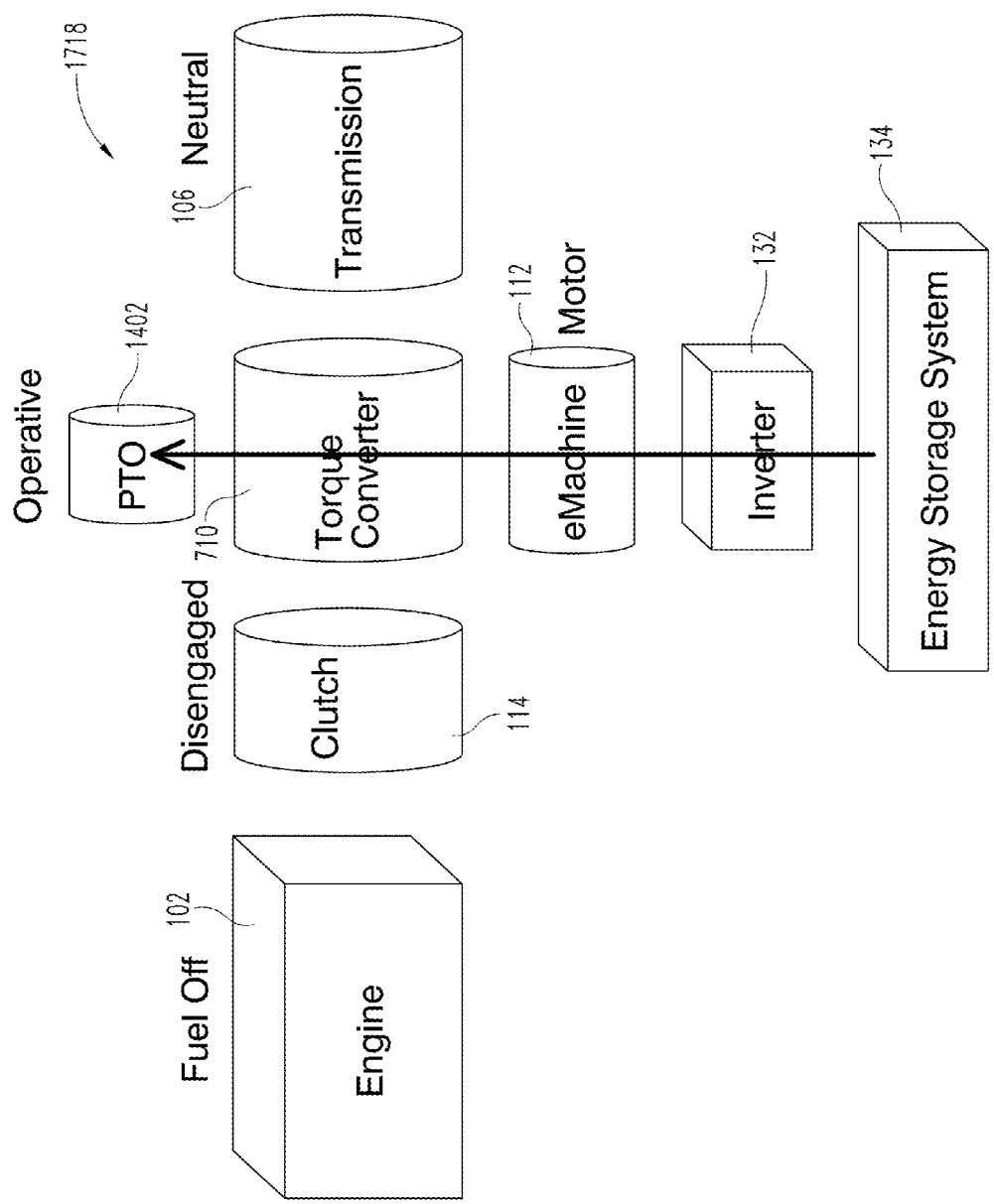
FIG. 27 is a functional diagram of the hybrid system in an electrical power takeoff (ePTO) mode.

During the PTO mode 1716, the engine 102 is constantly running which tends to waste fuel as well as create unnecessary emissions in some work scenarios. Fuel can be conserved and emissions reduced from the hybrid system 100 by switching to an electric or ePTO mode 1718 of operation. Looking at FIG. 17, when transitioning to the ePTO mode 1718, the clutch 114, which transmits power from the engine 102, is disengaged and the engine 102 is stopped. FIG. 27 illustrates diagrammatically the operation of the hybrid system 100 during this ePTO mode 1718. As depicted, the eMachine 112 is switched to act as an electric motor and the PTO 1402 is operative. At the same time, the transmission 106 is in neutral and the engine 102 is stopped. Having the engine 102 turned off reduces the amount of emissions as well as conserves fuel. The hybrid system 100 can return from the ePTO mode 1718 to the PTO mode 1716 by starting (or continue operation of) the mechanical 118 and/or electrical 120 pumps, engaging the clutch 114 and starting the engine 102 with the eMachine 112 acting as a starter. Once the engine 102 is started, the eMachine 112 is switched over to act as a generator and the PTO 1402 is able to operate with power from the engine 102.

Figure 28:
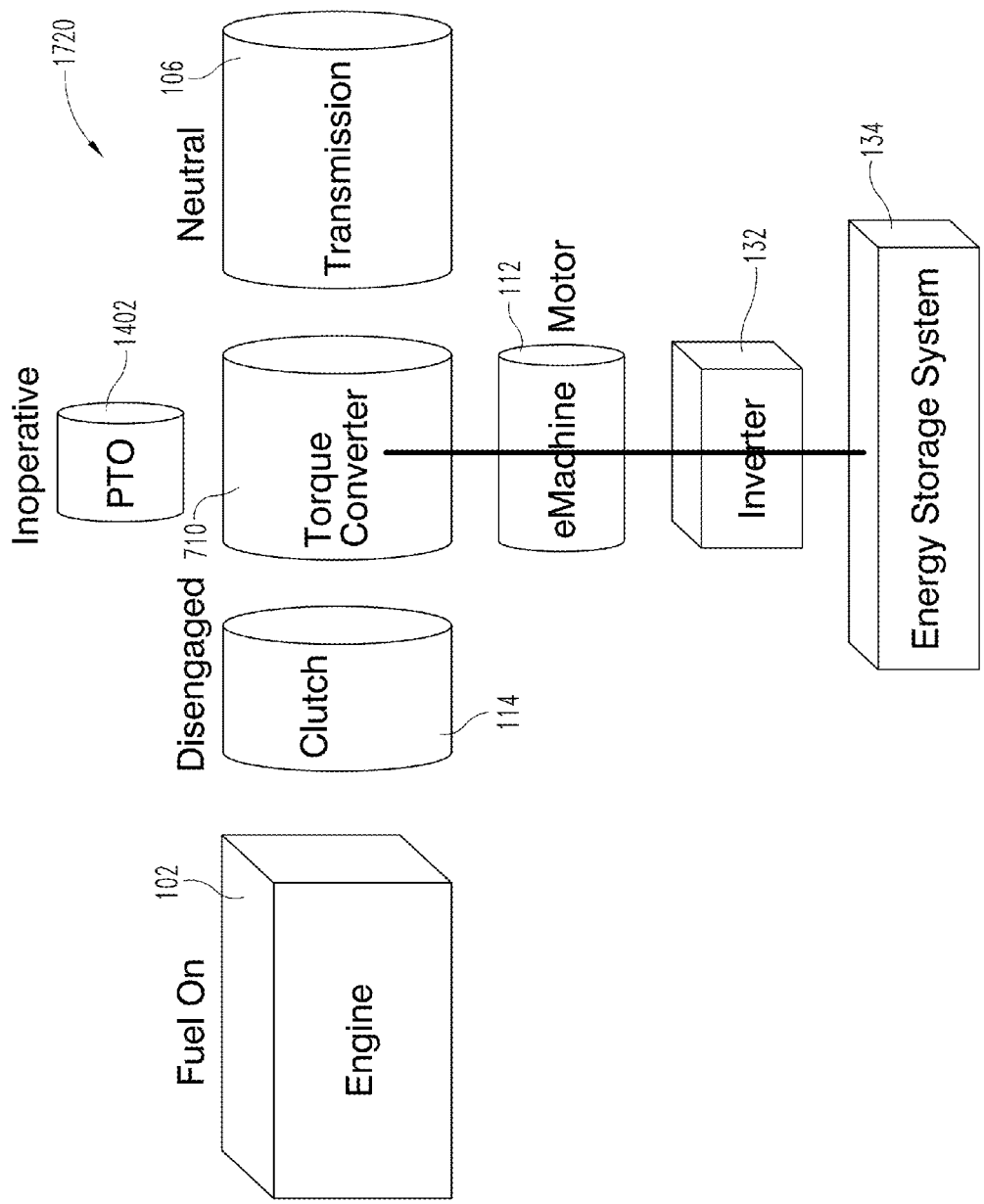
FIG. 28 is a functional diagram of the hybrid system in a no charge neutral mode.

A number of vehicles, such as delivery trucks, service vehicles, buses, tractors, tractor-trailers, and the like, may make repeated stops and/or idle for long periods of time, thereby wasting fuel and creating unnecessary emissions. The hybrid system 100 is designed to operate so as to conserve fuel in all modes of operation and reduce emissions when the vehicle is idling or stopped. Turning to FIG. 17, from the charge neutral mode 1704, the clutch 114 is disengaged and the eMachine 112 is switched to operate as an electric motor such that the hybrid system 100 is in a no charge neutral mode 1720. FIG. 28 shows a diagram of the hybrid system 100 when in the no charge neutral mode 1720. As depicted, the fuel to the engine 102 is still on, but the clutch 114 is disengaged such that no power is transferred from the engine 102 to the transmission 106. In addition, the transmission 106 is in neutral such that the vehicle is typically not moving. However, it should be recognized that in other examples the vehicle can be moving. While in this mode 1720, the PTO 1402 is inoperative and the eMachine 112 again operates as a motor, but the eMachine 112 is not transferring power to either the transmission 106 or the engine 102.

Figure 29:
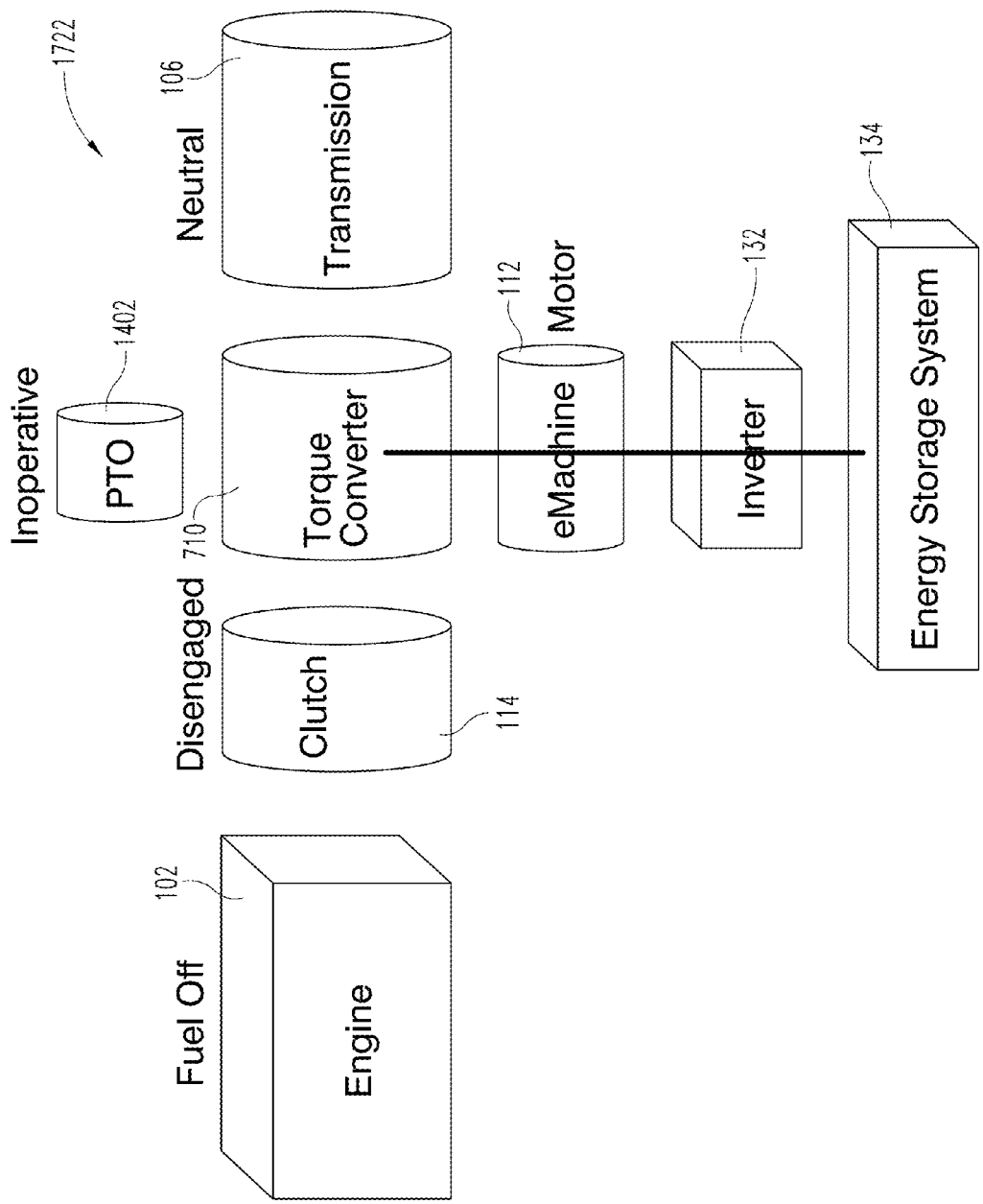
FIG. 29 is a functional diagram of the hybrid system in an engine stop neutral mode.

To conserve fuel as well as limit emissions, the hybrid system 100 can change from the no charge neutral mode 1720 to an engine stop neutral mode 1722 (FIG. 17) in which the fuel to the engine 102 is shut off such that the engine 102 is stopped. FIG. 29 shows the condition of the hybrid system 100 when in the engine stop neutral mode 1722. While in the engine stop neutral mode 1722, the engine 102 is stopped at the same time the clutch 114 is disengaged, the transmission 106 is in neutral, and the PTO 1402 is inoperative. The electric pump 120 is usually in operation anytime the engine 102 is off and a temperature signal suggests cooling and/or lubrication flow is necessary, or when another operational mode is imminent. From the engine stop neutral mode 1722, the hybrid system 100 can return to the charge neutral mode 1704 (FIGS. 17 and 20) by starting the electrical pump 120 so as to circulate the fluid, engaging the clutch 114, and spinning the engine 102 via the eMachine 112 in a fashion similar to the initialization mode 1702, which is illustrated in FIG. 19. In other words, transitioning to the charge neutral mode from the engine stop neutral mode 1722 requires restarting of the engine 102. It should be recognized that the above-discussed modes can transition in other ways. For instance, from the engine stop neutral mode 1722, the hybrid system 100 can transition to the eDrive mode 1708 by placing the transmission 106 into gear.

Figure 30:
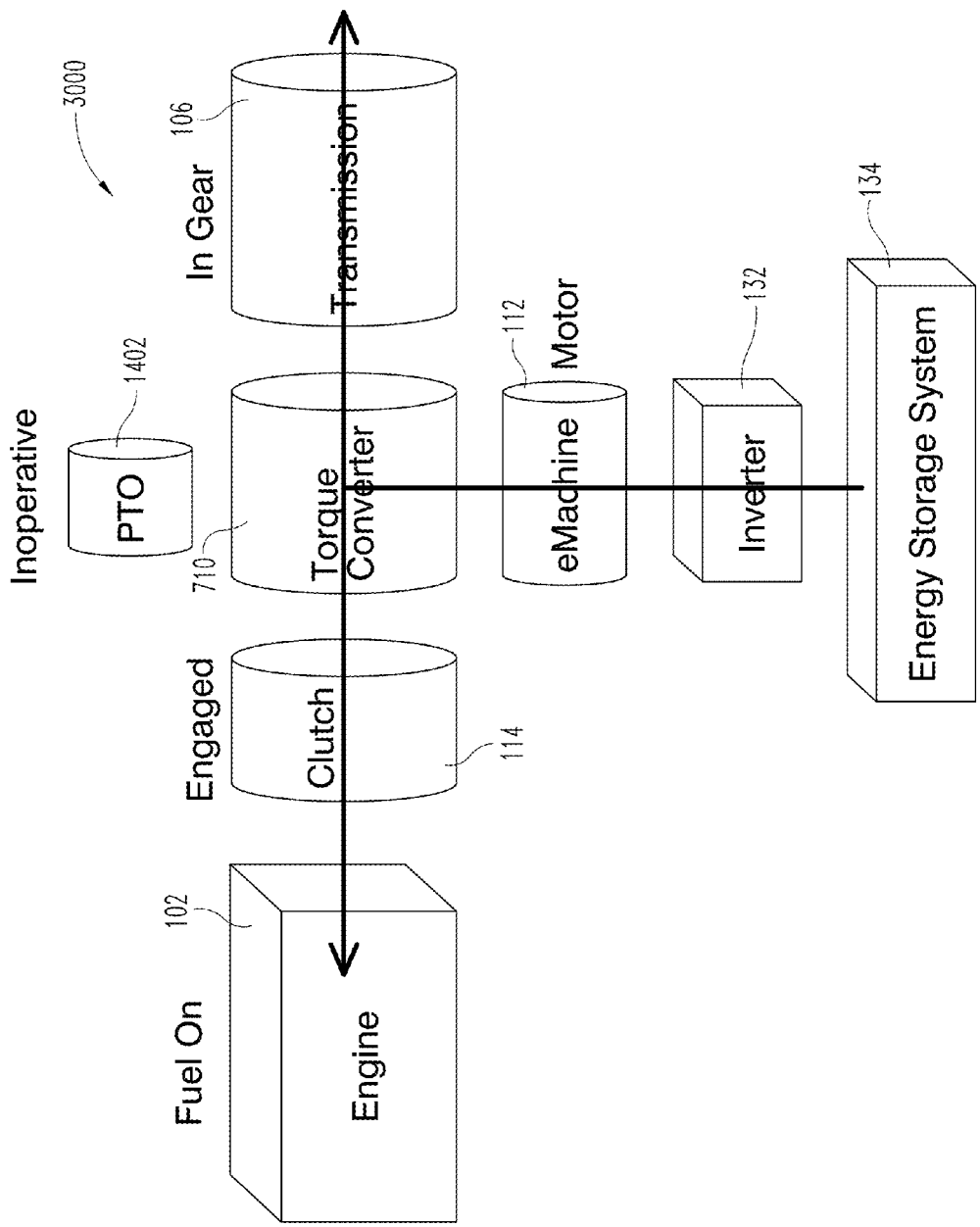
FIG. 30 is a functional diagram of the hybrid system in a propulsion starter mode.

It should be recognized that the hybrid system 100 can operate in other manners. FIG. 30 illustrates another example of an operation mode, and in particular, it shows an eDrive with engine start mode 3000. Looking at FIGS. 17 and 22, when in the eDrive mode 1708, the eMachine 112 solely provides power to the transmission 106. While the eDrive mode 1708 can be helpful during rapid acceleration as well as for fuel conservation, at times, the power in the energy storage system 134 can be reduced to such a level as to require additional power from the engine 102. Moreover, under certain operational conditions, it may be desirable to have the engine 102 supplement the power of the eMachine 112 such as to create a eAssist propulsion mode 1706. To transition from the eDrive mode 1708 to the eAssist propulsion mode 1706, the clutch 114 is engaged and the eMachine 112 acts as a starter to crank the engine 102 and subsequently start the engine 102. At the same time, the eMachine 112 is driving the transmission 106, which is in gear. During this stage 3000, the PTO 1402 is inoperative.

Figure 31:
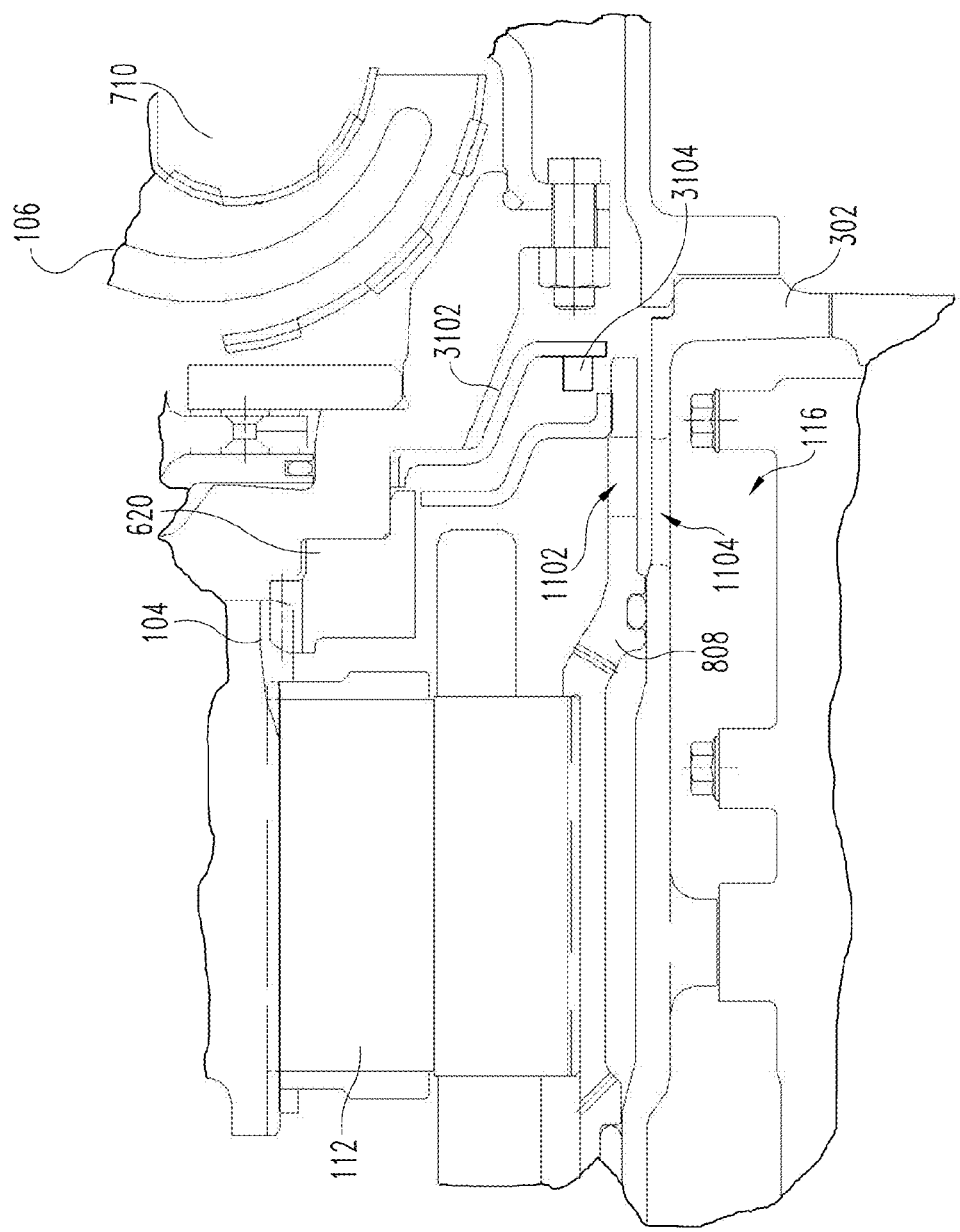
FIG. 31 is an enlarged cross-sectional view of a hybrid module according to another embodiment that incorporates a slinger blade configured differently from the one illustrated in FIG. 11.
Figure 32:
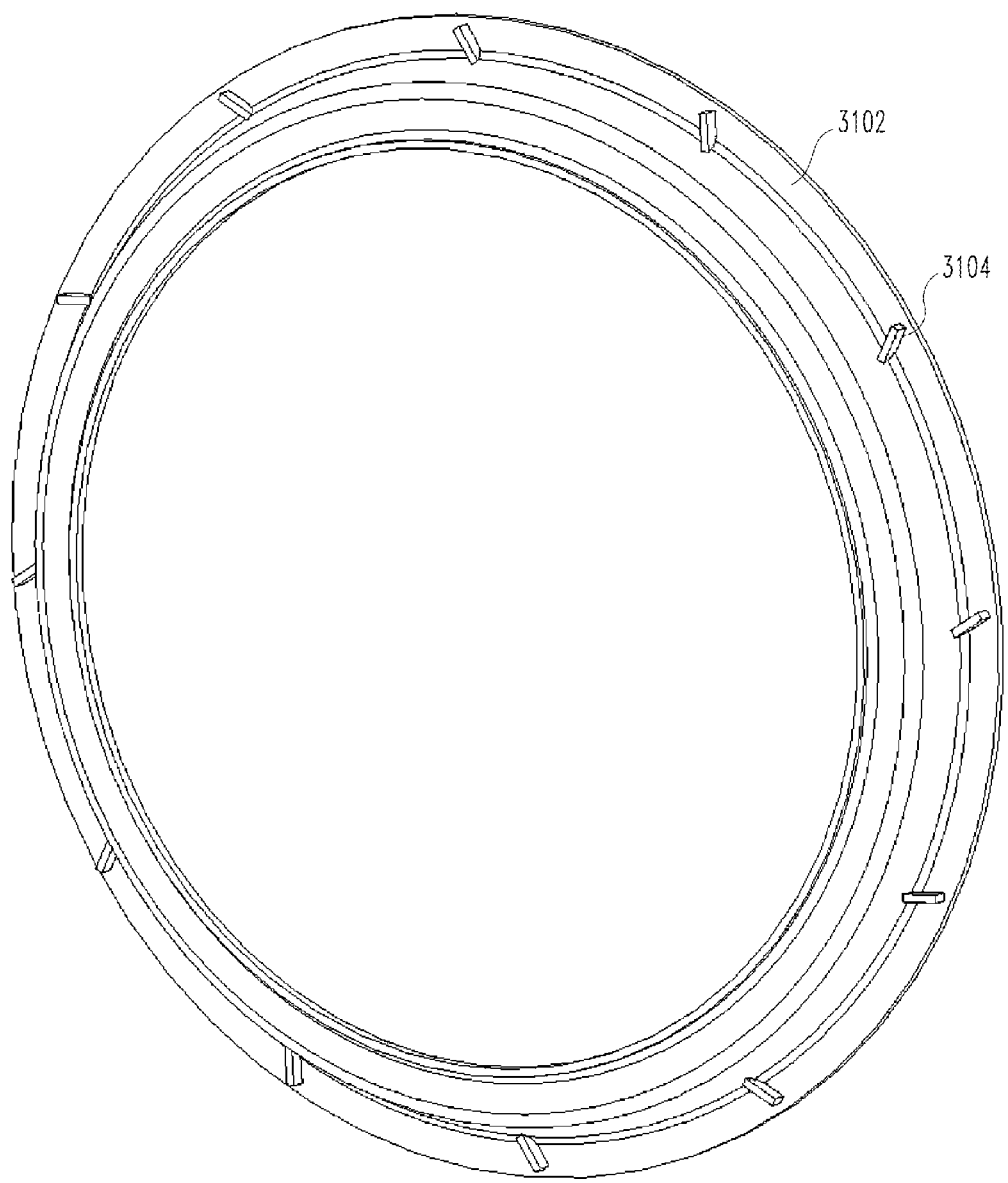
FIG. 32 is a perspective view of the slinger blade illustrated in FIG. 31.

As should be appreciated, the hybrid system 100 can be configured differently in other embodiments. As an example, the slinger blade 816 illustrated in FIG. 11 can be configured differently. For instance, a slinger blade 3102 illustrated in FIGS. 31 and 32 shows just one example. As shown, the slinger blade 3102 includes several blade members 3104 configured to propel the lubricant. This is just one example, and other variations of the hybrid system 100 are contemplated.

Figure 33:
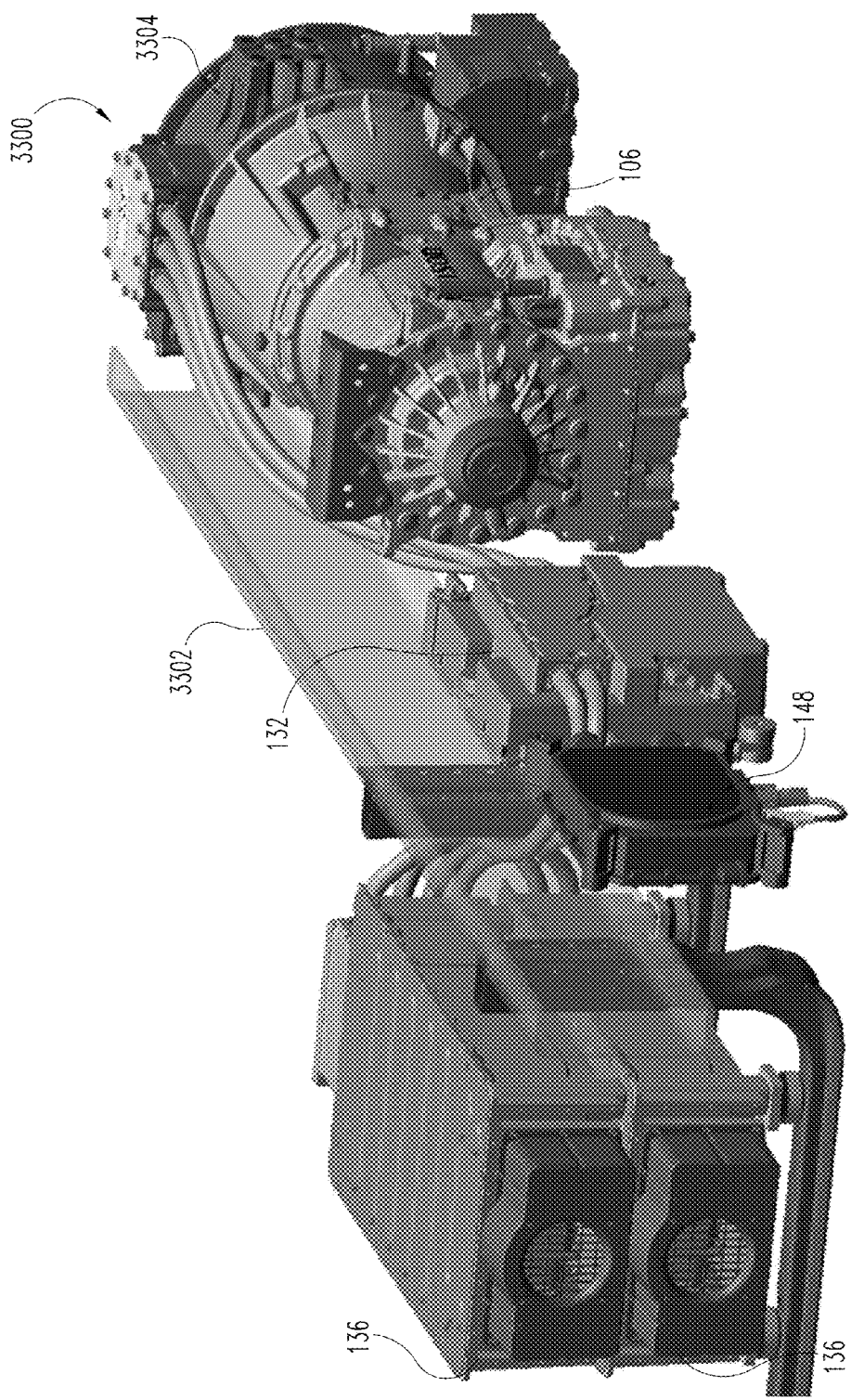
FIG. 33 is a perspective view of another example of a hybrid system.
Figure 34:
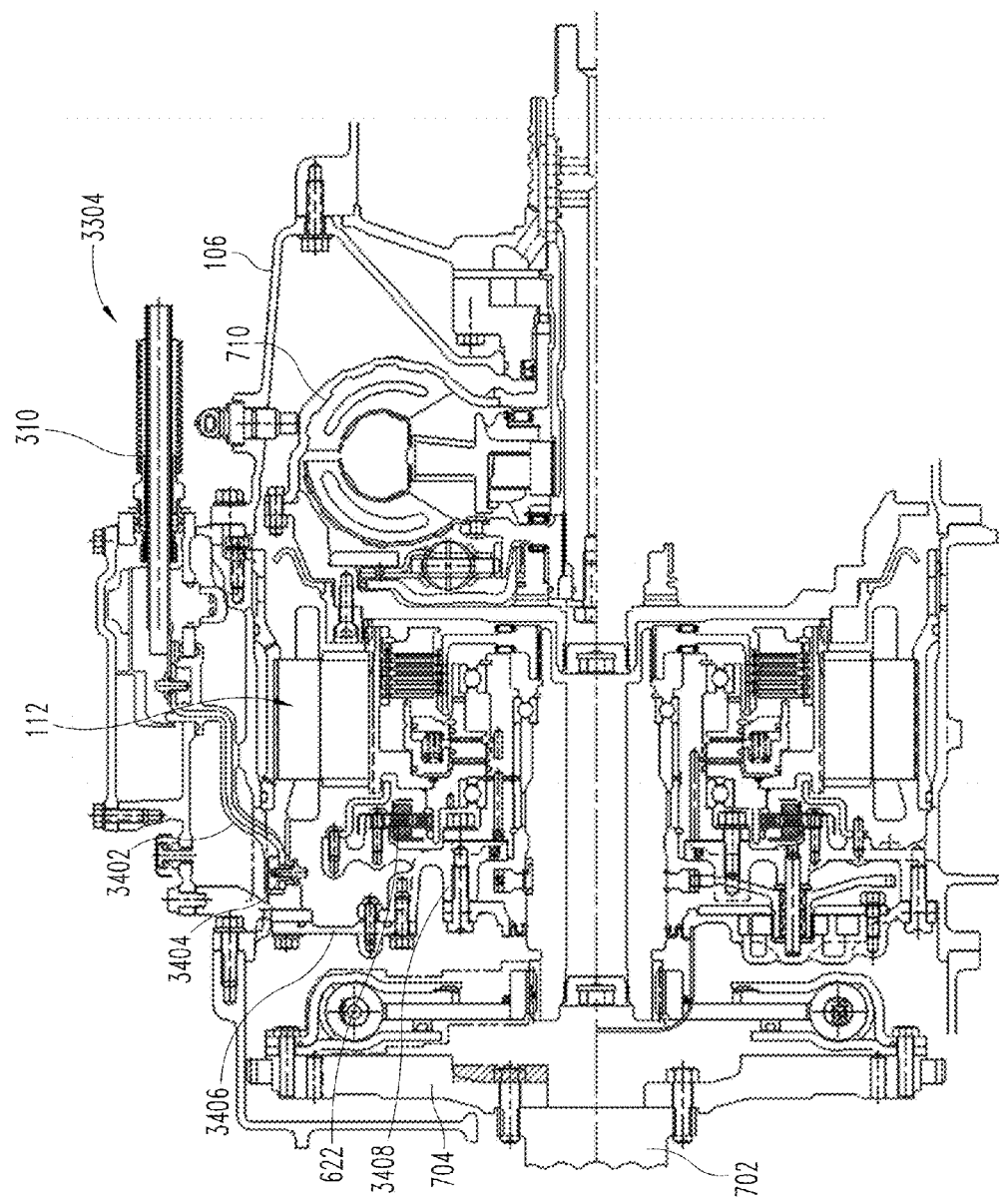
FIG. 34 is a cross-sectional view of a hybrid module used in the FIG. 33 hybrid system.

FIG. 33 shows a perspective view of another example of a hybrid system 3300 as installed in a vehicle frame 3302 of a vehicle. The hybrid system 3300 includes a number of components of the type previously described, such as the transmission 106, the inverter 132, the energy storage system 134 with energy storage module 136, and the hybrid control module 148. The hybrid system 3300 further includes a hybrid module 3304. Turning to FIG. 34, the hybrid module 3304 shows a number of features in common with the previously-described one. For the sake of brevity and clarity, the features that are common between the two hybrid modules will not be discussed, but please refer to the discussion of these common features. However, the differences between the two hybrid modules will be discussed below.

Figure 35:
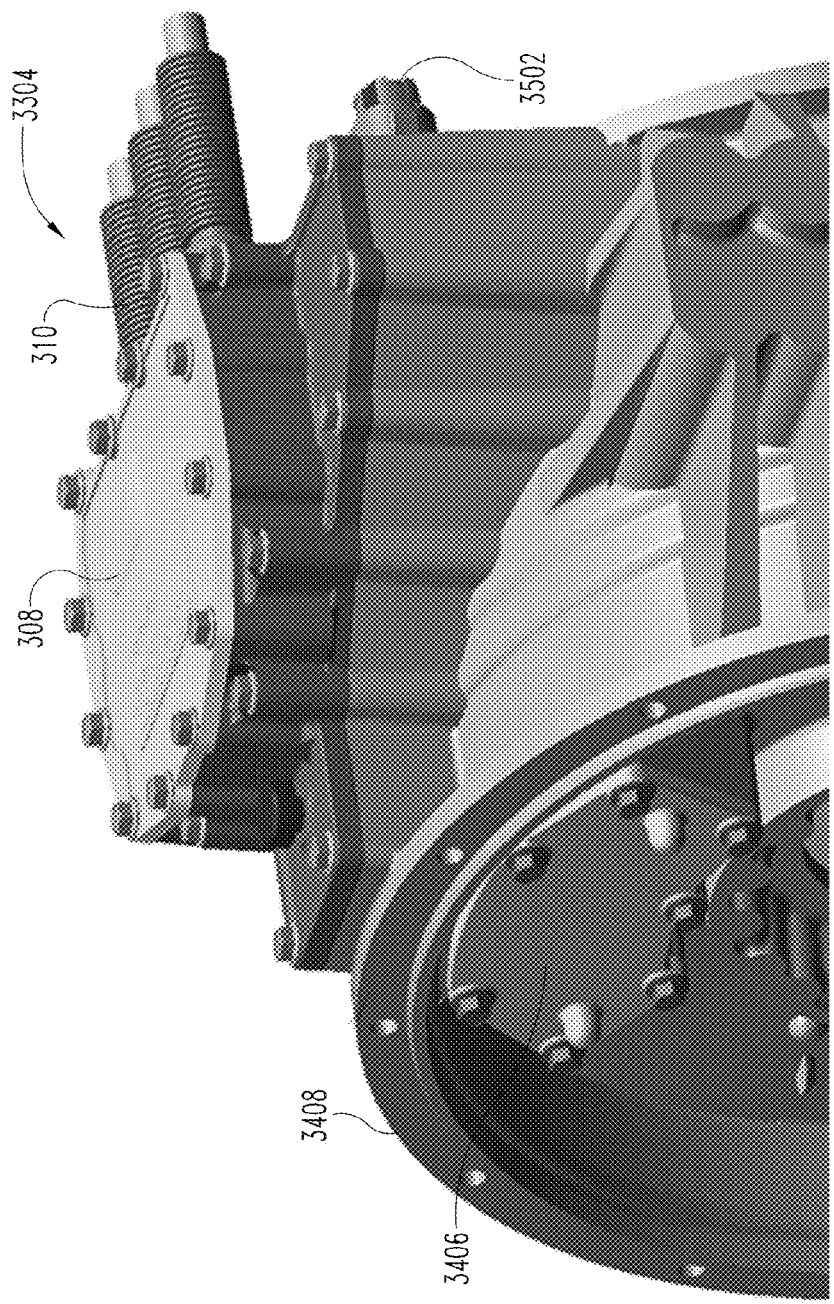
FIG. 35 is an enlarged, partial perspective view of the FIG. 34 hybrid module.

During testing of the hybrid system 3300, it was discovered that the resolver assembly 622 experienced significant electromagnetic noise. It should be recognized that excessive electrical noise can be detrimental to the overall operation of the hybrid module. For instance, this noise can result in improper torque control. As one example, the excessive electrical noise can cause the resolver assembly 622 to provide an inaccurate position signal for the rotor which in turn can cause the hybrid module to accidentally operate in reverse when engaged in drive. One source that was discovered for the electromagnetic noise was due to the stator terminal block 804 (FIG. 8) being located too close to the resolver 622. As can be seen when comparing FIGS. 7 and 34, stator connector wires 3402 and stator terminal block 3404 have been moved away from the resolver assembly 622. Given that the stator terminal block 3404 is now recessed, a stator connector access cover 3406 was added to hybrid module housing 3408 to facilitate access for connecting the stator connector wires 3402 to the stator terminal block 3404. FIG. 35 is a partial perspective view of the hybrid module 3304 that shows the stator connector access cover 3406 connected to the hybrid module 3408 via bolts to allow easy access.

Referring to FIGS. 33 and 35, when the hybrid module 3304 is installed in the vehicle frame 3302, connecting the various electrical wires can be somewhat difficult due to the cramped conditions. To address this issue, a low voltage connector 3502 has been moved to align with high voltage wires 310 such that one is able to connect both the high voltage wires 310 and low voltage wires on the same side with less difficulty, as is shown in FIG. 35.

Figure 36:
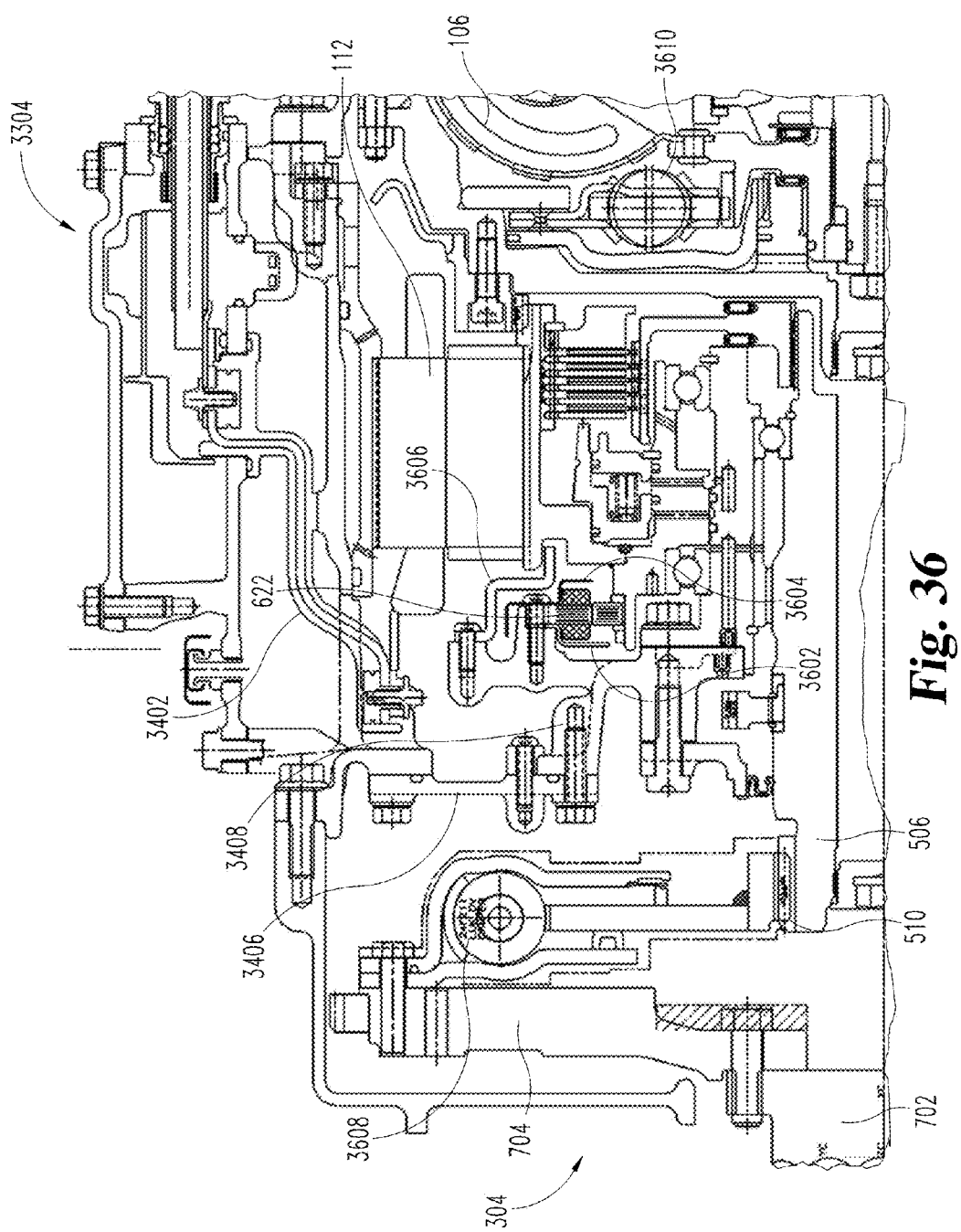
FIG. 36 is an enlarged, cross-sectional view of an upper section of the FIG. 34 hybrid module.

FIG. 36 shows an enlarged cross-sectional view of the hybrid module 3304. As noted above, the resolver assembly 622 was affected by electromagnetic noise. To further address this noise issue, additional shielding has been added to shield the resolver assembly 622 from electromagnetic noise created by the eMachine 112 along with the other components. As can be seen in FIG. 36, the resolver assembly 622 on the side facing the engine has an engine facing shield 3602, and on the side opposite the engine facing shield 3602, the resolver assembly 622 has a transmission facing shield 3604. Both shields 3602 and 3604 are secured via a bolt. The transmission facing shield has a section that is also located radially outward from the resolver assembly 622. The engine 3602 and transmission 3604 facing shields help to reduce the effects of electrical noise on the resolver assembly 622. Proximal the eMachine 112, the hybrid module 3304 has an eMachine facing shield 3606 to further reduce noise at the resolver assembly 622 emanating from the eMachine 112. Depending on the environment, it is envisioned that in other variations the resolver assembly 622 can have more or less shields than illustrated.

While designing the hybrid system, it was unexpectedly discovered that the splines 510 on the input shaft 506 experienced significant axial wear on the engine engagement side 304. To address this wear issue, the hybrid module 3304 incorporates a damper 3608 attached between the flywheel 704 and the input shaft 506 at the engine engagement side 304. It was originally thought the hybrid module damper 3608 was not needed as the transmission 106 included a transmission damper 3610 to compensate for torsional issues. As will be explained in greater detail below, the hybrid module damper 3608, while compensating for torsional issues, is mainly installed at the engine engagement side to flex and compensate for axial movement of the drive shaft 702 during operation of the engine 102. In other alternative examples, other structures and systems can be used to compensate for the axial wear of the splines 510 on the input shaft 506, and these examples will be explained later below with reference to FIGS. 42-45. To avoid any harmonics issues, the hybrid module damper 3608 has a different stiffness as compared to the transmission damper 3610. In one particular example, the hybrid module damper 3608 is stiffer than the transmission damper 3610, but it should be appreciated different combinations of stiffness can be used. Moreover, it is envisioned that in other variations the transmission damper 3610 can be eliminated such that the torsional and axial wear issues are addressed solely through the hybrid module damper 3608.

Figure 37:
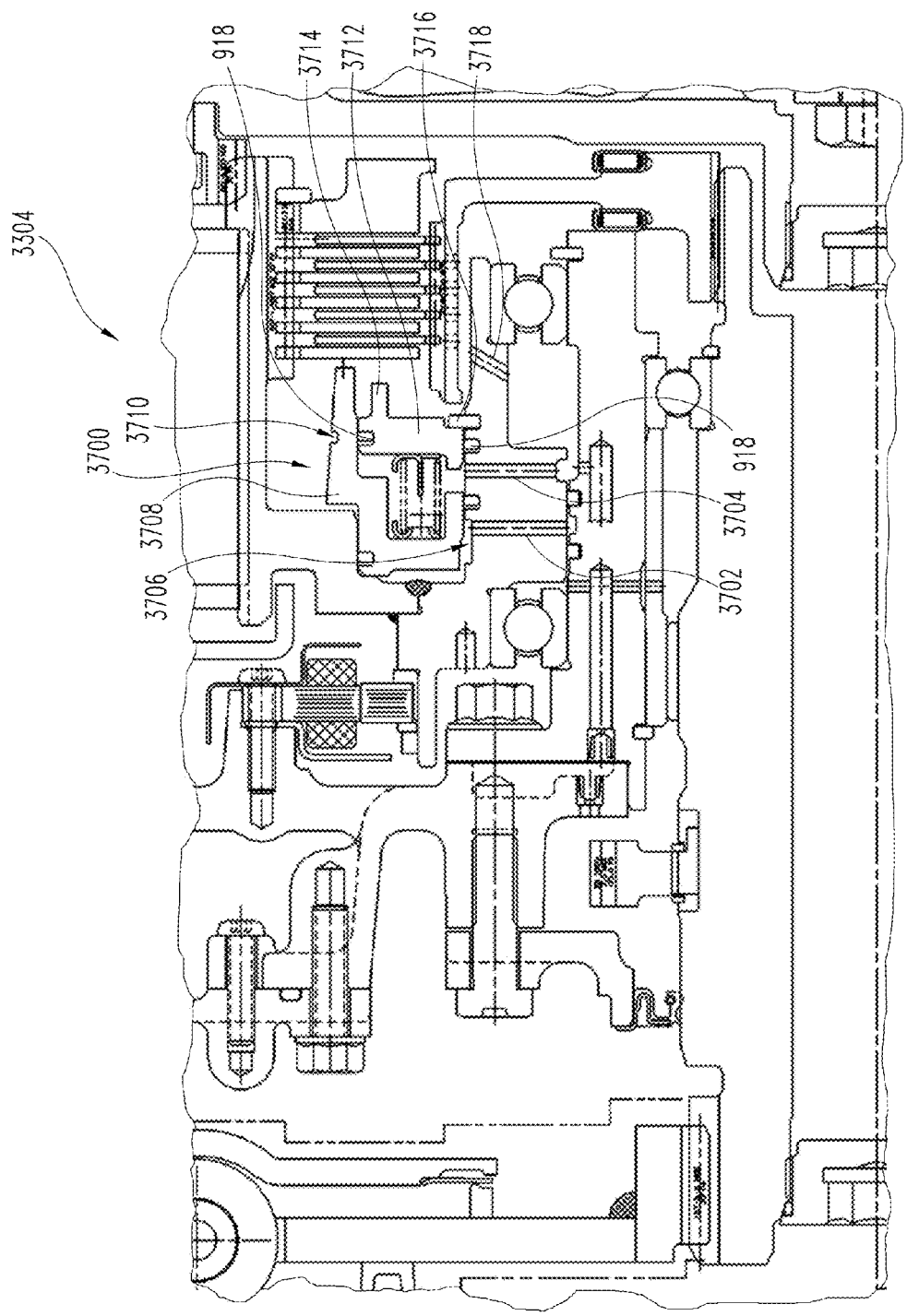
FIG. 37 is an enlarged, cross-sectional view of a clutch assembly in the FIG. 34 hybrid module.
Figure 38:
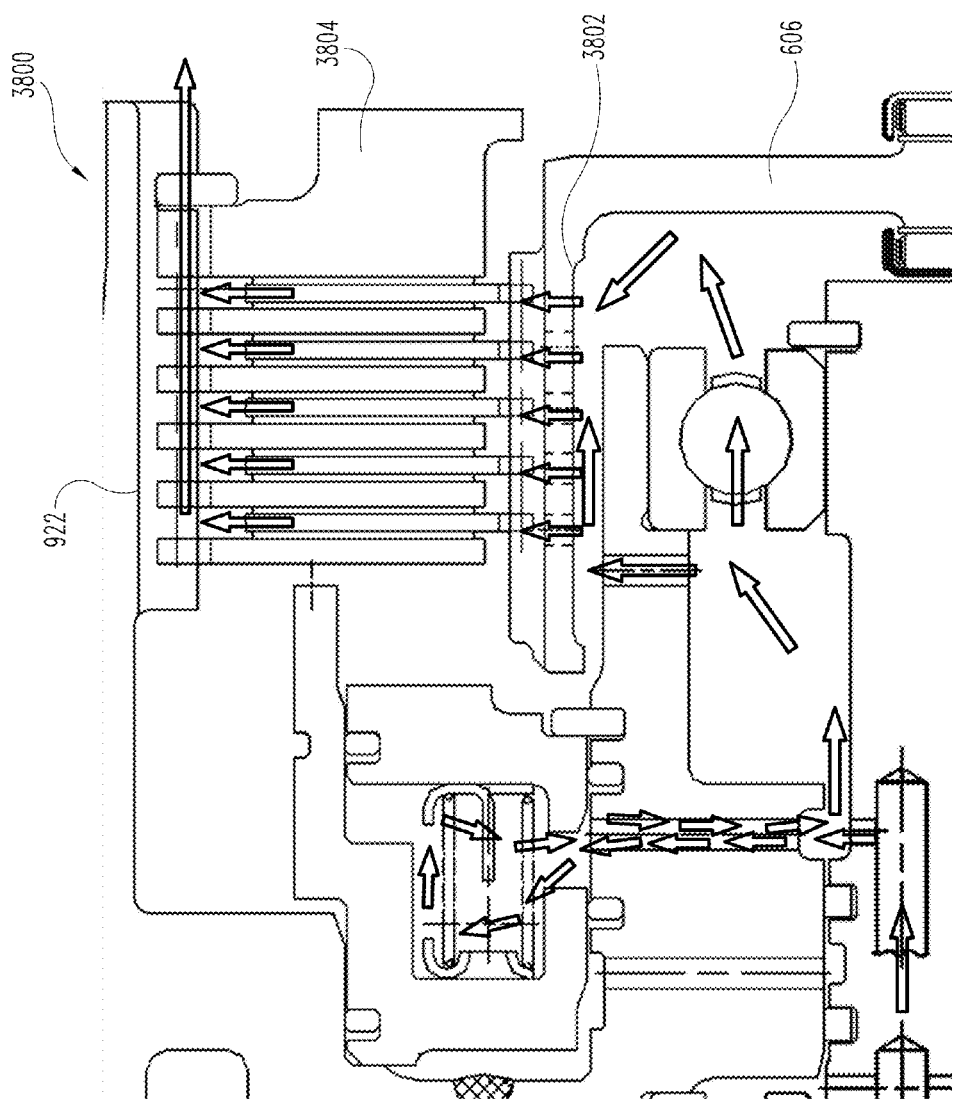
FIG. 38 is an enlarged, cross-sectional view showing the lubrication flow path in a clutch assembly.

To enhance manufacturing and operability of the clutch mechanism, various changes have been made to the overall clutch system. Turning to FIG. 9, the various passages, such as intermediate passage 944 were angled so as to compensate for the relatively compact design of the clutch assemble. Comparing this configuration to the one in FIG. 37, intermediate supply passages 3702 and 3704 of clutch assembly 3700 in FIG. 37 are straight rather than angled as shown in the FIG. 9 example. As should be recognized radially straight passages help to simplify manufacture of the passages 3702, 3704. In view of the intermediate clutch supply passage 3702 being straight, a slot 3706 was formed to facilitate fluid supplying back pressure to the clutch assembly 3700. Piston 3708 of the clutch assembly 3700 has also been slightly modified from the previous piston 906 to enhance assembly as well as function. As can be seen, the rounded section on the piston 3708 has been removed and angled such that the piston 3708 now includes an assembly slot 3710 that is used to grip the piston during insertion or assembly. With this slot 3710, the same tool used install other components of the clutch assembly can be used to install the piston 3708. As illustrated in FIG. 37, the clutch 3700 has a piston guide member 3712 that is different from the piston guide member 914 in FIG. 9. The piston guide member 3712 includes a projection 3714 that is used to grip the piston guide 3712 during insertion. Once inserted, a snap ring 3716 holds the piston guide member 3712 in place. The clutch assembly 3700 in FIG. 37 has a clutch plate lubrication passage 3718 that is angled, but it is envisioned that the clutch lubrication passage 3718 can be straight, as is shown in FIG. 38. FIG. 38 illustrates an enlarged cross-sectional view of another variation of a clutch assembly 3800 showing the lubrication path of oil through the clutch assembly 3800. A clutch hub annulus 3802 in the clutch hub 606 catches the oil and directs the oil through lubrication holes 3804, as is shown by the arrows.

Figure 39:
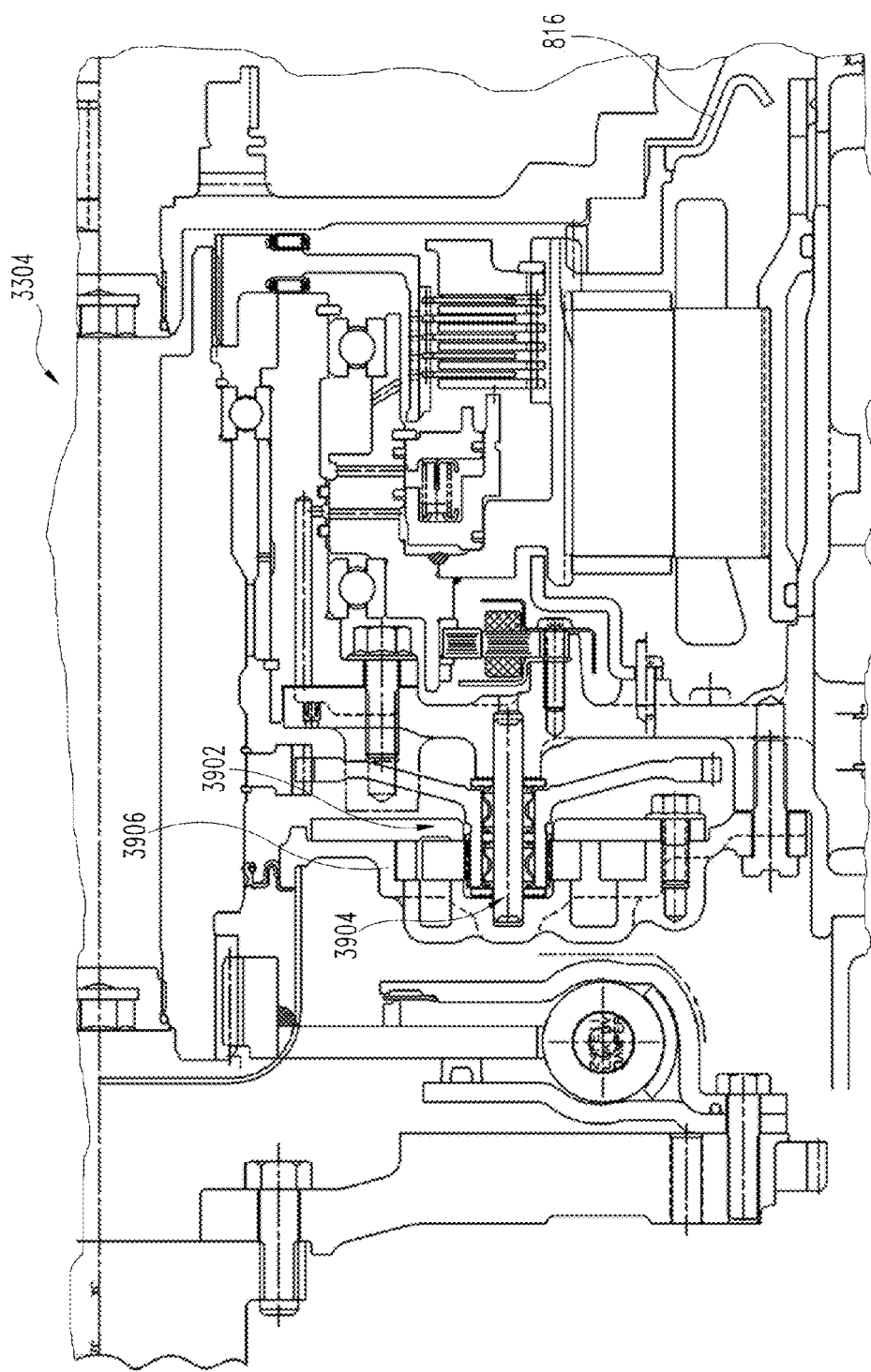
FIG. 39 is an enlarged, cross-sectional view of a mechanical pump in the FIG. 34 hybrid module.

FIG. 39 is an enlarged cross-sectional view of the hybrid module 3304 around the slinger blades 816 and mechanical pump 3902. During spin loss tests, it was discovered that the dam structure 818 with the dam passageway 820, as is shown in FIG. 8, significantly increased spin loss. Looking now at FIG. 39, the stationary dam structure or splashguard has been eliminated while the slinger blade 816 remains. This design not only reduces spin loss, but also improves cooling and hydraulic flow within the hybrid module 3304.

Other changes have been made to the mechanical pump 3902 so as to facilitate assembly and enhance reliability. Referring again to FIG. 7, the previous mechanical pump 118 required a screw to hold it in place. Instead of using a screw, the mechanical pump 3902 in FIG. 39 has a pump shaft 3904 pressed in place via a housing section 3906. This design again helps to simplify the configuration of the mechanical pump 3902 as well as aid in assembly, maintenance, and operation.

Figure 40:
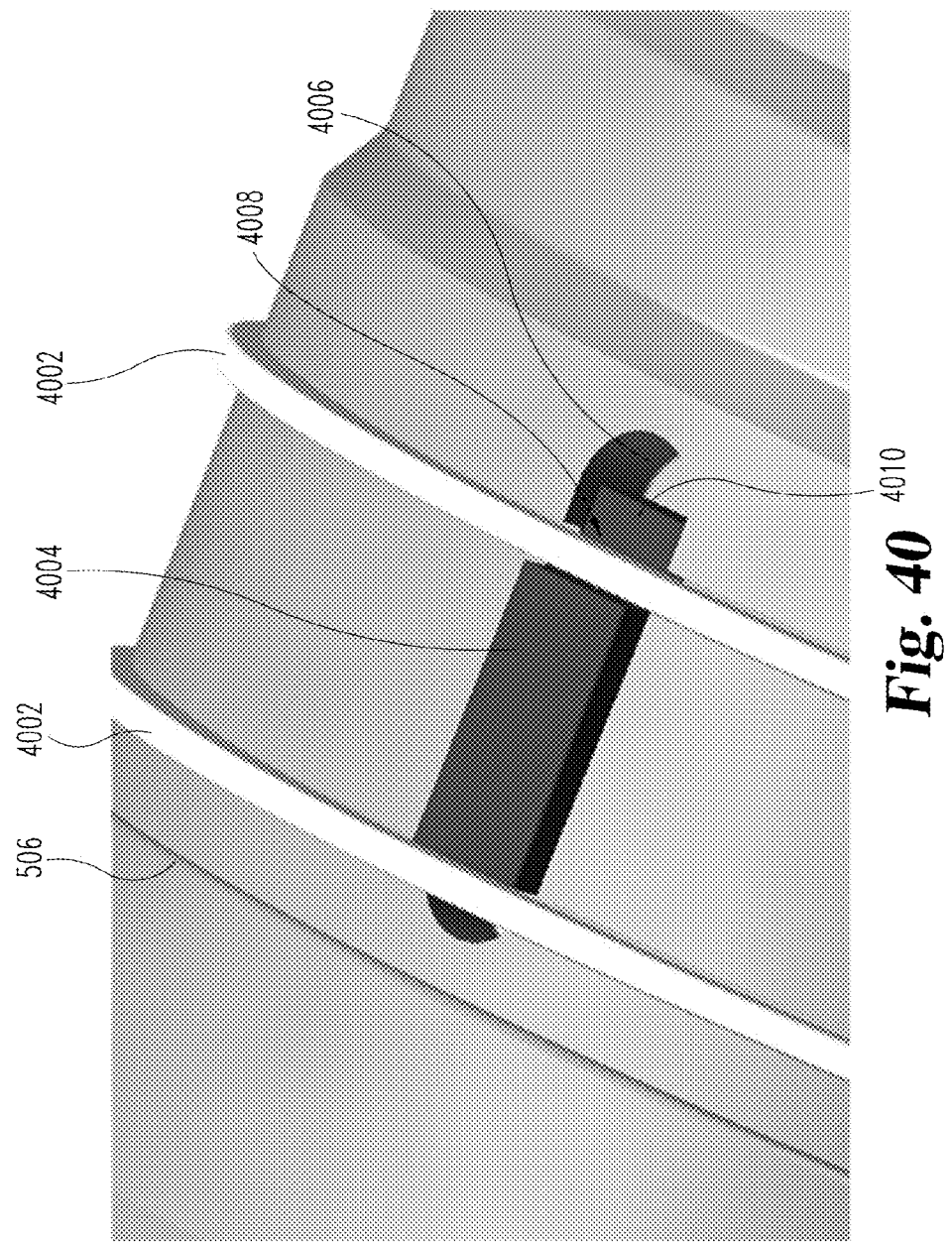
FIG. 40 is a partial perspective view of a keying arrangement for a gear used to power the FIG. 39 mechanical pump.
Figure 41:
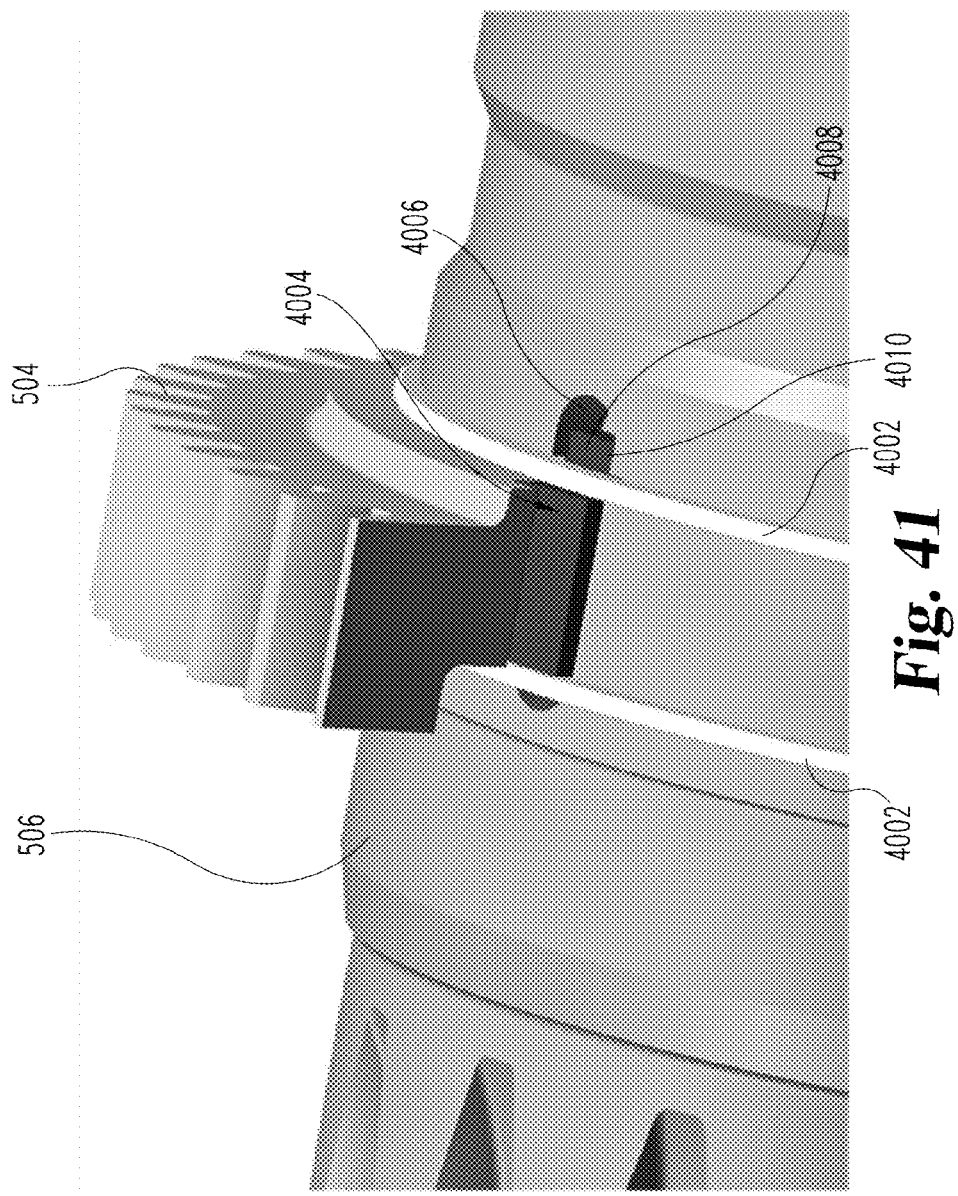
FIG. 41 is a partial perspective view of the keying arrangement and gear used to power the FIG. 39 mechanical pump.

Turning now to FIGS. 40 and 41, the pump drive gear 504 has also been configured to help facilitate better assembly. Specifically, the snap rings 4002 are located on opposing sides so as to retain the pump drive gear 504. However, some difficulty was experienced in inserting the key 4004, which is used to align the pump drive gear 504, during assembly. As shown in FIG. 40, the key 4004 is received in a key notch 4006 in the input shaft 506. However, during assembly, the key 4004 had a tendency to fall out of the key notch 4006. To address this issue, the key has been designed to have a notch section 4008 forming a retainer portion 4010 that is received under one of the snap rings 4002 to hold the key 4004 in place. The key 4004 can then be easily installed by inserting the retainer portion 4010 and pivoting into place. With the retainer portion 4010 held under the snap ring 4002, the key is less likely to fall out of the key notch 4006 during assembly.

Figure 42:
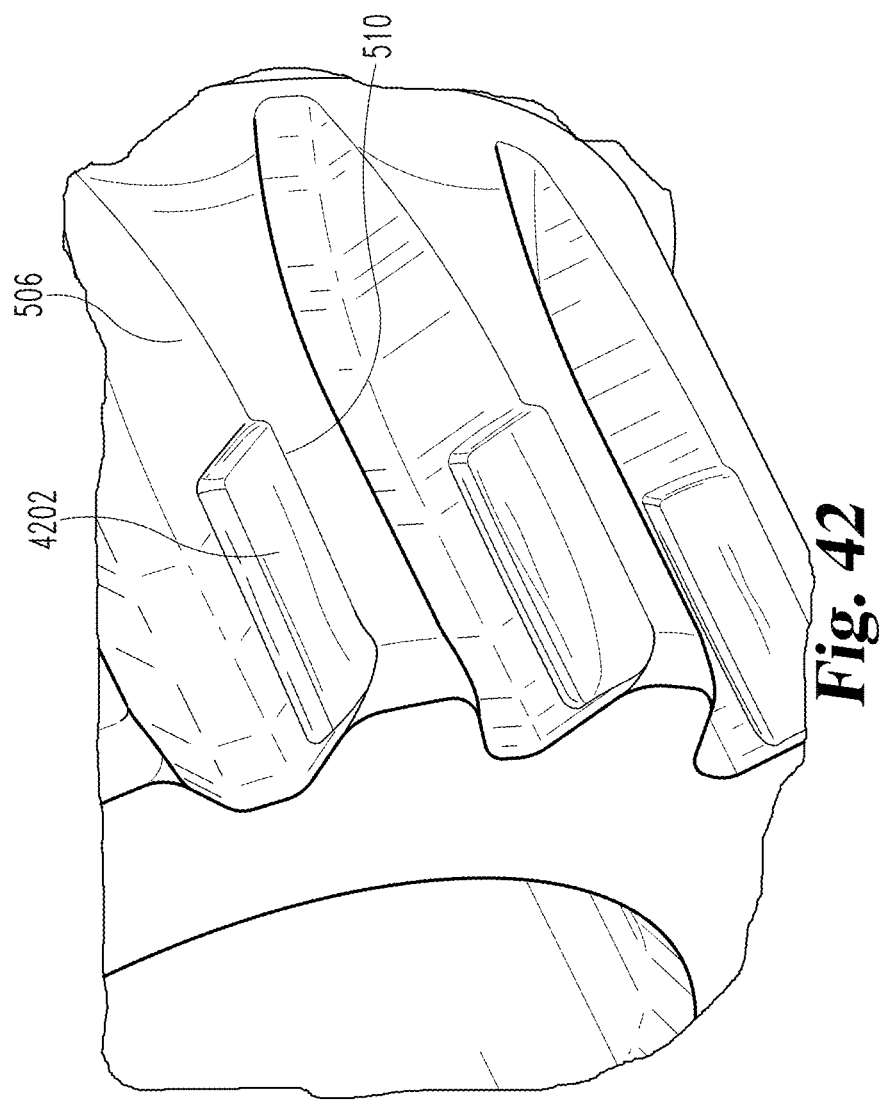
FIG. 42 is partial perspective view showing axial spline wear on an input shaft.

As alluded to before, it was discovered that the input shaft 506 experienced significant wear at the splines 510 as is shown by fretting or axial spline wear areas 4202 in FIG. 42. While not certain as to the cause, it was thought that the wear areas 4202 were caused by the drive shaft 702 from the engine 102 moving in and out as the engine 102 was throttled. This axial movement in turn was thought to cause the fretting or wear areas 4202 on the splines 510. The previous design, such as in FIG. 7, had the relatively stiff input drive disc 706 between the flywheel 704 and the input shaft 506. With the relatively stiff input drive disc 706, any axial movement of the drive shaft 702 from throttling of the engine 102 caused the input drive disc 706 to rub against the splines 510, thereby resulting in the wear areas 4202.

Figure 43:
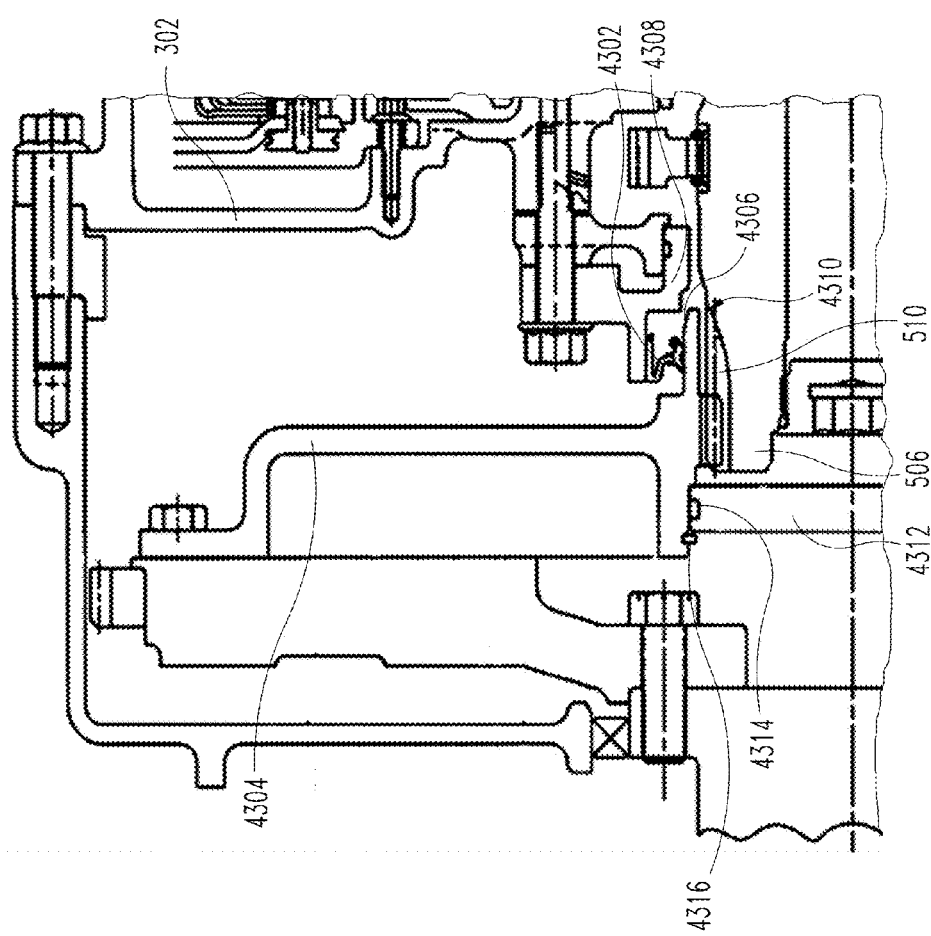
FIG. 43 is an enlarged cross-sectional view showing a spline lubrication arrangement for reducing spline wear on the input shaft.

A number of designs have been developed to tackle this axial wear issue on the splines 510 of the input shaft 506. FIG. 43 shows one example of using lubrication to reduce wear of the splines 510. As can be seen, bushing 4302 (formerly bushing 716 in FIG. 7) has been relocated to allow lubrication to flow along the splines 510 of the input shaft 506. To facilitate this construction, the input drive disc 4304 (formerly input drive disc 706) has been modified to incorporate a bushing flange 4306. Likewise, the housing 302 has been modified to incorporate a bushing support flange 4308. As shown in FIG. 43, the bushing 4302 is located between both support flanges 4306, 4308. A lubrication passage 4310 is then formed between the input drive disc 4304 and the input shaft 506 such that lubrication, such as oil, is able to flow in between. To facilitate recirculation of the oil, a stopper 4312 is received in the input drive disc 4304 and a seal 4314 seals the stopper against the input drive disc 4304. A retaining snap ring 4316 holds the stopper in place. Testing showed none or very little wear on the splines 510 of the input shaft 506 using the oil lubrication configuration in FIG. 43.

Figure 44:
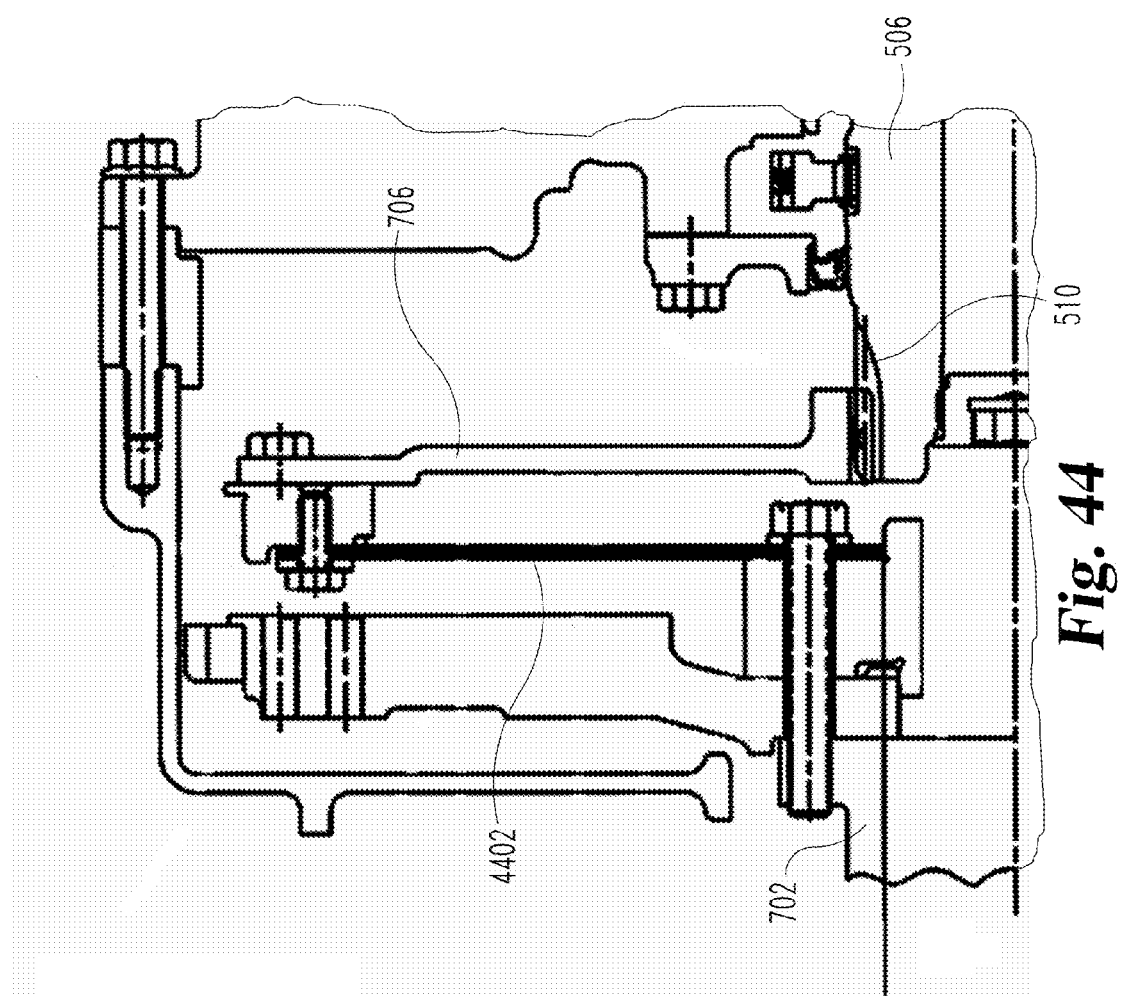
FIG. 44 is an enlarged cross-sectional view showing a flex plate arrangement for reducing spline wear on the input shaft.

In another example, as is shown in FIG. 44, wear of the splines 510 on the input shaft 506 is reduced by utilizing a flex plate 4402. As is depicted in FIG. 44, the flex plate 4402 is bolted between the drive shaft 702 and the input drive disc 706. The flex plate 4402 is relatively thin yet circumferentially stiff to facilitate flexing and compensate for axial movement of the drive shaft 702. To avoid any harmonics issues, the stiffness of the flex plate 4402 has a different stiffness than the dampener spring in the transmission. In one example, the flex plate 4402 is stiffer than the dampener spring in the transmission, but in other embodiments, the damper spring can be stiffer. By picking the appropriate stiffness of the flex plate 4402, axial wear of the splines 510 of the input shaft 506 can be dramatically reduced.

Figure 45:
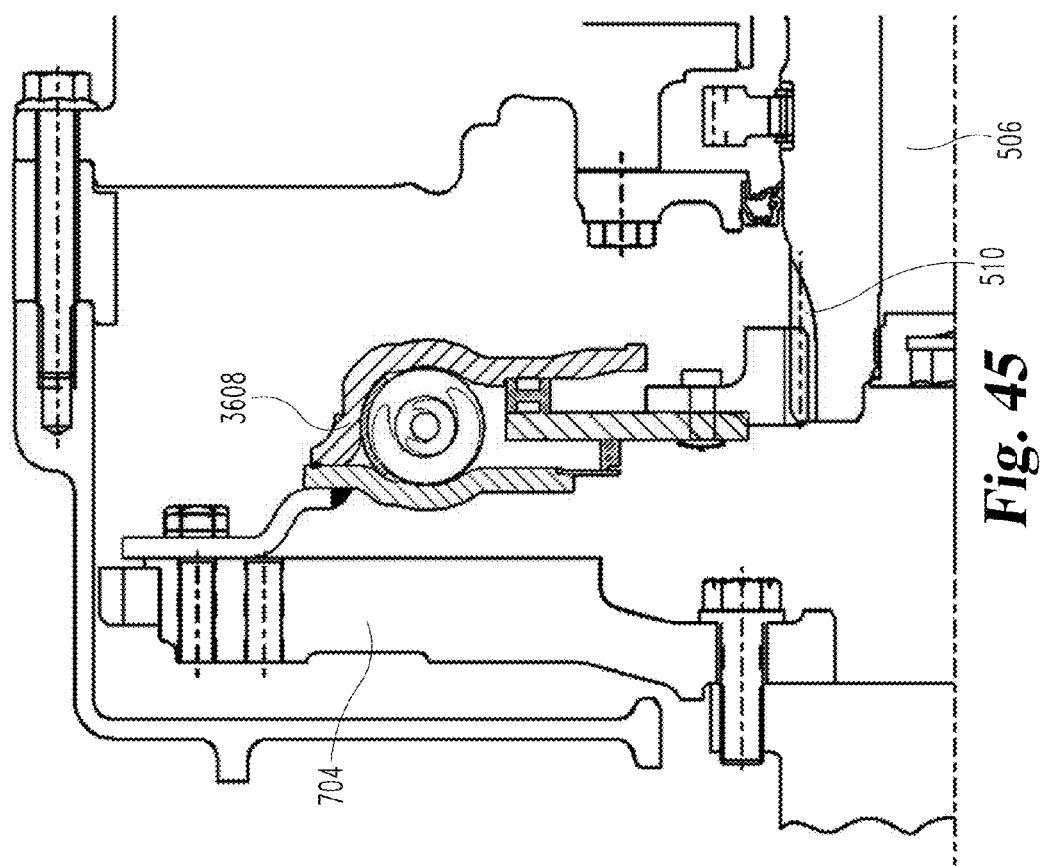
FIG. 45 is an enlarged cross-sectional view showing a damper arrangement for reducing spline wear on the input shaft.

FIG. 45 is an enlarged cross-sectional view showing the hybrid module damper 3608 coupled between the flywheel 704 and the input shaft 506. It was unexpectedly discovered that the hybrid damper 3608 dramatically reduced axial wear on the splines 510 of the input shaft 506. Dampers of this type are typically designed to minimize wear caused by torsional loads rather than axial loads. The axial wear can occur for example during low frequency startup modes. The hybrid damper 3608 addresses this issue. As noted before, the hybrid damper 3608 has a different stiffness than the transmission damper 3610 in the transmission 106 to avoid any resonance mode frequency issues. In one example, the transmission damper 3610 is stiffer than the hybrid damper 3608 but it is contemplated that the hybrid damper 3608 can be stiffer. Again, this difference in stiffness avoids any damper harmonics issues. In still yet another example, the damper is removed from the transmission such that the system only includes the hybrid damper 3608.

Figure 46:
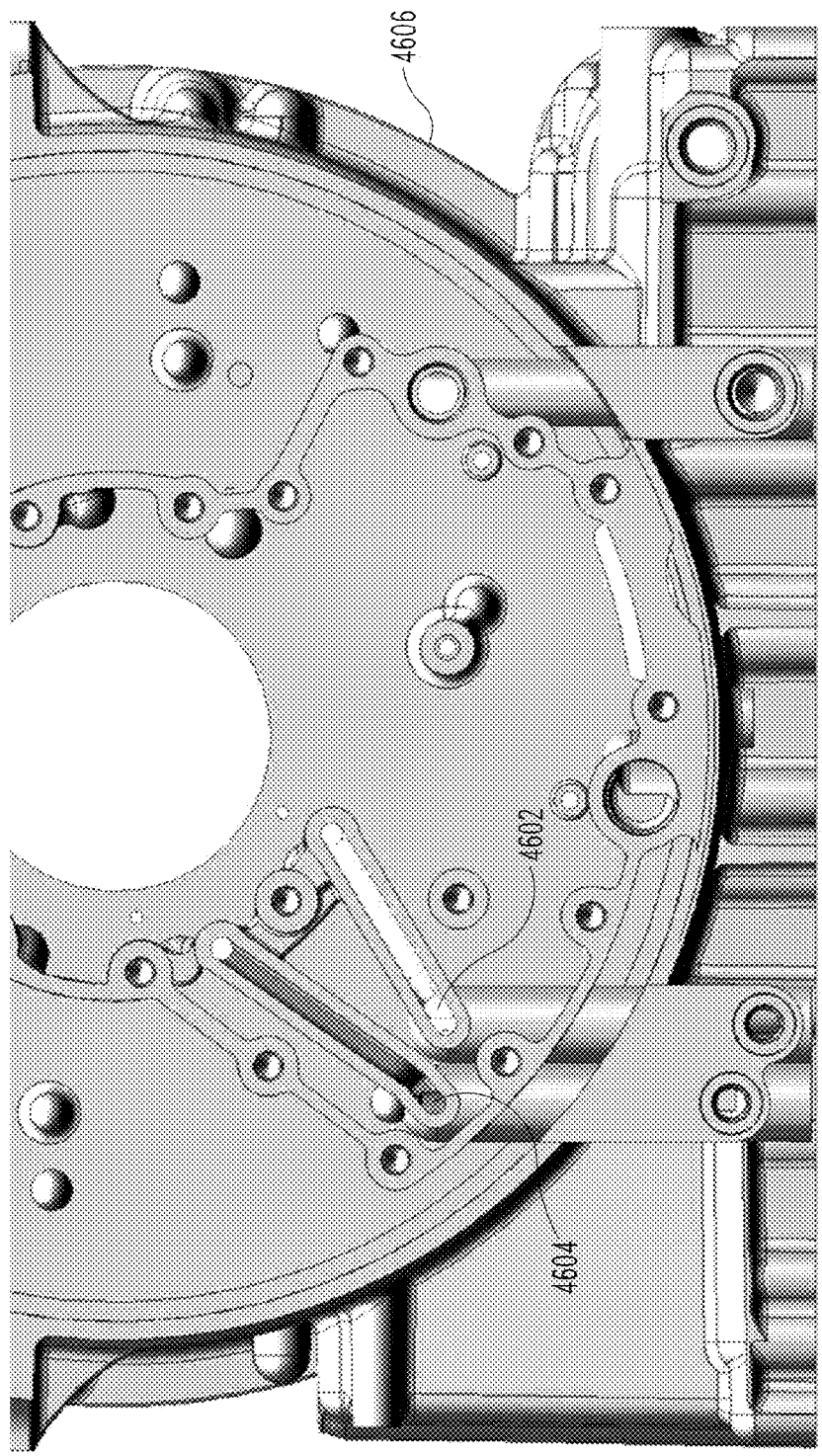
FIG. 46 is a front view of the FIG. 34 hybrid module.

As mentioned above, the clutch supply port 508 in FIG. 5 was in the form of external tubes but the clutch supply port can take other forms such as integral passageways. FIG. 46 illustrates an example of the various passageways 4602, 4604 being integrated into housing 4606 of the hybrid module 3304. By integrating the passageways 4602, 4604 into the housing 4606 servicing and assembly is simplified. In addition, it reduces the risk of damage or failure as compared to the external tubes illustrated in FIG. 5.

Figure 47:
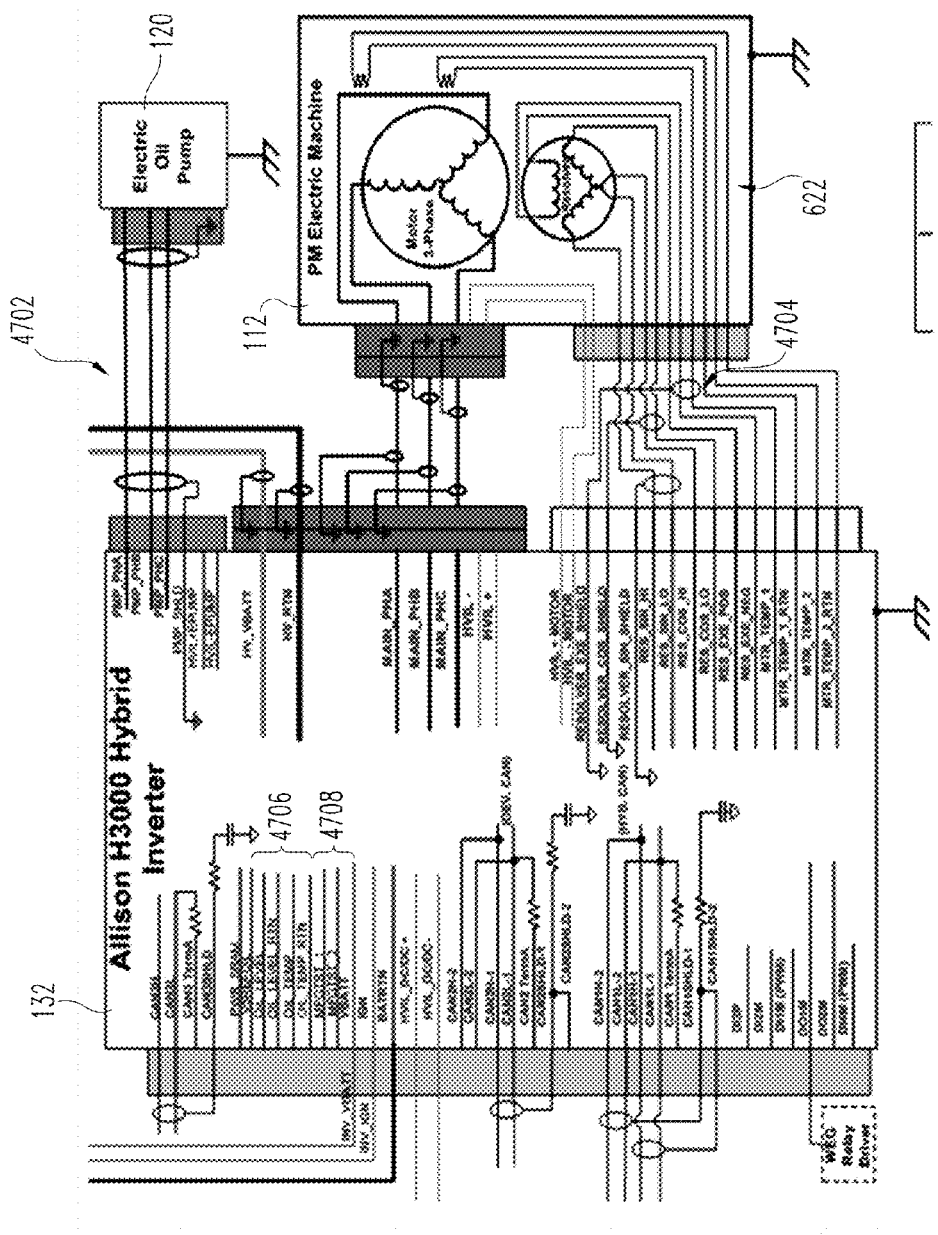
FIG. 47 is a wiring diagram for the inverter in the FIG. 33 hybrid system.

Due to electrical noise and other issues, it was discovered that when the electrical pump included its own controllers, it did not function properly under real-world conditions. As a result, the controller for the electric oil pump 120 has been removed and incorporated into the overall control system via the inverter 132. FIG. 47 illustrates a block diagram of the electrical connections between the eMachine 112, oil pump 120, inverter 132, and resolver 622. As can be seen by arrow 4702, the electric oil pump 120 is now electrically connected to the inverter 132 which in turn controls the operation of the electric oil pump 120. To address the electrical noise issue, a number of resolver signal shields have been incorporated which is indicated by arrow 4704. As can also be seen, the inverter 132 also has oil pump signal inputs 4706 for detecting various characteristics such as oil temperature and oil level in a low voltage oil pump. The inverter 132 also includes illegal conditions inputs 4708 which are used during manufacture to test the inverter 132 as well as other components.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A hybrid system, comprising:
a hybrid module including
an eMachine having a generator mode in which the eMachine generates energy that is stored in an energy storage system, the eMachine having a motor mode in which the eMachine draws energy from the energy storage system to provide torque,
a clutch providing a connection for transferring torque between an engine and a torque converter of a transmission, the clutch having an engaged state where the torque is able to be transferred between the engine and the torque converter, the clutch having a disengaged state where the torque is unable to be transferred between the engine and the torque converter, and
wherein the hybrid module includes a dedicated lubrication, communication, controller, and cooling system to minimize impact on other vehicular systems.

2. The hybrid system according to claim 1, further comprising:
the engine;
the transmission with a torque converter;
the energy storage system; and
wherein the hybrid module is coupled between the engine and the torque converter of the transmission.

3. The hybrid system according to claim 2, further comprising:
the clutch forming a torque pathway between the engine and the torque converter of the transmission; and
the eMachine being located along the torque pathway between the clutch and the torque converter.

4. The hybrid system according to claim 1, wherein the eMachine and the clutch are oriented in a radial configuration.

5. The hybrid system according to claim 4, wherein the clutch is radially disposed inside the eMachine.

6. The hybrid system according to claim 1, wherein the clutch is a hydraulic type clutch.

7. The hybrid system according to claim 1, further comprising:
a rotor hub configured to be mechanically connected to the torque converter, wherein the rotor hub and the torque converter are configured to rotate in unison together;
a clutch hub configured to be mechanically connected to the engine; and
the clutch including clutch plates disposed between the rotor hub and the clutch hub to transfer torque between the engine and the torque converter when the clutch is in the engaged state.

8. The hybrid system according to claim 7, wherein the clutch includes:
a piston configured to press against the clutch plates to frictionally engage the clutch plates when the clutch is in the engaged state, the piston having a spring recess; and
a piston spring received in the spring recess to bias the piston to the disengaged state.

9. The hybrid system according to claim 7, further comprising:

the rotor hub defining a piston cavity in which the piston is slidably disposed, the piston dividing the piston cavity into an activation chamber and a deactivation chamber; and the piston having an offset section bumped out from the rest of the piston in which portions of the piston facing the activation chamber and the deactivation chamber have similar effective areas so that the clutch is centrifugally neutral.

10. The hybrid system according to claim 9, wherein the piston has a standoff disposed opposite of the piston spring to prevent bottoming out of the piston.

11. The hybrid system according to claim 9, further comprising:

the clutch including a deactivation fluid passage that supplies fluid to the deactivation chamber; and the rotor hub including a spillover gap proximal the deactivation fluid passage that allows excess fluid to spill over to prevent hydrostatic lock of the piston.

12. The hybrid system according to claim 7, further comprising:

an input shaft mechanically connecting the clutch hub to the engine; and wherein the input shaft and the clutch hub are connected via a spline-type connection.

13. The hybrid system according to claim 12, further comprising:

the clutch including a clamp member connected to the rotor hub for bracing the clutch plates; and the clamp member having a stop member that extends to create an interference relationship with the clutch hub to prevent the clutch hub from falling out of the hybrid module when inverted.

14. The hybrid system according to claim 12, wherein the input shaft has splines and the engine and the input shaft are connected via the splines.

15. The hybrid system according to claim 14, further comprising:

the engine includes a drive shaft; and a flywheel connected to the drive shaft.

16. The hybrid system according to claim 15, further comprising:

an input drive disc connected to the flywheel; and the input drive disc having the spline-type connection with the input shaft.

17. The hybrid system according to claim 15, further comprising:

a flex plate connected to the flywheel;

the flex plate having the spline-type connection with the input shaft; and the flex plate being flexible to bend to minimize axial wear of the splines on the input shaft.

18. The hybrid system according to claim 15, further comprising:

a damper connected to the flywheel;

the damper having the spline-type connection with the input shaft; and the damper being flexible to bend to minimize axial wear of the splines on the input shaft.

19. The hybrid system according to claim 18, further comprising:

the transmission including a transmission damper; and the transmission damper having a different stiffness that the damper connected to the flywheel.

20. The hybrid system according to claim 19, wherein the transmission damper is stiffer than the damper connected to the flywheel.

21. The hybrid system according to claim 12, further comprising:

the hybrid modules includes a hybrid module housing; and a seal sealing between the hybrid module housing that the input shaft proximal the splines to prevent lubrication of the splines of the input shaft.

22. The hybrid system according to claim 14, further comprising:

a stopper positioned to facilitate lubrication of the splines.

23. The hybrid system according to claim 1, wherein the hybrid system is self-sustaining unit to facilitate retrofitting to pre-existing vehicle designs.

24. The hybrid system according to claim 1, wherein the hybrid module further includes:

a mechanical pump for circulating lubrication in the hybrid module; and an electric pump for circulating the lubrication in the hybrid module.

25. The hybrid system according to claim 24, wherein the electric pump supplements the operation of the mechanical pump to minimize the size of the mechanical pump.

26. The hybrid system according to claim 24, further comprising:

the hybrid module including a pump drive gear received around an input shaft for powering the mechanical pump, a snap ring holding the pump drive gear in place, and a key with a notched portion received under the snap ring to key the pump drive gear in place.

27. The hybrid system according to claim 1, further comprising:

an adapter ring configured to secure to the torque converter; and the adapter ring forming a spline-type connection with the hybrid module.

28. The hybrid system according to claim 27, wherein the adapter ring is configured to be bolted to standard bolt locations on the torque converter where the engine is traditionally connected.

29. The hybrid system according to claim 27, wherein the spline-type connection between the adapter ring and the hybrid module reduces any indexing issues during assembly.

30. The hybrid system according to claim 1, wherein the hybrid module includes a slinger blade for directing lubrication back into the hybrid module.

31. The hybrid system according to claim 30, wherein the hybrid module includes a dam structure with a window for retaining the lubrication from the slinger blade.

32. The hybrid system according to claim 1, wherein the hybrid module includes a resolver assembly.

33. The hybrid system according to claim 32, wherein the module includes shielding for shielding the resolver assembly for shielding the resolver assembly from electromagnetic noise.

34. The hybrid system according to claim 33, wherein the shielding includes a transmission facing shield disposed between the resolver assembly and the transmission.

35. The hybrid system according to claim 33, wherein the shielding includes an engine facing shield positioned between the resolver assembly and the engine.

36. The hybrid system according to claim 33, wherein the shielding includes an eMachine facing shield positioned between the resolver assembly and the eMachine.

37. The hybrid system according to claim 33, wherein hybrid module includes a stator terminal block located remotely from the resolver assembly to reduce the electromagnetic noise.

38. The hybrid system according to claim 37, wherein the hybrid module includes
a hybrid housing having a stator access opening, and
a stator connector access cover covering the stator access opening of the hybrid housing to facilitate access to the stator terminal block.

39. The hybrid system according to claim 2, wherein the transmission is an automatic transmission.

40. The hybrid system according to claim 2, wherein the transmission includes a power take off unit.

41. The hybrid system according to claim 40, wherein the power take off unit is powered in an electric power take off mode via the eMachine.

42. The hybrid system according to claim 40, wherein the power take off unit is powered in a mixed power mode via the eMachine and the engine.

43. The hybrid system according to claim 40, wherein the power take off unit is powered in an engine powered mode via the engine.

44. The hybrid system according to claim 2, wherein the engine is an internal combustion engine.

45. The hybrid system according to claim 2, wherein the energy storage system includes batteries.

46. The hybrid system according to claim 2, further comprising an inverter electrically connected between the transmission and the energy storage system.

47. The hybrid system according to claim 2, further comprising a DC-DC converter module to converts high voltage power supplied by the energy storage system to a lower voltage.

48. The hybrid system according to claim 47, further comprising an electrical accessory electrically connected to the DC-DC converter module.

49. The hybrid system according to claim 2, further comprising a voltage tap electrically connected to the energy storage system.

50. The hybrid system according to claim 1, wherein the hybrid module includes
a low voltage connector,
one ore more high voltage lines electrically connected to the eMachine, and
the low voltage connector being aligned with high voltage wires on a same side of the hybrid module to facilitate making connections.

51. The hybrid system according to claim 2, further comprising a transmission and hybrid control module for controlling the hybrid module and the transmission.

52. The hybrid system according to claim 1, wherein the hybrid module includes a radiator that cools the hybrid module, wherein the radiator for the hybrid module is separate from a radiator for the engine.

53. A hybrid system, comprising:
a hybrid module including
an eMachine having a generator mode in which the eMachine generates energy that is stored in an energy storage system, the eMachine having a motor mode in which the eMachine draws energy from the energy storage system to provide torque,
a clutch providing a connection for transferring torque between an engine and a torque converter of a transmission, the clutch having an engaged state where the torque is able to be transferred between the engine and the torque converter, the clutch having a disengaged state where the torque is unable to be transferred between the engine and the torque converter,
a rotor hub configured to be mechanically connected to the torque converter, wherein the rotor hub and the torque converter are configured to rotate in unison together,
a clutch hub configured to be mechanically connected to the engine,
the clutch including clutch plates disposed between the rotor hub and the clutch hub to transfer torque between the engine and the torque converter when the clutch is in the engaged state,
the rotor hub defining a piston cavity in which the piston is slidably disposed, the piston dividing the piston cavity into an activation chamber and a deactivation chamber,
the piston having an offset section bumped out from the rest of the piston in which portions of the piston facing the activation chamber and the deactivation chamber have similar effective areas so that the clutch is centrifugally neutral,
the clutch including a deactivation fluid passage that supplies fluid to the deactivation chamber, and
the rotor hub including a spillover gap proximal the deactivation fluid passage that allows excess fluid to spill over to prevent hydrostatic lock of the piston.

54. A hybrid system, comprising:
a hybrid module including
an eMachine having a generator mode in which the eMachine generates energy that is stored in an energy storage system, the eMachine having a motor mode in which the eMachine draws energy from the energy storage system to provide torque,
a clutch providing a connection for transferring torque between an engine and a torque converter of a transmission, the clutch having an engaged state where the torque is able to be transferred between the engine and the torque converter, the clutch having a disengaged state where the torque is unable to be transferred between the engine and the torque converter,
a mechanical pump for circulating lubrication in the hybrid module,
a pump drive gear received around an input shaft for powering the mechanical pump,
a snap ring holding the pump drive gear in place, and
a key with a notched portion received under the snap ring to key the pump drive gear in place.

55. A hybrid system, comprising:
a hybrid module including
an eMachine having a generator mode in which the eMachine generates energy that is stored in an energy storage system, the eMachine having a motor mode in which the eMachine draws energy from the energy storage system to provide torque, and
a clutch providing a connection for transferring torque between an engine and a torque converter of a transmission, the clutch having an engaged state where the torque is able to be transferred between the engine and the torque converter, the clutch having a disengaged state where the torque is unable to be transferred between the engine and the torque converter;
an adapter ring configured to secure to the torque converter; and
the adapter ring forming a spline-type connection with the hybrid module.

56. The hybrid system according to claim 55, wherein the adapter ring is configured to be bolted to standard bolt locations on the torque converter where the engine is traditionally connected.

57. The hybrid system according to claim 55, wherein the spline-type connection between the adapter ring and the hybrid module reduces any indexing issues during assembly.

58. A hybrid system, comprising:
a hybrid module including
an eMachine having a generator mode in which the eMachine generates energy that is stored in an energy storage system, the eMachine having a motor mode in which the eMachine draws energy from the energy storage system to provide torque, and
a clutch providing a connection for transferring torque between an engine and a torque converter of a transmission, the clutch having an engaged state where the torque is able to be transferred between the engine and the torque converter, the clutch having a disengaged state where the torque is unable to be transferred between the engine and the torque converter; and
wherein the hybrid module includes a slinger blade for directing lubrication back into the hybrid module.

59. The hybrid system according to claim 58, wherein the hybrid module includes a dam structure with a window for retaining the lubrication from the slinger blade.

60. A hybrid system, comprising:
a hybrid module including
an eMachine having a generator mode in which the eMachine generates energy that is stored in an energy storage system, the eMachine having a motor mode in which the eMachine draws energy from the energy storage system to provide torque,
a clutch providing a connection for transferring torque between an engine and a torque converter of a transmission, the clutch having an engaged state where the torque is able to be transferred between the engine and the torque converter, the clutch having a disengaged state where the torque is unable to be transferred between the engine and the torque converter,
a resolver assembly, and
shielding for shielding the resolver assembly for shielding the resolver assembly from electromagnetic noise.

61. The hybrid system according to claim 60, wherein the shielding includes a transmission facing shield disposed between the resolver assembly and the transmission.

62. The hybrid system according to claim 60, wherein the shielding includes an engine facing shield positioned between the resolver assembly and the engine.

63. The hybrid system according to claim 60, wherein the shielding includes an eMachine facing shield positioned between the resolver assembly and the eMachine.

64. The hybrid system according to claim 60, wherein hybrid module includes a stator terminal block located remotely from the resolver assembly to reduce the electromagnetic noise.

65. The hybrid system according to claim 64, wherein the hybrid module includes
a hybrid housing having a stator access opening, and
a stator connector access cover covering the stator access opening of the hybrid housing to facilitate access to the stator terminal block.

66. A hybrid system, comprising:
a hybrid module including
an eMachine having a generator mode in which the eMachine generates energy that is stored in an energy storage system, the eMachine having a motor mode in which the eMachine draws energy from the energy storage system to provide torque,
a clutch providing a connection for transferring torque between an engine and a torque converter of a transmission, the clutch having an engaged state where the torque is able to be transferred between the engine and the torque converter, the clutch having a disengaged state where the torque is unable to be transferred between the engine and the torque converter, and
a radiator that cools the hybrid module, wherein the radiator for the hybrid module is separate from a radiator for the engine.

67. A hybrid system, comprising:
a hybrid module including
an eMachine having a generator mode in which the eMachine generates energy that is stored in an energy storage system, the eMachine having a motor mode in which the eMachine draws energy from the energy storage system to provide torque,
a clutch providing a connection for transferring torque between an engine and a torque converter of a transmission, the clutch having an engaged state where the torque is able to be transferred between the engine and the torque converter, the clutch having a disengaged state where the torque is unable to be transferred between the engine and the torque converter,
a rotor hub configured to be mechanically connected to the torque converter, wherein the rotor hub and the torque converter are configured to rotate in unison together,
a clutch hub configured to be mechanically connected to the engine,
the clutch including clutch plates disposed between the rotor hub and the clutch hub to transfer torque between the engine and the torque converter when the clutch is in the engaged state,
a piston configured to press against the clutch plates to frictionally engage the clutch plates when the clutch is in the engaged state, the piston having a spring recess,
a piston spring received in the spring recess to bias the piston to the disengaged state,
the rotor hub defining a piston cavity in which the piston is slidably disposed, the piston dividing the piston cavity into an activation chamber and a deactivation chamber, and
the piston having an offset section bumped out from the rest of the piston in which portions of the piston facing the activation chamber and the deactivation chamber have similar effective areas so that the clutch is centrifugally neutral.

68. The hybrid system according to claim 67, wherein the piston has a standoff disposed opposite of the piston spring to prevent bottoming out of the piston.

69. The hybrid system according to claim 67, further comprising:
the clutch including a deactivation fluid passage that supplies fluid to the deactivation chamber; and
the rotor hub including a spillover gap proximal the deactivation fluid passage that allows excess fluid to spill over to prevent hydrostatic lock of the piston.

70. A hybrid system, comprising:
a hybrid module including
an eMachine having a generator mode in which the eMachine generates energy that is stored in an energy storage system, the eMachine having a motor mode in which the eMachine draws energy from the energy storage system to provide torque,
a clutch providing a connection for transferring torque between an engine and a torque converter of a transmission, the clutch having an engaged state where the torque is able to be transferred between the engine and the torque converter, the clutch having a disengaged state where the torque is unable to be transferred between the engine and the torque converter, a rotor hub configured to be mechanically connected to the torque converter, wherein the rotor hub and the torque converter are configured to rotate in unison together, a clutch hub configured to be mechanically connected to the engine, the clutch including clutch plates disposed between the rotor hub and the clutch hub to transfer torque between the engine and the torque converter when the clutch is in the engaged state, an input shaft mechanically connecting the clutch hub to the engine, wherein the input shaft and the clutch hub are connected via a spline-type connection, the clutch including a clamp member connected to the rotor hub for bracing the clutch plates, and the clamp member having a stop member that extends radially inward to overlap with the clutch hub to create an interference relationship with the clutch hub.

\* \* \* \* \*